United States Patent
Maim

(10) Patent No.: US 11,159,318 B2
(45) Date of Patent: Oct. 26, 2021

(54) METHODS AND SYSTEMS IMPLEMENTED IN A NETWORK ARCHITECTURE WITH NODES CAPABLE OF PERFORMING MESSAGE-BASED TRANSACTIONS

(71) Applicant: Enrico Maim, Sceaux (FR)

(72) Inventor: Enrico Maim, Sceaux (FR)

(73) Assignee: Enrico Maim, Sceaux (FR)

( * ) Notice: Subject to any disclaimer, the term of this patent is extended or adjusted under 35 U.S.C. 154(b) by 319 days.

(21) Appl. No.: 16/068,497

(22) PCT Filed: Jan. 16, 2017

(86) PCT No.: PCT/IB2017/050228
§ 371 (c)(1),
(2) Date: Jul. 6, 2018

(87) PCT Pub. No.: WO2017/122187
PCT Pub. Date: Jul. 20, 2017

(65) Prior Publication Data
US 2019/0013943 A1 Jan. 10, 2019

Related U.S. Application Data

(63) Continuation-in-part of application No. 15/123,663, filed as application No. PCT/IB2016/050440 on Jan.
(Continued)

(30) Foreign Application Priority Data

Jan. 15, 2016 (FR) ...................................... 16/50352

(51) Int. Cl.
*G06F 21/00* (2013.01)
*H04L 29/06* (2006.01)
(Continued)

(52) U.S. Cl.
CPC ................ *H04L 9/14* (2013.01); *G06F 21/44* (2013.01); *G06F 21/51* (2013.01); *G06Q 20/065* (2013.01);
(Continued)

(58) Field of Classification Search
CPC ..... H04L 9/14; H04L 2209/38; H04L 9/3218; H04L 63/12; H04L 9/0866; H04L 9/3239;
(Continued)

(56) References Cited

U.S. PATENT DOCUMENTS

| 2012/0090026 A1* | 4/2012 | Andrews | ................. G06F 21/52 726/22 |
| 2015/0007251 A1* | 1/2015 | Johns | .................... H04L 63/168 726/1 |

FOREIGN PATENT DOCUMENTS

| WO | 2012122994 A1 | 9/2012 | |
| WO | WO-2012122994 A1 * | 9/2012 | ........... G06F 21/335 |

OTHER PUBLICATIONS

International Search Report in corresponding International Patent Application No. PCT/IB2017/050228, dated Jul. 26, 2017. 12 pages.
(Continued)

*Primary Examiner* — Lisa C Lewis
(74) *Attorney, Agent, or Firm* — Leason Ellis LLP

(57) ABSTRACT

A method for establishing connection weights between network nodes is implemented by communicating data processing units, a public key and a private key being associated with each node, a given node being able to communicate its public key to another node, thus forming a so-called real connection ("IRL-connected") between two nodes, and each node also being able to communicate to another node a public key received from yet another node, thus forming a so-called indirect connection between the other node and the
(Continued)

yet another node. Each node can have a specific connection weight in relation to another node with which it has a real or indirect connection. In order to determine the connection weight of a second node in relation to a first node, the method comprises calculating a set combination of weighting factors (influence, proximity) of third nodes that are IRL-connected to the second node.

18 Claims, 20 Drawing Sheets

Related U.S. Application Data 28, 2016, now abandoned, application No. 16/068,497, filed on Jul. 6, 2018, which is a continuation-in-part of application No. PCT/EP2017/050041, filed on Jan. 2, 2017.

(60) Provisional application No. 62/109,772, filed on Jan. 30, 2015, provisional application No. 62/399,358, filed on Sep. 24, 2016, provisional application No. 62/400,174, filed on Sep. 27, 2016.

(51) Int. Cl.
| | |
|---|---|
| H04L 9/14 | (2006.01) |
| G06Q 20/08 | (2012.01) |
| H04L 9/32 | (2006.01) |
| H04L 9/30 | (2006.01) |
| G06F 21/44 | (2013.01) |
| G06F 21/51 | (2013.01) |
| G09C 1/00 | (2006.01) |
| G06Q 20/06 | (2012.01) |
| G06Q 20/36 | (2012.01) |
| H04L 9/08 | (2006.01) |

(52) U.S. Cl.
CPC ....... *G06Q 20/085* (2013.01); *G06Q 20/3678* (2013.01); *G09C 1/00* (2013.01); *H04L 9/0866* (2013.01); *H04L 9/30* (2013.01); *H04L 9/3218* (2013.01); *H04L 9/3239* (2013.01); *H04L 9/3247* (2013.01); *H04L 63/12* (2013.01); *G06F 2221/2153* (2013.01); *H04L 2209/38* (2013.01)

(58) Field of Classification Search
CPC ........... H04L 9/3247; H04L 9/30; G09C 1/00; G06Q 20/065; G06Q 20/3678; G06Q 20/085; G06F 2221/2153; G06F 21/44; G06F 21/51
See application file for complete search history.

(56) References Cited

OTHER PUBLICATIONS

International Preliminary Report on Patentability in corresponding International Patent Application No. PCT/IB2017/050228, dated Jul. 17, 2018. 20 pages.

Jacquet et al. "Optimized link state routing protocol for ad hoc networks." Multi Topic Conference, 2001. IEEE INMIC 2001. Technology for the 21st Century. Proceedings. IEEE International. IEEE, 2001. pp. 62-68.

Mezzomix. "Angebot: BTC (2-aus-3) Multisig Escrow (Treuhandabwicklung)" Bitcoin Forum. Jan. 19, 2015. https://bitcointalk.org/index.php?topic=456563.0. XP055361307. Retrieved on Apr. 3, 2017. 12 pages.

No Author. Bitfury Group. "Proof of Stake Versus Proof of Work." White Paper, Sep. 13, 2015 (version 1.0). http://bitfury.com/content/5-white-papers-research/pos-vs-pow-1.0.2.pdf. XP055392205. Retrieved on Jul. 19, 2017. 26 pages.

No Author. "Bytecoin BCN is Now Armed with Multisig." 99bitcoins.com. Aug. 27, 2014. https://99bitcoins.com/bytecoin-bcn-multisig. XP055391837. Retrieved on Jul. 18, 2017. 2 pages.

Reiner. "Bitcoin Wallet Identity Verification Specification." Feb. 27, 2015. Armory Technologies, Inc. http://diyhpl.us/-bryan/papers2/bitcoin/armory-verisign-bitcoin-wallet-identityspecification.pdf. XP055245135. Retrieved on Jan. 27, 2016. 23 pages.

Yang. "Mesh networking with Bitcoin." Research Project, Swiss Federal Institute of Technology Zurich, Distributed Computing. Feb. 18, 2016. 31 pages.

Zindros. "A Pseudonymous Trust System for a Decentralized Anonymous Marketplace." web-of-trust.md. GitHub.gist.github.com/dionyziz/e3b296861175e0ebea4b/fda8c057c3ea7600fd0740214b06c441f3d600bd. Retrieved Apr. 26, 2017. 16 pages.

* cited by examiner

METHODS AND SYSTEMS IMPLEMENTED IN A NETWORK ARCHITECTURE WITH NODES CAPABLE OF PERFORMING MESSAGE-BASED TRANSACTIONS

CROSS-REFERENCE TO RELATED PATENT APPLICATIONS

This application is a 35 USC § 371 of PCT/M2017/050228 filed Jan. 16, 2017 which claims priority to FR 1650352, filed Jan. 15, 2016. The present application also claims priority to U.S. application Ser. No. 15/123,663, filed Sep. 5, 2016 which is a 35 USC § 371 application of PCT/M2016/050440 filed Jan. 28, 2016 and claims priority to provisional application 62/109,772 filed Jan. 30, 2015. The present application also claims priority to PCT/IB2017/05004 filed Jan. 2, 2017 which claims priority to U.S. provisional application 62/399,358 filed Sep. 24, 2016 and U.S. provisional application 62/400,174 filed Sep. 27, 2016, all of which are incorporated by references in their entireties.

FIELD OF THE INVENTION

The present invention relates to methods and systems used in a network architecture, which is generally decentralized, with nodes which are capable of carrying out message-based transactions between each other.

BACKGROUND OF THE INVENTION AND SUMMARY OF THE INVENTION

It should be noted here that some portions of the description below are in the English language, and their accurate translation into French is to be considered part of the description.

Moreover, reference is made to the application WO2016120826A2 in the name of the applicant, the content of which is incorporated here by reference.

The decentralized trust model of PGP (Web-of-Trust, 1992) is already known, which enables pairs to act as introducers and validators of public keys and proposes a decentralized validation metrics of a digital identity, which focused on the email addresses of the pairs in question. Since that time, other approaches have been proposed for establishing the identity without certification authority (for example, by Carl Ellison in 1996). Moreover, methods are known which use an "out of band channel" approach and require the use of a reliable terminal to carry out an exchange of public keys in a secure manner in the presence of the risk of "Man-in-the-Middle (MitM) attack," in particular the SafeSlinger method [http://www.netsec.ethz.ch/publications/papers/farb_safeslinger_mobicom2013.pdf]designed to optimize the case in which each of the users of a group, such as in a "key signing party," carry out an exchange of keys with all the other users.

The aim of the invention is first of all to enable a decentralized identification which is both simpler and of broader use and which directly meets the requirements of use of executable commitments of the "smart contracts" type [https://en.wikipedia.org/wiki/Smart_contract] used today on consensus protocols, in particular in a permissionless environment ("permissionless") where anyone can join and leave dynamically, and where there is no a priori knowledge of the consensus nodes, relying in general on computational puzzles [Dwork & Naor, 1992: http://www.hashcash.org/papers/pvp.pdf; Back, 2002: http://www.hashcash.org/papers/hashcash.pdf] in order to prevent "Sybil attacks" and with the hypothesis that most of the computation power is held by honest participants [Nakamoto, 2008: https://bitcoin.org/bitcoin.pdf]. The state of the art on the subject of smart contracts is represented primarily by the Ethereum system [https://github.com/ethereum/wiki/wiki/White-Paper].

There is no known implementation of "smart contracts" (without trusted third parties) which are based only on hardware ("hardware") of trusted manufacturers.

The invention relates more precisely to such an implementation, and is based additionally on hardware which is within the reach of a large number of manufacturers, in order to achieve decentralization even at the site of the manufacturers themselves, and, moreover, it aims to propose decentralized identification mechanisms which make it possible to mitigate sybil attacks (when an adversary generates any number of new nodes which he controls in the network).

With the aid of the hardware, the invention aims to achieve not only advantages of rapidity (consensus by blockchain is slow) and of cost (transaction cost), but even qualitative advantages. In particular, the article "Why Many Smart Contract Use Cases Are Simply Impossible" [http://www.coindesk.com/three-smart-contract-misconceptions/] presents limitations of Ethereum with respect to interactions with the outside world (see in particular under "Contacting External Services":

"Often, the first use case proposed is a smart contract that changes its behavior in response to some external event. For example, an agricultural insurance policy which pays out conditionally based on the quantity of rainfall in a given month.

The imagined process goes something like this: The smart contract waits until the predetermined time, retrieves the weather report from an external service and behaves appropriately based on the data received.

This all sounds simple enough, but it's also impossible. Why? Because a blockchain is a consensus-based system, meaning that it only works if every node reaches an identical state after processing every transaction and block.

Everything that takes place on a blockchain must be completely deterministic, with no possible way for differences to creep in. The moment that two honest nodes disagree about the chain's state, the entire system becomes worthless.

Now, recall that smart contracts are executed independently by every node on a chain. Therefore, if a smart contract retrieves some information from an external source, this retrieval is performed repeatedly and separately by each node. But because this source is outside of the blockchain, there is no guarantee that every node will receive the same answer.

Perhaps the source will change its response in the time between requests from different nodes, or perhaps it will become temporarily unavailable. Either way, consensus is broken and the entire blockchain dies. So, what's the workaround? Actually, it's rather simple. Instead of a smart contract initiating the retrieval of external data, one or more trusted parties ("oracles") creates a transaction which embeds that data in the chain. Every node will have an identical copy of this data, so it can be safely used in a smart contract computation."

The invention remedies this deficiency first of all by enabling access by a "Wallet Node" WN (see WO2016120826A2], in a secure manner, directly to any HTTPS Web site (thus eliminating the need for an "oracle" smart contract), by exploiting the TLS protocol end to end. This access can be implemented on a plurality of "WN clone" nodes capable of accessing a data source redundantly. Concerning the risk of modification of the response by the source between two requests, the WN clones are capable of coordinating themselves in order to process, according to pre-agreed rules (according to configuration parameters), cases of different replies to the same requests (according to approaches such as taking the majority, the average, etc.)—, the essential advantage provided in comparison to the Ethereum nodes being the access to the network, thus avoiding an intermediation by a trusted third party. The above-cited article then mentions the need to emit a message to the outside world:

"When it comes to smart contracts causing events in the outside world, a similar problem appears. For example, many like the idea of a smart contract which calls a bank's API in order to transfer money. But if every node is independently executing the code in the chain, who is responsible for calling this API? If the answer is just one node, what happens if that particular node malfunctions, deliberately or not?"

The invention remedies this deficiency by enabling the implementation of a reliable protocol according to which exactly one of the mirror nodes of the node which is supposed to emit a message to the outside world emits this message (see below the section "WN emitting a message to the outside world").

In the two above-mentioned application cases, the intrinsic limitation of the Ethereum nodes with respect to the network undermines its purpose of decentralization; see the above-cited article:

"they both require a trusted entity to manage the interactions between the blockchain and the outside world. While this is technically possible, it undermines the goal of a decentralized system."

The other important limitation of Ethereum described by the above-cited article is its intrinsic non-confidentiality:

"if one smart contract can't access another's data, have we solved the problem of blockchain confidentiality? Does it make sense to talk of hiding information in a smart contract? Unfortunately, the answer is no.

Because even if one smart contract can't read another's data, that data is still stored on every single node in the chain. For each blockchain participant, it's in the memory or disk of a system which that participant completely controls. And there's nothing to stop them reading the information from their own system, if and when they choose to do so."

This serious limitation of Ethereum is overcome by the blindness property (meaning "confidentiality extended to the hardware") of the WN, which is obtained by the hardware architecture proposed by the invention.

The smart contracts of Ethereum are understood to be "cryptographic "boxes" that contain value and only unlock it if certain conditions are met" [phrase extracted from the already-cited Ethereum White Paper], whereas, according to the system of the invention, the smart contracts are implemented as executable "Wallet Program" (WP) contracts between nodes (WN) of the network of Wallet Nodes, and having the following features:

the WN interact by "Wallet Message" (WM) messages;
each WM specifying the WP that the receiving WN has to execute to process it
a WM being able to comprise one or more transactions of transfer of "values" from the emitting WN to the receiving WN;
values which will belong to the receiving WN (or at the very least will be managed by the receiving WN) and which in turn will be able to transfer them by generating other transactions (in the context of the execution of a WP which in general can be different from the WP specified in the WM that transferred them to it),
the system of the WN comprising means in each WN in order to prevent double-spending of these values, and
a WN advantageously comprising means in order to reserve the consumption of these values for one or more authorized WP programs.

Nevertheless, said "cryptographic boxes" can easily be constructed on WN. The system of the invention thus combines the conventional concept of the contracts ("something that should be "fulfilled" or "complied with"") with the concept of Ethereum ("rather, they are more like "autonomous agents" that live inside of the Ethereum execution environment, always executing a specific piece of code when "poked" by a message or transaction, and having direct control over their own ether balance and their own key/value store to keep track of persistent variables") [phrases also taken from the already-cited Ethereum White Paper].

The WN nodes are comparable to the nodes of Ethereum: the address of an Ethereum node, determined based on the public key of a pair of keys, is analogous to the address of a WN, which is determined from the public key of the WN in question. In a WN, a smart contract is an executable "Wallet Program" code (identified by its hash "#WP"), code which can be compiled using a language such as Solidity [http://solidity.readthedocs.io/en/develop/introduction-to-smart-contracts.html (incorporated here by reference)], but with adaptations which make it possible that the WN have access to the network, that the transactions generated by a WN can transfer values in any units (and not only ethers), etc.

Whereas in Ethereum, a contract execution is carried out on a large number of nodes (the miners) which validate it, in the case of WN, when a contract (WP) is executed, the node on which this execution is initiated is the only node that executes it and has its own persistent state variables. The WN represent a more general model in the sense that the permanent variables of a node are of general use and do not represent only a balance in ethers and they are not necessarily variables associated with the contract for all the nodes that execute it (they are not necessarily the shared variables constituting the key/value store of an Ethereum contract [see the already-cited Ethereum White Paper]).

The WN guarantee the integrity of execution by hardware constraints and advantageously by redundance (for even more security), said node then being a virtual node materialized by a plurality of mirror nodes which store, manipulate and maintain in a synchronized manner the variables specific to said virtual node.

It is useful to refer to the description of FIG. 23 at the beginning of the section entitled "detailed description of preferred embodiments."

Another aim of the invention is to enable the execution of smart contracts (WP) on WN using the Bitcoin blockchain (or another blockchain), by generating and inserting into the blockchain only some of the transactions, upon instruction of the WN in question, which offers the triple advantage of having the power of the smart contracts on Bitcoin, of avoiding the slowness of its consensus protocol, and of not paying transaction fees (for the transactions that are not inserted into the blockchain). The section entitled "Off-chain Bitcoin transactions" describes a method which makes it possible to have units of values (such as bitcoins or ethers) be consumed by different types of WP programs, method which thus confers to a Bitcoin-based system the power of the smart contracts of a system such as Ethereum.

The Bitcoin protocol requires waiting for confirmations of transactions block by block, which, depending on the approach adopted, today take on the order of several seconds to around ten minutes each and involve limited transaction volumes. Ethereum and the method as described in FR 3 018 377 A1 in the name of the applicant enable the decentralized execution of executable contracts. The Sidechains technology was designed to essentially enable the management of commitments and transactions in a different manner than that provided for in Bitcoin and be able to return to the original Bitcoin protocol as desired [https://blockstream.com/sidechains.pdf] (which is in substance made possible by the invention). More recently, in addition to these systems, "state-channel networks" such as "Lightning Network" [https://lightning.network/lightning-network-paper.pdf] and "Payment-Channel Network" [http://raiden.network/world] for Ethereum have been proposed, in order to avoid having to use the blockchain for each transaction. This approach implies that the nodes monitor the blockchain so as to react in the case of insertion of transactions that do not reflect the current state, in order to correct, which requires the use of locks securing an observation time window, generating a certain slowness. The invention remedies this difficulty due to the guarantee of integrity of execution of the WP which it offers from the outset: the inserted transactions generated by WN do not require monitoring.

Moreover, it should be noted that the hardware proposed according to the invention makes it possible to ensure a processing without disclosure, a property (referred to as "confidentiality") offered in particular by the security environments such as the new Intel processors for their secure "SGX" environments (enclaves), and it is known that research exists on homomorphic encryption for processing on the Cloud, which offers guarantees of execution integrity and of nondisclosure of the processed data nor even of the executed code. However, the technique of homomorphic encryption is in the research phase and not yet operational except in limited or particular cases.

For reference, the application WO2016/120826 A2 describes a system-on-chip (SoC, referred to as "Wallet Node" or "WN" or else "entity") integrated in—or coupled with—a connected device such as a smartphone, a connected thing of the Internet of Things (IoT) or else a computer, offering guarantees of execution integrity to the extent that the restrictions of access between its different portions cannot be altered or circumvented. Essentially, the only possible execution of a WN is to react to an incoming message by verifying its integrity and by then executing the executable "Wallet Program" code corresponding to the hash specified in this message. In reference to this PCT application, in the present text, "message" is understood to mean "Wallet Message" except if this is explicitly not the case.

According to a first aspect, a method is proposed for establishing a connection weight between nodes of a network, implemented by communicating data processing units, a public key and a private key being associated with each node, a given node being able to communicate its public key to another node, thus forming a so-called real connection ("IRL-connected") between the two nodes, and each node also being able to communicate to another node a public key received from yet another node, thus forming a so-called indirect connection between the other node and the yet another node, a node being able to have a specific connection weight in relation to another node to which it is really or indirectly connected, the method comprising, in order to determine the connection weight of a second node in relation to a first node, calculating a set combination of weighting factors (influence, proximity) of third nodes that are IRL-connected to the second node.

Advantageously, but optionally:

the connection weight of the second node influences the weighting factors of the third nodes, and comprising moreover an updating of the values of the weighting factors of the third nodes after calculation of the connection weight of the second node.

the method is implemented iteratively until convergence.

the establishment of a so-called real connection (IRL-connection) between a first node and another node comprises the following steps:

at the site of a first processing unit implementing the first node, making accessible by proximity reading a machine readable code encoding an arbitrary number (nonce);

at the site of another processing unit implementing the other node, reading the machine readable code, extracting said arbitrary number, and calculating the hash of said arbitrary number, transmitting, from said other processing unit to the first processing unit via a communication channel, the public key associated with said other node and a signature (of the hash) of the arbitrary number carried out with its private key, at the site of the first processing unit, verifying said signature with the aid of the public key received and of the arbitrary number used to generate the machine readable code, and recording said public key if the verification is successful.

the establishment of a so-called real connection (IRL-connection) between a first node and another node comprises the following steps:

at the site of a first processing unit implementing the first node, generating a passphrase and making it accessible to the user of said first processing unit, at the site of another processing unit implementing the other node, introducing as input said passphrase communicated by the user of the first processing unit to the user of the other processing unit by a communication route involving a human action between the two users, transmitting, from said other processing unit to the first processing unit via a communication channel, the public key associated with said other node and a signature (of the hash) of the passphrase introduced, carried out with its private key, at the site of the first processing unit, verifying said signature with the aid of the public key received and of the passphrase initially made accessible to the user of the first processing unit, and recording said public key if the verification is successful.

a plurality of second nodes have weights of connection with the first node, and wherein the determination of the connection weight of a given second node in relation to the first node is also based on the connection weights of said other second nodes in relation to the first node.

According to a second aspect, a method is proposed for determining the influence of a first node in a network of nodes, implemented by communicating data processing units, a public key and a private key being associated with each node, a node being able to communicate its public key to another node, thus forming a so-called real connection (IRL-connection) between the two nodes, and each node also being able to communicate to another node a public key received from yet another node, thus forming a so-called indirect connection between the other node and the yet another node, the method comprising the determination of an influence factor of a given node based on the number of second nodes having a real connection with said given node and having connection weight values determined by the method in which a plurality of second nodes have weights of connection with the first node, and in which the determination of the connection weight of a given second node in relation to the first node is also based on the connection weights of said other second nodes in relation to the first node, for the different second nodes.

Advantageously, but optionally:

the connection weight of a second node in relation to the first node is also determined based on values of respective influence factors of the third nodes having a real connection with said second node.

the connection weight and influence factor values are determined iteratively until their convergence into values that no longer vary significantly.

According to a third aspect, a method is proposed for establishing so-called quasi-real connections between nodes of a network, implemented by communicating data processing units, a public key and a private key being associated with each node, a given node being able to communicate its public key to another node, thus forming a so-called real connection ("IRL-connected") between the two nodes, and each node also being able to communicate to another node a public key received from yet another node, thus forming a so-called indirect connection between the other node and the yet another node, each node being able to have a specific connection weight in relation to another node with which it has a real or indirect connection, the method including the following steps:

from a first node and a second node between which a connection is to be established, selecting a plurality of intermediate nodes between the first node and the second node, from those having the highest connection weights in relation to the first node, communicating, from the first node to the selected intermediate nodes, an arbitrary number (nonce) intended to be communicated to the second node, via one or more communication channels distinct from the communication channel between nodes, communicating redundantly, from the intermediate nodes to the second node, said arbitrary code as well as the public keys of said intermediate nodes, at the site of the second node, in response to the reception of the arbitrary code, redundantly generating a signature of the arbitrary code with the aid of the private key of the second node and returning to the intermediate nodes said signature as well as the public key of the second node, encrypted with the aid of the public keys of the intermediate nodes, respectively, at the site of each of the intermediate nodes, verification of the signature of the arbitrary code received from the second node, and, in case of success, communication to the first node of the public key of the second node, encrypted with the aid of the public key of the first node, and at the site of the first node, decryption and storing of the public key of the second node, the first and second nodes then being able to exchange encrypted information with a security linked to the connection weights of the intermediate nodes.

Advantageously, but optionally:

the selection of the intermediate nodes is also carried out from among those having the highest connection weights in relation to the second node.

the arbitrary code is generated jointly by a set of nodes formed by the first node and by the intermediate nodes, by the implementation of the following steps:

generation of an arbitrary code at the site of each node of the set, exchange between the nodes of the set, with encryption with the aid of the respective keys of the nodes, of hashes of said arbitrary codes, exchange between said nodes of the set, with encryption with the aid of the respective keys of the nodes, of the arbitrary codes as they are, verification at the site of each node of the set that the arbitrary codes as they are correspond indeed to their respective hashes received in the preceding step, and generation of a final arbitrary code intended to be communicated to the second node by a set combination of the arbitrary codes generated at the site of each node of the set.

said distinct communication channel is based on a social network, and comprising a step of publication by the second node on said social network of a signature of said arbitrary code and its public key.

the method moreover comprises, in response to the success of the step of verification of the signature of the arbitrary code received from the second node, a step of assignment of a connection weight of the second node in relation to the first node.

the method according to the first aspect is implemented in a network comprising nodes with quasi-real connections established according to the third aspect, and the quasi-real connections are considered to be real connections in the sense of the method, with a weight taking into account the quasi-real character of the connection.

According to a fourth aspect, a method is proposed for securing the operation of a network of nodes capable of executing programs (WP) in response to the reception of messages (WM), the nodes being able to be connected to one another in accordance with different connection weights determined by the method according to the first aspect or by the method according to the third aspect, the method comprising, upon reception of a message (WM) at the site of a receiving node, the comparison of the connection weight of the node which emitted this message with the connection weights of other nodes with which the receiving node has real connections, and the acceptance of said message only if the connection weight of the emitting node is equal to or greater than the smallest of said connection weights.

According to a fifth aspect, a method is proposed for securing the operation of a network of nodes capable of executing programs (WP) in response to the reception of messages (WM), the nodes capable of being connected to one another in accordance with different connection weights obtained in particular by the method according to the first aspect or by the method according to the third aspect, wherein, in response to the success of the step of verification of the signature of the arbitrary code, received from the second node, a step of assignment of a connection weight of the second node in relation to the first node is provided, comprising the following steps:

based on the connection weight values, assigning to each node at least one countersigner node which has in relation to it a connection weight greater than a threshold, at the site of each node, maintaining a list of countersigner nodes capable of receiving messages (WM) from the node in question, each node and its countersigner nodes forming a set of mirror nodes, when a message is to be sent by an emitting node to a receiving node, initiating the sending of this message by at least some of the mirror nodes of the emitting node to at least some of the mirror nodes of the receiving node, validating the message only if a given fraction of the emitted messages has been received.

Advantageously, but optionally:

the messages are emitted to all the mirror nodes of the receiving node.

the messages are emitted by the emitting node as well as by the only countersigner nodes of the emitting node that are also countersigners of the receiving node.

a message sent from a first node to a second node is validated by the second node only if the respective sets of mirror nodes of the first and second nodes have an intersection whose number of elements is greater than a certain threshold and if the second node has received this same message (redundantly) from at least a given fraction of said mirror nodes belonging to this intersection.

in a method according to the first aspect implemented in a network comprising mirror nodes according to the fifth aspect, a node is considered to be a countersigner of a given node only if the connection weight of the node in question is at least equal to the smallest of the connection weights of the nodes having real connections with the given node.

According to a sixth aspect, a system is proposed for securing the operation of a network of nodes capable of executing programs (WP) in response to the reception of messages (WM), the nodes being able to be linked to one another in accordance with different connection weights, which is able:

based on the values of connection weights, to assign to each node at least one countersigner node having in relation to it a connection weight greater than a threshold, at the site of each node, to maintain a list of countersigner nodes of nodes which are able to receive messages from the node in question, each node and its countersigner nodes forming a set of mirror nodes, when a message is to be sent by an emitting node to a receiving node, to initiate the sending of this message by at least some of the mirror nodes of the emitting node to at least some of the mirror nodes of the receiving node.

Advantageously, but optionally:

a receiving node that receives a message (WM) validates said message only if the respective sets of mirror nodes of the emitting and receiving nodes have an intersection whose number of elements is greater than a given threshold and if the receiving node has received this same message (redundantly) from at least a given fraction of said mirror nodes belonging to this intersection.

According to a seventh aspect, a system is proposed for securing the operation of a network of nodes consisting of systems-on-chip capable of executing programs (WP) in response to the reception of messages (WM), characterized in that it includes, in combination, the following two architectures:

at the site of each node, an architecture for accessing encrypted programs based on hashes of these programs, which are contained in the incoming messages, at the site of each node, an architecture for determination of countersigner nodes, for duplication of the messages from/to the countersigner nodes, and for determination of the identical character of the messages received.

According to an eighth aspect, a system is proposed for the secure execution of programs in an architecture comprising a set of devices connected in the form of a network, characterized in that it comprises in at least one device, a secure system-on-chip (SoC) in which a private SoC key is stored in such a manner that it cannot be accessed except by the SoC, or the SoC is able to dynamically regenerate this private key (PUF technology), a SoC being able to communicate with another device only by messages and being able to execute programs only in response to the reception of messages, a SoC being able to store at least one program to be executed after encryption by the SoC and to generate a hash of the or of each program making it possible to find the encrypted program again, the device moreover being able to send to the SoC a message containing input data (data) for a certain program to be executed, as well as the hash of said program (#P2), the SoC being able, in response to such a message, in a secure manner, (i) to access the encrypted program to be executed based on the hash (#P2) of the program received in the message, (ii) to decrypt the instructions of the program on the fly, and (iii) to execute the decrypted instructions on the fly.

Advantageously, but optionally:

before emission of a message by the SoC, the SoC inserts the hash (#P1) of the program in the process of execution in the message to be emitted, as well as the signature of this hash by means of said secret private key of the SoC.

before emission of a message by the SoC, the SoC inserts the hash (#P1) of the program in the process of execution in the body of the message to be emitted, which the SoC signs by means of the secret private key of the SoC.

the SoC comprises a cryptographic memory management unit (Crypto Memory Management Unit [CMMU]) in which is stored—or which is able to dynamically regenerate (PUF technology)—the secret key of the SoC which can be accessed only by the CMMU unit which never reveals it, and it is by this CMMU unit that the following are carried out:

said encryption of the program before storing, a memory address allocation (addr1 . . . addr2 range) for the program thus encrypted, said generation of the hash of the program, and said decryption for execution on the fly by at least one processor unit included in the SoC.

the CMMU unit carries out encryption and storing in memory instruction block by instruction block and supplies said processor with one decrypted block at a time to be executed on the fly.

before emission of a message by the SoC, the CMMU unit inserts the hash (#P1) of the program in the process of execution in the message to be emitted, as well as the signature of this hash by the CMMU by means of said secret private key of the SoC.

before emission of a message by the SoC, the CMMU unit inserts the hash (#P1) of the program in the process of execution in the body of the message to be emitted, which it signs by means of the secret private key of the SoC.

a SoC is able to emit a message having the same hash for the program in the process of execution (#P1) and for the program to be executed by the recipient (#P1=#P2), this program (P1=P2) being an executable commitment (smart contract) in the case in which the recipient of said message is a SoC.

According to a ninth aspect, a system-on-chip SoC is proposed, which is intended to form a Wallet Node (WN) node of a network, comprising a crypto memory management unit with encryption (CMMU) capable of ensuring a blind (blind) execution of programs by at least one processor of the SoC, in which:

in the CMMU unit a private key (secret key) is stored (or dynamically regenerated) in such a manner that it cannot be accessed except by the CMMU unit, the CMMU unit is able to store at least one program to be executed after encryption by the CMMU unit and to generate a hash of the or of each program making it possible to find the encrypted program again, said processor is not able to execute programs except upon command of the CMMU unit, the interactions between the system-on-chip and other nodes of the network take place exclusively by messages, and the messages are received/emitted exclusively by the CMMU unit, the messages comprise the identification of a certain program to be executed, identified by its hash, in response to the reception of a message, the CMMU unit (i) accesses the encrypted program to be executed based on the hash of the program received in the message (in particular via a PHT table), (ii) decrypts the instructions of the program, and (iii) transmits the decrypted instructions on said received data to the processor for execution.

Advantageously, but optionally:

the or at least one processor is capable of accessing and manipulating (creation, updating, deletion), via the CMMU unit, persistent state variables (PSV) associated with a given program, which are also encrypted and stored in memory by the CMMU unit and decrypted on the fly.

said program to be executed and its persistent state variables (PSV) are stored in a specific addressing space ensuring their isolation with respect to the other programs.

a message can contain one or more transactions of transfer of units of account (UA) from an emitting node to a receiving node, the units of account received by a receiving node being capable of being transferred again by a transaction contained in a message emitted by said receiving node.

the method comprises a memory space for units of account (tags) received by transactions.

the method is capable of combining units of account of different tags in the same transaction to be emitted, which can be combined and transferred between SoCs.

the CMMU unit comprises means for neutralizing a tag which feeds an emitted transaction, in such a manner that the UA thus consumed cannot be consumed by another transaction.

the CMMU unit comprises means for controlling the use of the tags by the different programs, in such a manner that only an authorized program can feed a transaction to be generated based on a given tag.

said memory is in the SoC.

said memory is separate from the SoC.

a program can alternatively be triggered based upon the elapsing of a timeout for a given program, and the CMMU unit is also able, upon the occurrence of a timeout associated with the hash of a program, (i) to access in memory the encrypted program based on this hash, (ii) to decrypt the instructions of the program, and (iii) to transmit the decrypted instructions to the processor for execution.

the CMMU unit carries out said encryption and storing in memory instruction block by instruction block and supplies said processor with one decrypted instruction block at a time to be executed on the fly.

before emission of a message, the CMMU unit inserts the hash (#P1) of the program in the process of execution in the message to be emitted, as well as the signature of this hash by the CMMU by means of said secret private key.

before emission of a message, the CMMU unit inserts the hash (#P1) of the program in the process of execution in the body of the message to be emitted, which it signs by means of said secret private key.

the CMMU unit is capable of emitting a message having the same hash for the program in the process of execution (#P1) and for the program (#P2) to be executed by the recipient (#P1=#P2), this program (P1=P2) being thus an executable commitment (smart contract) in the case in which the recipient of said message is also a SoC in which, before emission of a message by the SoC, the SoC inserts the hash (#P1) of the program in the process of execution in the message to be emitted, as well as the signature of said hash by means of said secret private key of the SoC.

certain messages (WM) constitute messages of transfer of tags stored in systems with a memory space for units of account (tags) received by transactions, and the validation of a tag transfer message at the site of a receiving node is carried out only if there is a number of nodes greater than a given threshold in an intersection between the set of the mirror nodes of the receiving nodes and the set of the mirror nodes of each one of the upstream nodes from which such a tag was initially transferred.

According to a tenth aspect, a method is proposed for guaranteeing the commitments of a system-on-chip (WN) in an architecture of systems-on-chip (WN) capable of transferring between one another units of account via messages (WM) for the case in which such a system-on-chip were to become non-responsive, comprising the following steps:

(a) upon (any) commitment of a WN providing this commitment (E1) to a beneficiary WN of this commitment (E4), making available to the beneficiary WN (E4) a "PT List" (Potential Transferees List) of potential transferee WN (E51, E52, E53) in the case of non-responsiveness of said provider WN (E1);

(b) synchronizing from said provider WN (E1) the state (PST) of commitment in question to all the potential transferee WN (E51, E52, E53).

(c) after the sending of a message (WM) by said beneficiary WN (E4) to said provider WN (E1), establishing at the site of said beneficiary WN (E4) the non-responsiveness of said provider WN (E1), (d) establishing at the site of said beneficiary WN (E4) a transferee WN which has priority (E51) among the potential transferee WN of said list (PT List), (e) processing said message (WM) at the site of said priority transferee WN (E51), the latter then synchronizing the state (PST) of the commitment in question to the other potential transferee WN (E52, E53) as well as to said provider WN which is non-responsive (E1), (f) for a subsequent message (WM) emitted by a beneficiary WN of a commitment of the said provider WN which was non-responsive (E1), if the latter is still non-responsive, execute the same procedure from the step (c).

According to an eleventh aspect, a transactional system is proposed having a peer-to-peer distributed architecture, implementing transactions which make it possible to transfer units of account between unit emitting nodes and unit receiving nodes, each transaction having as input an input referring to an output of a preceding transaction (or several inputs each referring to an output of a preceding transaction) and having itself at least one new output specifying a number of units of account and a receiving node, wherein each transaction can be validated by insertion in a chain of blocks, which is stored in a distributed manner between the nodes, of a signature of the transaction, characterized in that at least some of the transactions are carried out by nodes capable of ensuring a blindness condition of said transaction, in that it comprises means for processing a set of transactions satisfying the blindness condition in such a manner as to simplify this set as a function of the numbers of units of account and of the addresses of the emitting nodes and of the receiving nodes involved in these transactions, in order to generate a reduced set of transactions and in order to generate and store in the chain of blocks only the signatures of transactions of the reduced set of transactions.

According to a twelfth aspect, a transactional system is proposed having a peer-to-peer distributed architecture, implementing transactions which make it possible to transfer units of account between unit emitting nodes and unit receiving nodes, each transaction having as input an input referring to an output of a preceding transaction (or several inputs each referring to an output of a preceding transaction) and having itself at least one new output specifying a number of units of account and a receiving node, wherein each transaction can be validated by insertion, in a chain of blocks which is distributed between the nodes, of a signature of the transaction, characterized in that at least some of the transactions are carried out by nodes capable of ensuring a blindness condition for said transactions, in that it comprises means for processing a set of transactions satisfying the blindness condition in such a manner as to simplify this set as a function of the quantities of units of account and of the addresses of the emitting nodes and of the receiving nodes involved in these transactions, in order to generate a reduced set of transactions and in order to generate and store in the chain of blocks only some of the signatures of said reduced set and only upon instruction of the nodes in question.

According to a thirteenth aspect, a method is proposed for carrying out a transaction between nodes of a network, which are associated with users and able to transfer between one another units of account and able to communicate between one another by messages, each message designating a WP program to be executed in the node receiving this message, and the users able to broadcast bid elements comprising one or more bid criteria and able to give rise to transactions on the network, the method comprising the following steps:

sending, by an offering node to a requesting node of a user that has emitted corresponding bid elements, of a supply offer message meeting the criterion/criteria and committing said node, and identifying a given WP program, sending, by the requesting node to the offering node, of a message of acceptance of the supply offer, identifying the same given WP program, generation of a certification of performance, existence or availability of the supply that can be accessed by the offering node, and is capable of being verified by said given WP program, verification of the certification by the given WP program at the site of at least one of the two nodes, and if the verification succeeds, generation, at the site of the requesting node, of a message of transfer of units of account constituting the payment for the supply, and sending of this message to the offering node.

According to another advantageous aspect, in a method according to the second aspect implemented in a network comprising nodes with quasi-real connections established according to the method according to the third aspect, the quasi-real connections are considered to be real connections in the sense of the method, with a weight taking into account the quasi-real character of the connection.

BRIEF DESCRIPTION OF THE DRAWINGS

Other aspects, purposes and advantages of the systems and methods described here will be clarified in light of the following detailed description given as an example and provided in reference to the appended drawings, in which.

DETAILED DESCRIPTION OF PREFERRED EMBODIMENTS

Below, depending on the context, the term "user" can designate a particular node of a network, each node having a pair of cryptographic keys. In addition, except when referring explicitly to a human user, the term "user" can designate a device or a program associated with it. For example, an indication of the type "the user A sends such and such data to the user B" will mean that "the device or program associated with the user A sends such and such data to the device or programs associated with the user B." Finally, with respect to a given device or program, the term "user" can in some cases designate another device or program.

Next a description is provided of a certain number of aspects of such a network in which the nodes are "Wallet Nodes" WN associated respectively with users U and capable of communicating with one another by "Wallet Messages" WM, in view of materializing different types of transactions or commitments (typically of the smart contract type) affecting the users U with which the WN are associated. These WN constitute the nodes of a graph with links between the WN constituting the edges of the graph.

The WN can be of different types (soft or hard) and the links between WN can have a certain notation or weighting.

A message WM can be sent by an originating WN to a receiving WN only if the link between the two WN in question satisfies a certain notation and/or weighting.

An example of such a network is described in the application PCT WO2016120826A2 in the name of the applicant, the content of which is incorporated here by reference. The terms "entity," "Wallet Node," "WN" or simply "node" are used to designate a node of such a network, and such a node is identified by its public key or by an address derived therefrom; these terms "key," "address" can be used to mean identifier of a node and vice versa.

Figure 23:
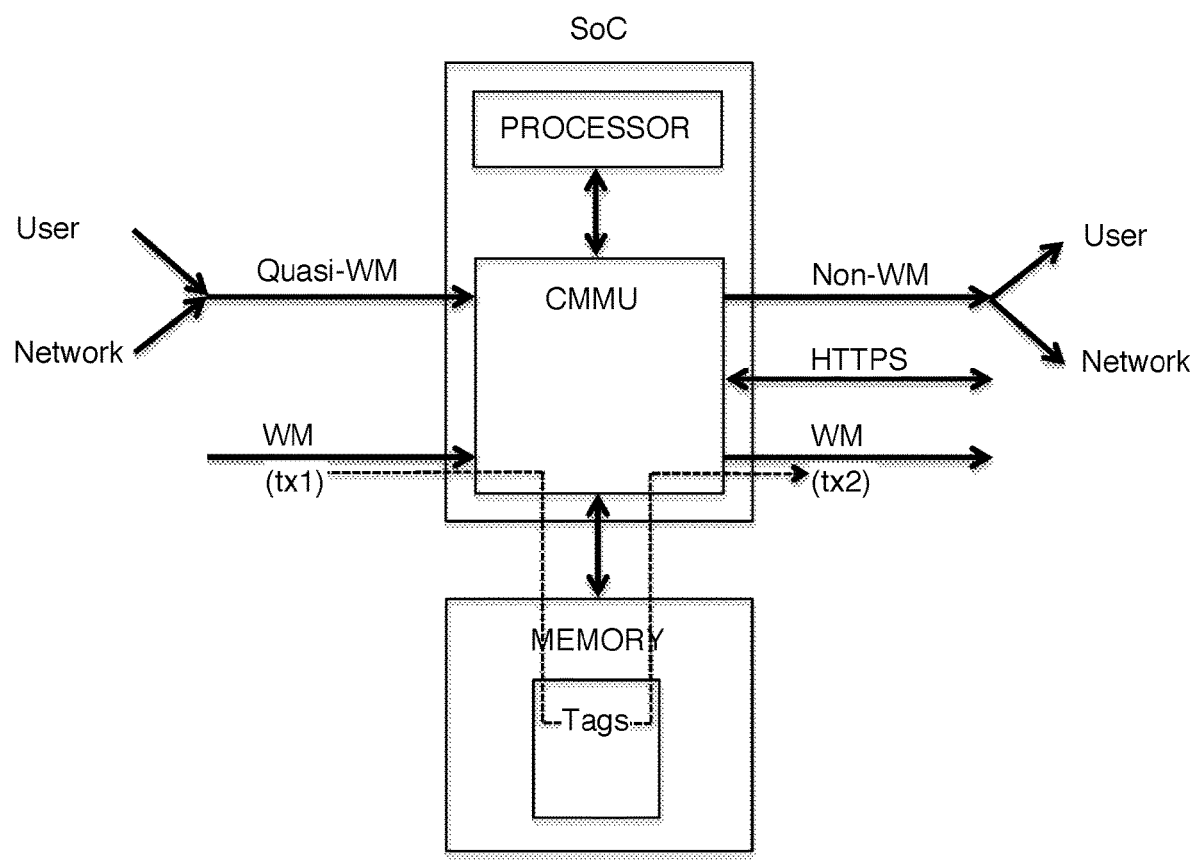
FIG. 23 presents the general architecture of a Wallet Node.

FIG. 23 presents the architecture of a WN. In reference to this figure, the "quasi-WM" messages are messages (received) which are not emitted by WN but which have the same format in the sense that, like the WM, they contain the hash of the WP to be executed upon reception of the message. Thus, for example, when the user initiates a transaction (via its terminal to which the WN is coupled), its "quasi-WM" message includes the hash of the WP for generation of this transaction (this information being added automatically by the terminal). In another example, when a WP outsources a "non-light" processing operation (see below) to a remote computer, the result is returned to it in the form of a "quasi-WM" message including the hash of the WP which outsourced the processing operation to it.

Advantageously, this architecture provides that the processing operations of the processor (PROCESSOR) are light and that the emissions of WM and non-WM messages are non-blocking:

Non-blocking: A response of a WN in relation to a WM is another WM which refers to the first one. Also non-blocking is the execution of a WP waiting for the response of the "User" or "Network" to a "Non-WM" message emitted—"User" being the terminal of the user (such as a computer) and "Network" representing a remote device (such as a computer)—these messages being asynchronous calls whose callback (callback) is transformed into a "quasi-WM" message.

Light: When a WP has to carry out a processing operation which is not light (for example, multiplying two matrixes of a hundred rows by one hundred columns), it outsources it (by a "Non-WM" message) to a computer capable of executing processing operations in a secure environment (such as the SGX enclave of the new Intel microprocessors) and capable of returning a certification of authenticity and of integrity of the execution [https://software-.intel.com/en-us/articles/intel-software-guard-extensions-remote-attestation-end-to-end-example], the response being considered to be a "quasi-WM" message.

The purpose of the "HTTPS" messages emitted by a WN is to enable it to access a source of data (in a "trusted" Web site) in an end-to-end HTTPS protocol. For this purpose, the WN takes charge of the TLS handshakes (which can be implemented using a library such as "mbed TLS" [https://tls.mbed.org/] whose modules are weakly coupled and which makes it possible to use parts thereof without having to include the entire library) and performs all the cryptographic operations, leaving to the terminal to which is coupled the role of an input/output interface taking charge of the low layers (TCP), in order to ensure the integrity of said data end-to-end.

Advantageously, as in the case of the "non-light" processing operations (which are outsourced by non-WM messages), the HTTPS messages considered to be "blocking" are outsourced to a computer capable of returning a certification of authenticity and of integrity of execution (SGX enclave). In practice, the HTTPS messages emitted which turn out to be blocking (after a duration equal to a given threshold) are systematically cancelled and outsourced.

The fact that the messages are light and non-blocking enables an implementation of the WN which does not require the most recent chip manufacturing technology and puts it within the reach of a number of WN manufacturers (and lowers its cost), thus promoting decentralization even in terms of the manufacturers, which is one of the aims of the invention. Below, application classes are described (in the section "knowledge transaction without trusted third parties").

Finally, FIG. 23 shows that the WM are capable of transferring values (tags) in the form of transactions (tx), which is described below in the sections "Tags," "CMMU—Crypto Memory Management Unit" and "Improvements for the CCC."

Next, some aspects and features of systems based on such WN are described in detail.

Decentralized Identity

First, a method will be described for assigning to a WN a connection weight, based on identifications between users of WN taking different paths of the graph, and then different methods using such connection weights will be described.

Communication on Out-of-Band Channel

In order to identify themselves in a decentralized manner, individuals can, via respective intelligent terminals, exchange their respective public keys directly and confirm for each other the attributes associated with them. At this stage, it is essential to protect oneself against an attack from an interposed person, referred to as MitM ("Man in the Middle attack" using the English terminology). The following is an example of a method allowing two individuals to exchange their keys without MitM risk (method which is adaptable for n individuals):

1. A first user (and its terminal, for example, a mobile telephone) approaches another user and shows him a nonce (an arbitrary number used a single time), presented in the form of a QR code generated in its terminal from this nonce.

2. Said other user (who is located in the vicinity, using its terminal) takes a picture of this QR code, interprets it in order to regenerate this nonce, calculates its hash (hash being understood to mean the result of the application of a common predefined cryptographic hash function), and returns to the first user its own uncoded public key and its signature (of the hash) of said nonce. (It should be noted that instead of—or in addition to—the QR code, a secret "passphrase" can be communicated orally, this can take place by telephone if the user is not close by, and the other user calculates in its terminal the hash of this "passphrase" instead of the hash of a nonce, and then returns its signature with its key).

3. The terminal of the first user verifies the signature in relation to the key received and the nonce (and/or passphrase) and records the (public) key of the other user.

4. To the extent that their terminals are reliable (see the description of the Wallet Nodes in WO2016120826A2), the two users can now communicate encrypted information (optionally by generating/using a common symmetric Diffie-Hellman key)—starting naturally with the communication by the first user of its public key (encrypted by means of the public key of the other user). These communications also include keys of other users which each user was able to receive previously using the same method or keys communicated by yet other users to these other users by the same method, and so on.

The node of said first user is said to be "IRL-connected" (IRL for "In Real Life") to the node of each one of said other users who communicated its key to said node by the above-described method, each node being identified by its public key (or an address derived therefrom).

To the extent that (as mentioned above) the nodes also communicate to one another keys of nodes which are not IRL-connected but are connected indirectly via one or more intermediate nodes, each node can reconstitute a portion of the network constituting its "surrounding" and associate a "connection weight" with each node of the surroundings.

Next a description is provided of several embodiments of a method for determining, by a first node (N1, the user), respective connection weights (in relation to the first node) of the nodes (all referred to as "second node") constituting its surrounding.

The methods are illustrated by an example of 8 IRL connections (or "real connections") in the surrounding of a node N1, consisting of six nodes (including N1) for which the connection weight thus is to be determined. The connections are bidirectional and the solid lines represent IRL connections.

These methods are implemented according to configuration parameters (such as thresholds or weighting coefficients) which can advantageously be refined by learning.

It should be noted that the application WO2016120826A2 which is incorporated here by reference describes how to complete such a decentralized identification process, based in particular on user attributes recognized by other users and based on the WN graph.

Connection Weight by Distillation

The method is implemented by the first node (N1) which associates with each node of its surrounding a connection weight and an influence factor (which are implicitly equal to zero by default). Initially, the first node has an influence factor equal to 1 (and all the other nodes implicitly have a zero influence factor). The method comprises the following steps:

Step 1: The connection weight of each second node is the normalized sum of the influence factors of the nodes (referred to as "third nodes") which are IRL-connected to it (or to which it is IRL-connected), added to its previous connection weight. The connection weights are then normalized again (that is to say divided by 2).

Step 2: The influence factor of each third node is the normalized sum of the connection weights of the (second) nodes which are IRL-connected to it.

Step 3: The process is repeated starting from step 1 until convergence (that is to say as long as the difference between the last connection weights determined in Step 2 and the previous connection weights remains greater than a threshold).

Figure 1A:
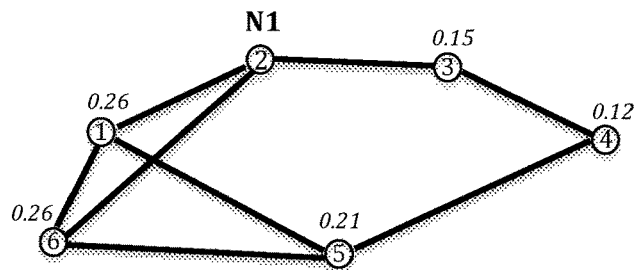
FIGS. 1a, 1b and 2a, 2b present methods for calculating weights of connection of the nodes of the surroundings of the user.

FIG. 1a presents an example of IRL connections between nodes. The connection weights resulting from the method, associated by the first node with the nodes of its surrounding, are indicated on each node. One notes that node 3 which is IRL-connected has a connection weight (equal to 0.15) less than that of node 5 (0.21) which is not IRL-connected, this being due to the fact that the latter is indirectly connected via the cluster of nodes 1 and 6.

Advantageously, the first node (the user) will accept messages (WM) only from nodes whose connection weight is greater than or equal to the smallest connection weight of the connection weights of the nodes with which it is IRL-connected. In other words, for the user, the messages (WM) from the nodes whose connection weight is less than the connection weight of all the nodes IRL-connected to the first node are not valid. Thus, in the example of FIG. 1a, N1 accepts the messages (WM) arriving from any node of its surrounding except from node 4 (whose connection weight, 0.12, is less than the connection weights of all the nodes IRL-connected to the first node, that is to say nodes 1, 3 and 6).

It should be noted that the validation of WM can be implemented with a coefficient applied to the connection weights (determined according to the configuration parameters, as already said). Thus, the messages (WM) from nodes whose connection weight multiplied by a given coefficient is less than the connection weight of all the nodes IRL-connected to the first node are not valid.

Figure 1B:
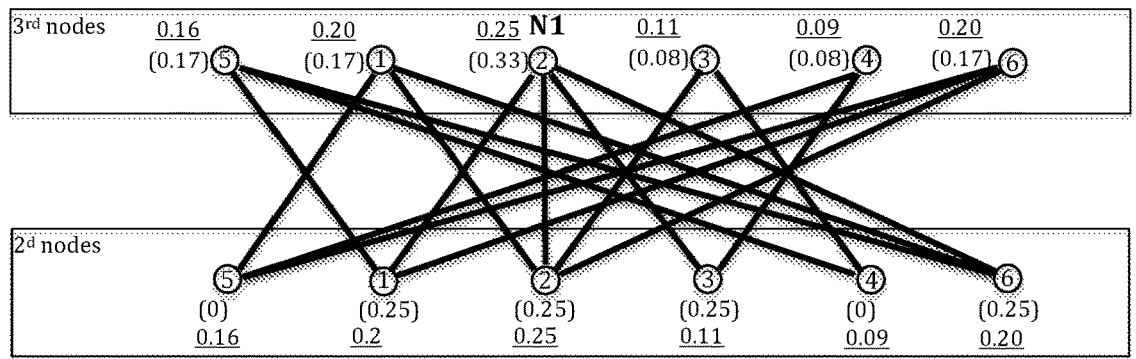

FIG. 1b presents these same nodes placed in a set of second nodes ("$2^{nd}$ nodes") and third nodes "$3^{rd}$ nodes"). The respective influence factors of the third nodes and the respective connection weights of the second nodes are indicated between parentheses insofar as their values after first iteration are, and they are underlined when they have converged.

Finally, in Step 1 of this method, a coefficient (determined according to the configuration parameters, in particular the size of the surrounding) can advantageously be applied to said previous connection weights before addition.

Connection Weights as Proximity

According to this variant, a first node (the user) assigns a "connection weight" to a second node based on the number of intermediate nodes leading to it (and on configuration parameters).

For example, a weight 1 is associated with the first node itself; a weight of 0.5 is associated with the nodes IRL-connected to the first node, and a weight of 0.25 is associated with the nodes that are IRL-connected to the latter nodes, and so on dividing them by two (if that is the parameter) upon each addition of an additional intermediate node.

Each additional path leading to the same node further increases the connection weight associated with this node. For example, if, to a node with which a current connection weight of 0.25 is associated, another path contributes 0.12, the factor associated with this node is increased by half of this additional contribution (if that is the parameter), i.e., 0.25+0.12/2=0.31 (half of the additional contribution is added to the highest contribution).

Figure 2A:
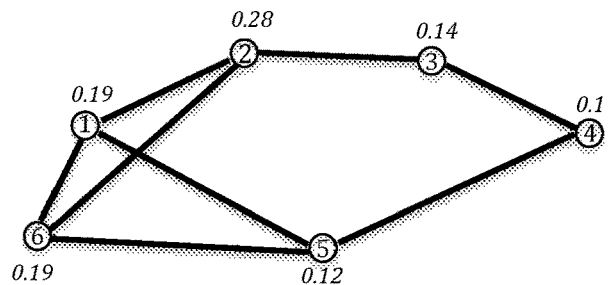

The connection weight is normalized. FIG. 2a shows an example of connection weights as "proximity" to a node N1, which are associated by this node with the nodes of its surrounding.

Mixed Method

A first node (the user) assigns a "connection weight" to a second node as follows:

Among the nodes of the surrounding of the first node,
the more third nodes there are which are IRL-connected
to the second node
and the closer they are to the first node,
the greater the weight of connection of the first node to the second node is,
the influence of the third nodes also being a function of
the connection weights of the second nodes which are IRL-connected to them.

As in the case of the "Connection weight by distillation" method, this circular definition requires an iterative method by successive refining operations until convergence (or quasi-convergence, that is to say until the gain of an additional iteration becomes negligible), method wherein a given node in turn can play the role of second and third node.

An implementation of the method can comprise the following steps:

Step 1: With each node of the surrounding of the user, a proximity factor (proximity to the first node) is associated based on configuration parameters, as described in the previous section "Connection weights as proximity."

Step 2: With each (second) node of the surrounding of the user, a connection weight is associated, which is equal to the (normalized) sum of the respective proximities of the (third) nodes which are IRL-connected to it.

Step 3: With each (third) node of the surrounding of the user, an influence factor is (re)associated, which is equal to the sum of the connection weights of the (second) nodes of the surrounding of the user. This factor is normalized.

Step 4: With each (second) node of the surrounding of the user, a new connection weight is associated, which is equal to the normalized sum (on nodes IRL-connected to the second node) of the "influence*proximity" products, the "influence*proximity" product being normalized, that is to say equal to the normalized sum of the respective influences of the (third) nodes of the surrounding of the user which are IRL-connected to the second node, which are weighted by their respective proximities to the first node (or another combination of these factors, as described below).

Step 5: Repeating starting from Step 3 as long as the difference between the last connection weights determined in Step 4 and the preceding connection weights remains greater than a threshold (based on configuration parameters).

Figure 2B:
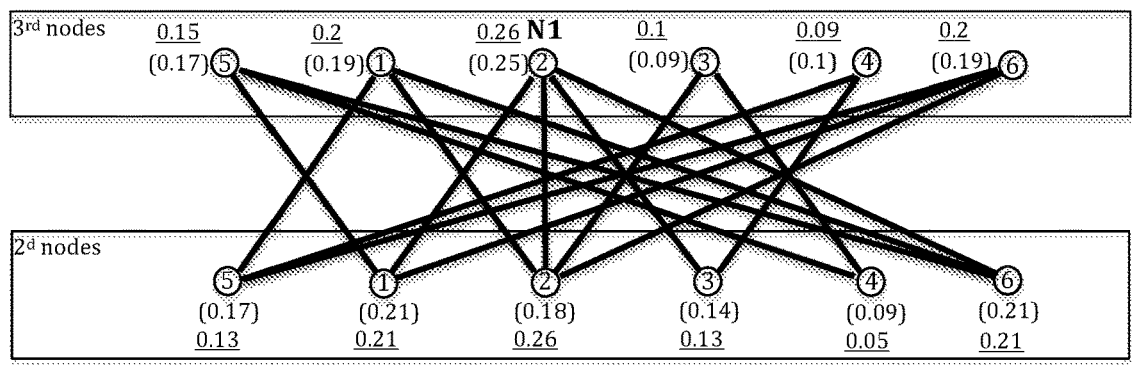

This method is illustrated in FIGS. 2a and 2b based on the same example of a surrounding of 6 nodes whose connection weight is to be determined.

FIG. 2a represents the nodes of the surrounding of the user with their respective proximity factors (calculated in Step 1) in relation to the first node (identified by "2"), factors indicated in italics.

FIG. 2b represents these same nodes in two sets: the set of the third nodes ("$3^{rd}$ nodes") and the set of the second nodes ("$2^{nd}$ nodes"). This figure indicates (in parentheses) an initial connection weight (calculated in Step 2, in relation to the first node) for each second node (as being the sum of the respective proximities of the third nodes which are IRL-connected to it). The initial influence factor (calculated in the first execution of Step 3) is indicated in parentheses to the left of each third node (this factor is equal to the sum of the connection weights of the nodes to which the third node is IRL-connected). The connection weight (in relation the first node) calculated in Step 4 after convergence, is indicated by underlining (in $2^{nd}$ nodes).

In this example, the initial connection weight with the value 0.09 for the node "4" (which is indicated in parentheses in FIG. 2b in the second nodes) is obtained by adding the proximity factors of the nodes "3" and "5" (indicated in FIG. 1a), and then dividing the result of this addition by the total of the connection weights in order to normalize them (0.14+0.12)/2.76=0.09). The initial influence factor of value 0.09 associated with the node "3" (which is indicated in parentheses in FIG. 2b in the third nodes) is obtained by adding the initial connection weights of the nodes "2" and "4" (indicated in parentheses in FIG. 2a in the second nodes), and then dividing the result of this addition by the total of the influence factors in order to normalize them (0.18+0.09/2.96=0.09). In the last steps, the connection weight is obtained by adding up (and by normalizing) the "influence*proximity" products. The method here converges in three steps to provide the value 0.1 for the final influence factor associated with the node "3" (indicated by underlining in FIG. 2b in the third nodes) and the value 0.05 for the final connection weight of the node "4" (indicated by underlining in FIG. 2b in the second nodes). With regard to the final connection weight of the node 5, the method converges to the value 0.13, which is equal to the value for the node 3.

Finally, in a last variant, in Step 4 of the mixed method, the "influence*proximity" term of the expression for calculation of the connection weight can be replaced by an expression of the type "lambda*influence+(1−lambda) *proximity," and the lambda coefficient typically can take on the value 0.5. Advantageously, with each iteration of step 5, this coefficient is increased, the proximity factor (proximity to the first node) of each third node thus gradually making way for the weights of connection to the first node, of the second nodes which are IRL-connected to it.

Various embodiments of the method for determining the connection weights, such as the methods presented above, can be combined. Advantageously, their results can be weighted according to coefficients refined by learning. These results enable the first node (the user) to validate other nodes in the context of the different methods presented in this text.

Redundant Key Communication

The connection weights make it possible to use a connection method similar to the one described above in the section "Communication on Out-of-Band-Channel" but automatically, if a plurality of nodes are used redundantly.

A method implementing this method is described below in an example of a key exchange between a first node (Alice) and a second node (Bob) via intermediate nodes having a high connection weight in relation to the first node. For this implementation, the WN corresponding to these nodes are capable of receiving or emitting messages on a plurality of channels (such as SMS, email, etc.). This method comprises the following steps:

1. The WN of Alice selects N intermediate nodes among those having the highest weight of connection to the Alice node and preferably having, if applicable, the highest weights of connection to the Bob node (here three intermediate nodes are selected [N=3], this number being determined according to configuration parameters, as a function in particular of the value of these connection weights), and communicates to them in an encrypted manner a nonce to be communicated to the Bob node;

2. The WN of said intermediate nodes use a separate and easily automated channel, such as SMS, to (redundantly) communicate the same nonce to the Bob node, as well as their respective public keys (it is even better if they use channels that are different from one another);

3. The WN of the Bob node detects the arrival of these nonces and returns, to said intermediate nodes, its signature of this nonce as well as its public key encrypted by means of the public keys of the latter;

4. The WN of said intermediate nodes verify the signature by the Bob node of this nonce (by decrypting it with its public key and by verifying its hash) and, in case of success, communicate to the WN of Alice, the key of the Bob node signed by themselves and encrypted with the public key of Alice;

5. The WN of Alice then records the key of the Bob node and can then exchange encrypted information with this node.

The keys thus exchanged can then represent connections that are all the more secure the higher the connection weights of said intermediate nodes are and the more significant their number is. The connections with the nodes for which said intermediate nodes have high connection weights and are present in sufficient number are marked "quasi-real," and the method for determining connection weights (such as those described above: "Connection weight by distillation," "Connection weight as proximity" and "Mixed method") likens them to IRL-connections, to the nearest coefficient.

Advantageously, in Step 1 of the above method, instead of the WN of Alice generating said nonce individually, this nonce is generated jointly with the WN of said selected intermediate nodes. This complementary method is also automatic and includes the following steps:

1. generation of a nonce by each one of said WN of the selected N nodes as well as by the WN of Alice (each generates a nonce separately and keeps it secret until step 3);

2. exchange (in an encrypted manner) between these WN, of hashes of said respective nonces which they generated (without yet disclosing the nonces themselves);

3. exchange (in an encrypted manner) between these WN, of uncoded nonces, and each receiving node verifies that the received nonces correspond in fact to the respective hashes received in Step 2;

4. generation of the final nonce (the one to be communicated to Bob) by combination, according to a previously agreed-upon common rule (such as simple arithmetic operations), of said respective nonces which they generated.

Moreover, in Step 2 of the "Redundant key communication" method, the intermediate nodes do not simply communicate the same final nonce to the Bob node, but instead they also communicate the respective nonces which they each generated separately (as described above); in Step 3, Bob signs the set of these nonces received; this allows the N intermediate nodes to ascertain in Step 4 that Bob has in fact received the N nonces communicated to him in total.

Advantageously, in the case in which, on the two sides, the connection weights of a sufficient number of intermediate nodes are high (in relation to Alice and in relation to Bob), the WN of the first node (Alice) obtains the key of the second node (Bob) directly from these intermediate nodes.

Utilizing an Existing Social Network

Now, a "WN app" application on a social network will be described. The user "Alice" of this app constitutes one of the nodes of the social network. This app is capable of receiving and emitting messages on a plurality of channels (such as SMS, email, etc.).

Upon installation, the WN app:
  generates its pair of private/public keys (unless the WN app is coupled with a hard WN, in which case this pair of keys already exists),
  stores a list of directly connected "friends" ("Friends"), provided by the social network;
Friends(Alice)
  and determines (by requests to the friends) which friends have the WN app installed (and the friends who do not have it are invited to install it):
FriendsWN(Alice)

To the extent that certain nodes are IRL-connected and serve as intermediaries, the connection weight of a friend can be determined according to the above-described method, be added as attribute to said list of friends nodes and be made accessible from this list. Thus, the friends having a connection weight greater than a given threshold (this threshold being determined according to configuration parameters) can be found again by a function call such as the following:
FriendsWNConnected(Alice)

To be IRL-connected to a friend node "Bob" which is part of FriendsWN(Alice), Alice can communicate to him via an Out-of-Band-Channel a nonce which Bob must return to her signed, as described above.

However, the social network can be utilized in order to communicate the key of the WN app of the Bob node according to an automatic method (simply by extending the method described in the section "Redundant key communication"):

1. The WN app of the Alice node selects N friends, among the elements of the intersection between Friends WNConnected(Alice) and FriendsWN(Bob), having the highest weight of connection to the Alice node and preferably also having the highest weight of connection to the Bob node (here N=3, this number N being determined according to configuration parameters, in particular as a function of the value of these connection weights), and communicates to them in an encrypted manner a nonce to be communicated to the WN app of the Bob node;

2. The respective WN apps of these friends use a separate and easily automated channel such as SMS to (redundantly) communicate to the WN app of Bob this same nonce as well as their respective public keys (it is even better if these friends use channels that are different from one another);

3. The WN app of Bob detects the arrival of these nonces and publishes its public key and its signature of this nonce in the social network (on its wall)—in addition, optionally, the WN app of Bob returns directly to the WN apps said three friends of Alice, its signature of this nonce and its public key, which are encrypted by means of the public keys of the latter friends;

4. The respective WN apps of said three friends of Alice verify the signature by the WN app of Bob of this nonce (by decrypting it with its key and by verifying its hash) and, in the case of success, communicate to the WN app of Alice the key of the Bob node, signed by themselves and encrypted with the public key of Alice (advantageously, in addition, they certify this key by publishing their own signature on Bob's wall);

5. The WN app of Alice then verifies (double-checks) the key of the Bob node by decrypting its signature published on its wall with this key and by verifying the associated hash of the nonce, records the key of the Bob node and can then, in case of success, exchange encrypted information with the Bob node.

Here again, the connections with the nodes for which said friends have high connection weights and are in sufficient number are marked "quasi-real," and the method for determining connection weights likens them to IRL-connections, to the nearest coefficient.

Advantageously, the public key of Bob published by Bob in the social network is always accessible by at least all the nodes connected to Bob as friends.

And here again, advantageously, in Step 1 of the above method, instead of the WN app of Alice generating said nonce individually, this nonce is generated jointly with the WN apps of said selected friends nodes. This complementary method is the same as the method presented above, except that the WN here are WN apps.

As also described above, said N friends will also communicate to Bob the different nonces (respectively) from which the final nonce was generated, which will allow them to verify that Bob has indeed received the N nonces which they communicated to him in total.

Finally, in the case in which, on the two sides, the connection weights of a sufficient number of intermediate nodes are high (in relation to Alice and in relation to Bob), the WN of the first node (Alice) obtains the key of the second node (Bob) directly from these intermediate nodes. Thus, in order to be connected to the WN app of a "Bob" node, an "Alice" node can ask him (by WM message) for its friends having a high connection weight:

Friends WNConnected(Bob),
and take the intersection with its own highly connected friends:
FriendsWNConnected(Alice),
and, if this intersection is not null, request the key of Bob from a subset of this intersection consisting of the friends selected from those having the highest connection weights.
WN Mirrors Advantageously, a redundancy is created for each node with "mirror nodes" in which the data is kept synchronized and wherein some perform the mirrored processing operations so as to simultaneously:
    alleviate the "non-responsiveness" and
    mitigate the risk of tampering ("tampering").
Definition:

A "node" (Wallet Node) is now a virtual node (notated $VWN_x$ for "virtual wallet node" of the user x), materialized by a plurality of mirror nodes comprising:
    a real node RWN (corresponding to said virtual node) and
    a set of countersigner nodes CWN.

In this aspect of the invention, two nodes (WN) can only be connected by "smart contracts" (see the "Wallet Program" [WP] smart contracts described in the application PCT WO2016120826A2) which are executed on their respective nodes:
    if they are each associated with a number greater than a first given threshold of common mirror nodes having connection weights (in relation to each one of these nodes) greater than a second threshold (thresholds determined according to configuration parameters) and
    when two nodes interact by execution of a smart contract (WP), a message (WM) sent from one node to the other is valid only if at least 10% (or another percentage also determined according to configuration parameters) of common mirror nodes have executed this contract identically ("in mirrored mode") and have emitted an identical message (WM) to the other node.

In other words, a receiving node of a message (WM) validates this message only if the respective sets of mirror nodes of the emitting and receiving nodes have an intersection of which the number of elements is greater than a first given threshold and if the receiving node has received this same message (redundantly) from at least one given fraction (corresponding to a second threshold) of said mirror nodes belonging to this intersection.

For example, the real WN app of the Bob node will consider a WM message sent by the real WN app of the Alice node to be valid only if it also receives this message emitted (in the name of the Alice node) from at least 10% of their common mirror nodes (which are also WN apps, for example).

Each node executing the Wallet Programs synchronizes its data (namely: the persistent state variables (PSV) of its Wallet Programs as well as its "Tags" described below) over the set of these mirror nodes, this set including the union of all of the respective sets of mirror nodes in common with the nodes with which said each node has an active Wallet Program.

Said synchronizations of data are carried out:
    in part by sending (by Wallet Program) WM messages which trigger the updating of the data (PSV and tags) by the (same) Wallet Programs which are executed on the receiving nodes, and,
    for the nodes which do not receive them, the data are synchronized directly by data update notification WM.

Moreover, each node synchronizes the list of its mirror nodes with the nodes with which it has a connection weight which is higher than a threshold, and said data synchronizations are carried out there with respect to these lists of mirror nodes. The synchronization of the lists is carried out by corresponding WM.

Figure 3A:
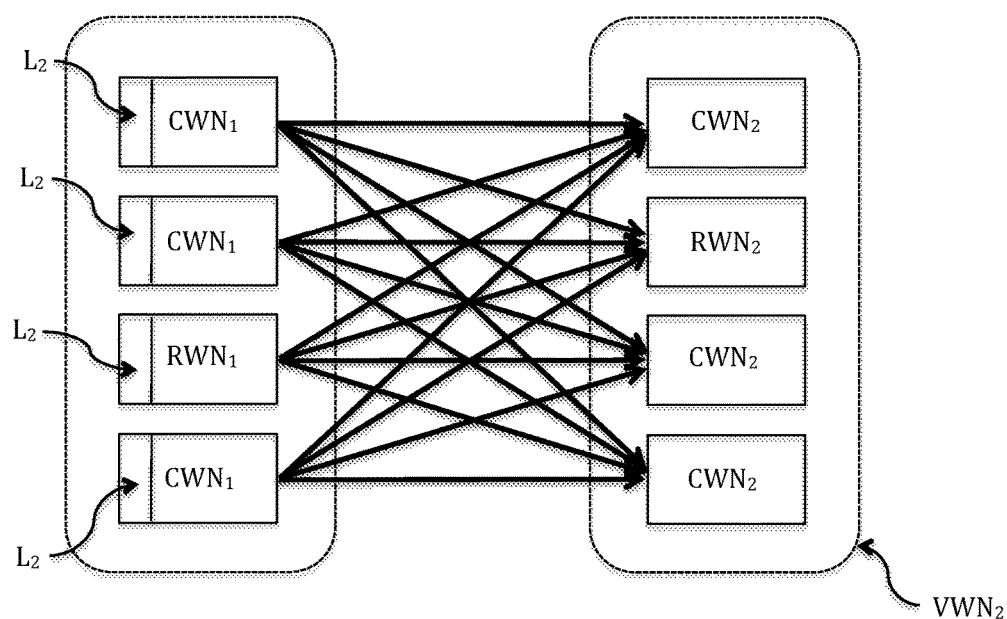
FIGS. 3a to 3d diagrammatically present dispatches of messages between mirror nodes.

FIG. 3a illustrates the propagation of WM from a given VWN1 to a recipient VWN2.

The mirror nodes RWN1, CWN1 each store the list L2 of the mirror nodes of VWN2 in order to be able to route the WM of identical content for all the emitting mirror nodes and the receiving mirror nodes.

Figure 3B:
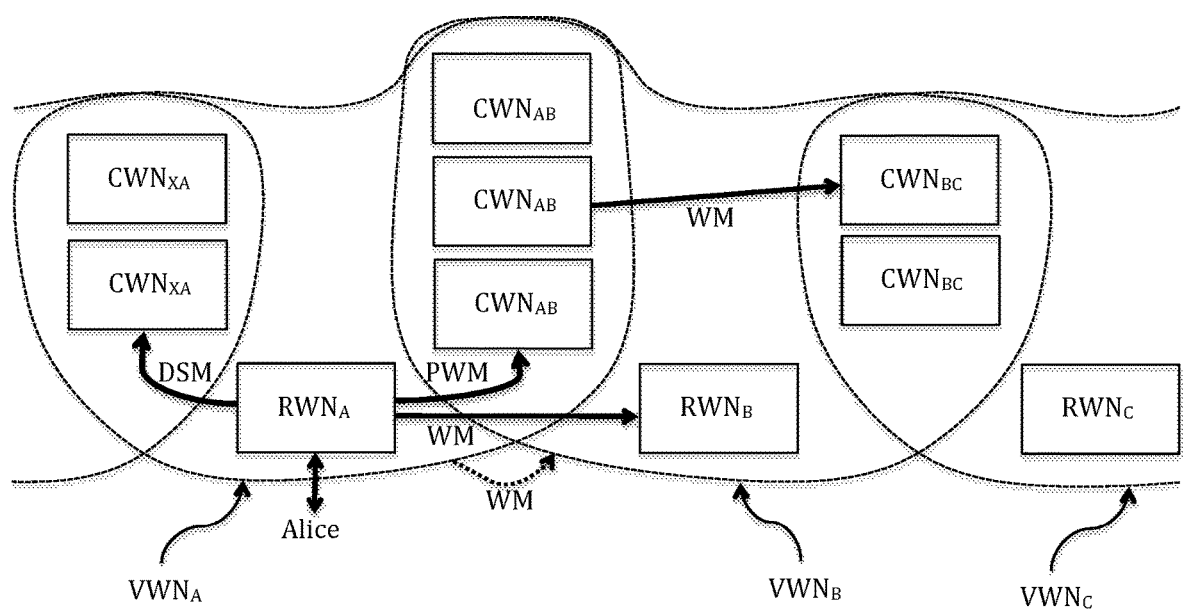

FIG. 3b describes in a finer manner the sending of messages between mirror nodes. It shows two taken from among the sets of common countersigner nodes, $CWN_{AB}$ between the nodes of Alice and Bob, on the one hand, and $CWN_{BC}$ between the nodes of Bob and Carl, on the other hand, the union of these two sets (+the real Bob node $RWN_B$) being the set of the mirror nodes of the Bob node which are synchronized following any WM message sent to the Bob node.

Thus, the nodes of Alice and Carl each know not only their respective mirror nodes in common with the Bob node, but also the entire set of mirror nodes of the Bob node (thanks to the above-mentioned synchronization of the list of mirror nodes).

FIG. 3b also shows a WM message generated by the Alice node following an interaction with the user (Alice), WM message which is to be sent to the Bob node. First, an announcement message (notated PWM for "pre-wallet message") of the WM message is sent by the real Alice node $RWN_A$ to the mirror nodes of Alice CWN which are in common with the Bob node (a single PWM being illustrated so as not to overload the figure), and the other $CWN_{XA}$ nodes of Alice receive a data synchronization message (notated DSM for "data sync message"). Then, the real Alice node $RWN_A$ and each one of the countersigner nodes $CWN_{AB}$ in common with the Bob node send the WM message in question to the Bob node, that is to say to the real Bob node $RWN_B$ and to the countersigner nodes of the Bob node (only some of these WM messages being illustrated so as not to overload the figure).

It should be noted here that when such a WN is to be sent by a CWN to itself, it is not emitted (here $CWN_{AB}$ does not send the WN to itself).

Figure 3C:
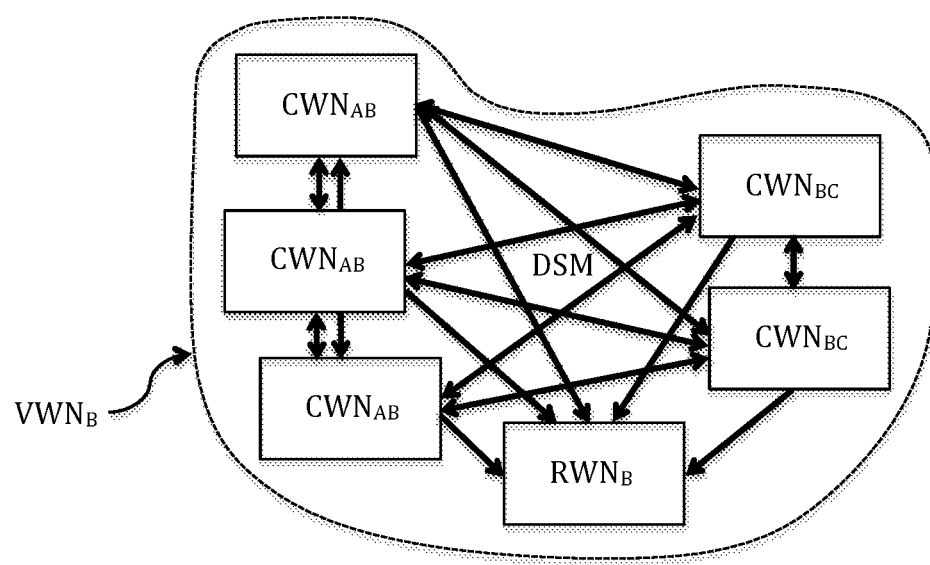

FIG. 3c shows a phase of an attempt at synchronization of the set of the mirror nodes ($RWN_B$, $CWN_{AB}$, $CWN_{BC}$) of Bob via messages of DSM type, in a situation where the real node $RWN_B$ is non-responsive for one reason or another.

Figure 3D:
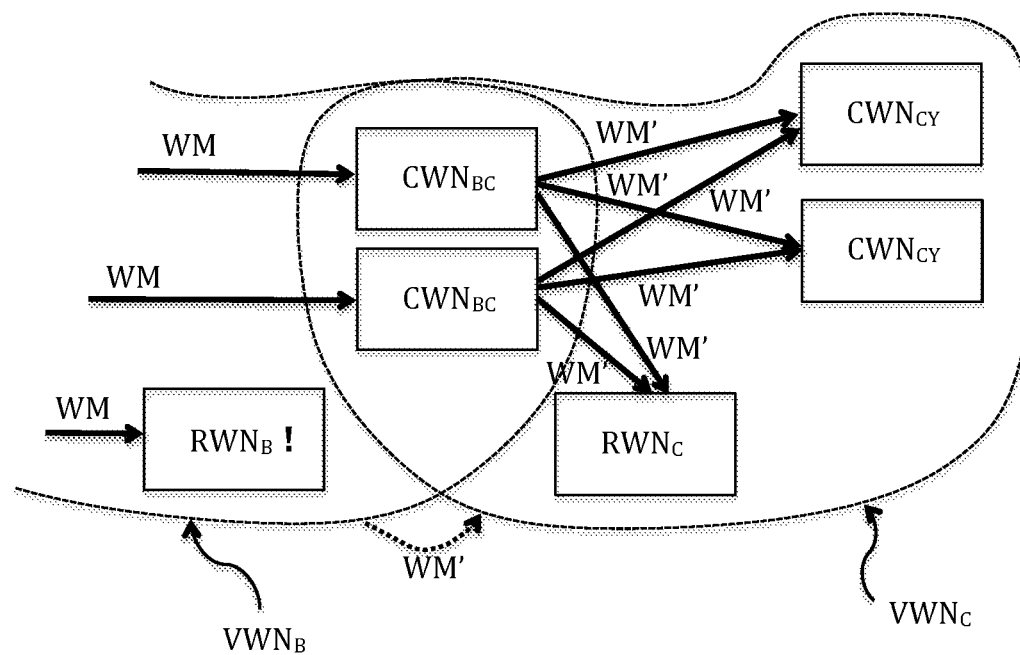

Finally, FIG. 3d shows a WM' message sent by the node $VWN_B$ to the node of Carl $VWN_C$, message which is generated not after an interaction of the real Bob node with its user (Bob), but after said WM message received from the Alice node (generated by the instructions of the executed WP). In this case, the mirror nodes which have in fact received this message from the Alice node are capable of generating said message for the node of Carl (by the execution of this WP). However, FIG. 3d shows that the real Bob node is non-responsive and thus does not emit the WM' message (which is represented by a "!" in the figure) and that, in spite of this, the other mirror nodes of the Bob node send this message to the Carl node $VWN_C$ (which solves the problem of non-responsiveness).

Finally, again, since the WM' message is emitted (by the Bob node) not after an interaction with the user, but by the execution of a smart WP contract (on this Bob node) in response to a WM message (received from the Alice node), each one of the mirror nodes of $VWN_C$ which receive WM' will request the reception of an identical message from 10%

(or another percentage determined according to configuration parameters) of mirror nodes $CWN_{BC}$ in common with this node (of Bob). Carl can thus count on the fact that said message has indeed been generated, and has indeed been generated by the smart WP contract in question which has not been altered (in this way the commitment guarantee problem is solved).

A process of selection of mirror nodes will be described next.

For each node, the connection weights of the mirror nodes are each greater than or equal to the lowest connection weight of the IRL-connected nodes (or nodes in quasi-real connection) of its surrounding. Advantageously, a coefficient can be applied to it: the connection weight of each mirror node must be greater than or equal to the lowest connection weight multiplied by a coefficient (determined according to the configuration parameters), among the connection weights of the nodes to which it is IRL-connected (and by another coefficient for the nodes in quasi-real connection).

Among said common mirror nodes between an emitting node and a receiving node of a WM, at least one (or a certain number, according to the configuration parameters) of them is a hard WN (a hard WN is a SoC as described in the application PCT WO2016120826A2 and below in the "CMMU" section), the public key (corresponding to the secret private key) of each hard WN being certified by its manufacturer, and these hard Wallet nodes can come from different manufacturers—however, the messages exchanged between nodes are only valid if the nodes of their manufacturers themselves are linked by mirror nodes from common manufacturers (see the description below).

In the case in which a conflict is detected for mirror nodes of a given node (conflict detected during synchronizations between the mirror nodes associated with a node, or following the reception of incompatible WM from mirror nodes of said given node, etc.), the node which detects this conflict reports the information of the keys of the mirror nodes which are in conflict to the respective manufacturers, and these keys are then revoked by these manufacturers. Then, after the recycling thereof, they are replaced. This is implemented according to the following steps:

associated with each manufacturer is a hard WN representing it and of which it is itself the manufacturer (certifying its own public key);

each manufacturer node is IRL-connected to the node of every other manufacturer that communicated its key to it by the method described in the section "Communication on Out-of-Band-Channel," some of which also communicating to it keys of other manufacturer nodes which are thus indirectly connected, each thus constituting its surrounding, a connection weight being associated with each node of the surrounding as described above;

for any WM to be validated by its receiving node, the respective sets of mirror nodes of the manufacturer node of the emitting node, on the one hand, and of the manufacturer node of the receiving node, on the other hand, must have an intersection, the number of elements of which is greater than a given threshold (this in addition to the two conditions specified above concerning the mirror nodes of the emitting and receiving nodes)—and thus, to the extent that hard Wallet Nodes from different manufacturers have to be able interact, mirror nodes are associated with the nodes of these manufacturers;

in case of conflict (during a synchronization (by DSM message) or upon reception of incompatible WM from mirror nodes of the same emitting node, etc.), the information of the keys of the mirror nodes which are in conflict is communicated by sending messages (WM) to the nodes of their respective manufacturers (and, if they are different, to their respective mirror nodes);

the manufacturer nodes (that is to say the mirrors thereof) record the keys of mirror nodes in conflict in a revocation list;

the mirror nodes in conflict which are hard WN are replaced by the respective manufacturers;

in the case in which the conflict is resolved, said synchronization (DSM) and/or the WM message which, if applicable, was suspended since in conflict, is resumed/resent, respectively;

in the case in which the conflict persists, the majority of the hard WN is considered to be bona fide, and the mirror nodes which differ from them are invalidated and blacklisted.

The information of the blacklisted nodes is immediately communicated to the nodes of the surrounding of the user and from those to the nodes of their own surroundings, and so on (and the method can be sophisticated, depending on the state of the art and the progress in the field of the byzantine consensus protocols).

It should be noted that a cost token, analogous to the "gas" of Ethereum (see *Ethereum: A secure decentralized generalised transaction ledger*, EIP-150 revision, Dr. Gavin Wood—Appendix G. Fee Schedule—http://paper.gavwood.com/), which makes it possible to identify the relative cost between the operations (calculations, storage, access to the memory, etc.) of a contract execution, can be used to control the processing operations by the mirrors.

WN Emitting a Message to the Outside World

For sending a message to the outside world (that is to say to an entity which is not a WN), each mirror WN which is a hard WN proposes, to the other hard mirror WNs, if applicable, to emit itself the message in question, and the first wins. The method includes the following steps:

a first hard mirror WN proposes to the other hard mirror WNs (if applicable) to emit the message in question, proposal which expires after a previously agreed upon duration (according to a configuration parameter);

when such a proposal is received by a hard mirror WN, if this proposal precedes another proposal received or emitted (for said message in question), it is then approved; otherwise it is rejected;

when the number of approvals is greater than half the number of hard mirror WNs which have responded, this proposal is assigned, the message in question is then actually emitted, and the other hard mirror WNs are notified that the message in question has in fact been received.

Depending on the cases, the need to emit the message in question can be closed directly or when a return arrives from the recipient. The person skilled in the art will moreover be able to make use of the state of the art as relates to byzantine consensus protocol.

Tags

Figure 7:
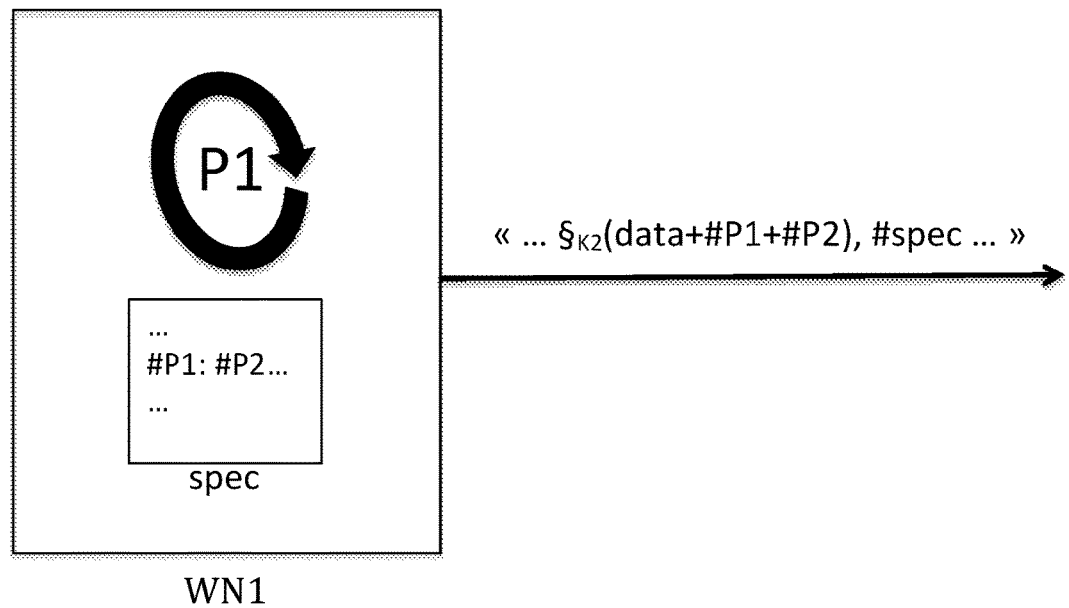
FIG. 7 illustrates a message including a specification of the set of the hashes of the valid executable codes.

Reference is made here again to the concept of "Wallet Node" WN described in detail in the document WO2016120826A2 in the name of the applicant. FIG. 7 of WO2016120826A2 presents a payment of 10 units of account (UA) of a node "WN 1" to a node "WN 2." These 10 UA are subtracted from the balance ("balance") of WN1 and added to the balance WN 2, these balances being persistent state variables (PSV for "Persistent State Variables") on these WNs.

Figure 4:
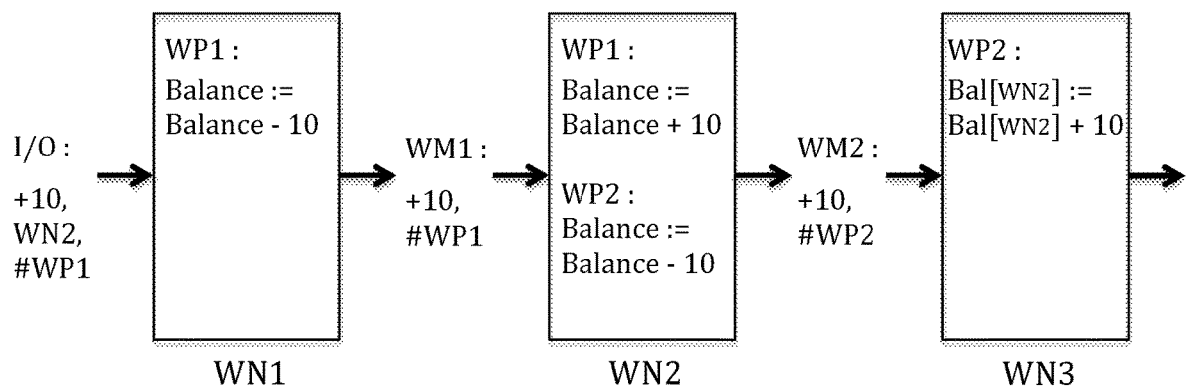
FIG. 4 illustrates a use of a persistent state variable (tag) by two WP programs on a Wallet Node.

In reference to FIG. 4, it will next be considered that such UA balances are not PSV of a certain particular WP executed in a WN, but are data referred to as "tags" (or "value tags"), which are usable on the WN regardless of the WP which executes it. UA supplied in the form of a tag by a WP thus belong to the WN and can be used by another WP on the same WN—they are persistent state variables for the WN considered overall.

To consider an example, the user WN2 who receives a message WM1 of payment from a node WN1, after a sale which the latter carried out, executes a payment Wallet Program WP1 and then pays an insurance premium by executing an insurance Wallet Program WP2. Thus, in the example presented in FIG. 4, 10 UA are transferred from WN1 to WN2 by means of a message WM1 emitted by executing WP1 (this message comprising the hash #WP1), and these 10 UA are paid by WN2 to pay an insurance premium, by executing WP2 which sends a message WM2 (comprising the hash #WP2) to a node WN3.

In order to be concrete, as tag UA, BTC (Bitcoin units) are considered below, which come originally from a Bitcoin transaction inserted and confirmed n times in the Bitcoin blockchain (as explained below, in this case, the secret private key of the beneficiary WN is a private key corresponding to a Bitcoin address), without this being a limitation, since the same mechanisms can be used for any types of UA, in particular UA created ex nihilo by WN, such as, for example, in gift cards (Gift Cards). In particular, the application WO2016120826A2 describes certain uses of tags which are created by an "OWN" ("Owner Wallet Node") owner node, which have attributes certified by "VWN" ("Viewer Wallet Node") nodes in the context of a transformation chain or a logistic chain (Supply Chain) (or else a commercial chain) and which are transferred from one OWN to another, reflecting the fact that the product instances (the physical or immaterial products) which they represent are transferred in the real world between the users of these OWN Wallet Nodes.

Figure 5A:
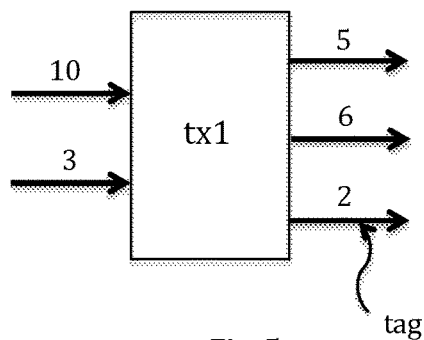
FIGS. 5a and 5b diagrammatically present tag transfer transactions.
Figure 5B:
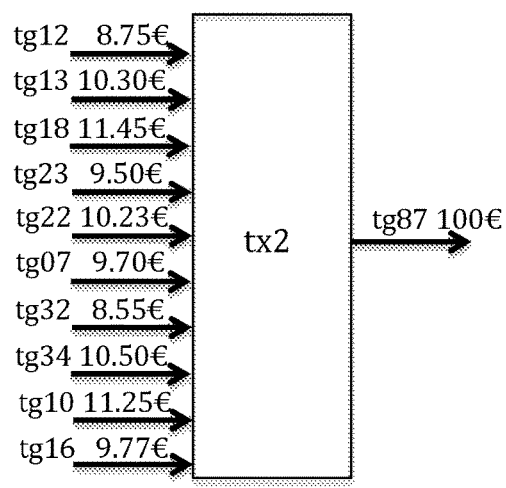

Such tags can be recomposed (that is to say merged or decomposed) in a transaction to yield other tags. For example, in reference to FIG. 5a, in a given transaction (tx1), a tag of 10 UA and a tag of 3 UA constituting the inputs of the transaction can be recomposed into three tags constituting the outputs of the transaction, here a tag of 5 UA, a tag of 6 UA and a tag of 2 UA, the total of the UA being preserved (the UA unit in question has not been indicated in the figure, it can be BTC, for example). "Tag transfer transaction" here will refer to such transactions. A tag transfer transaction is generated by the WN (OWN) capable of signing the outputs of the transactions which specify its signature key. It should be noted that this model subsumes the Bitcoin transaction model (among others): a Bitcoin transaction is a particular case of tag transfer transaction. Another tag transfer transaction is illustrated in FIG. 5b which shows the case of 10 fish (10 different tags), each having a different value in Euros, transformed (for example, cut up) into a fish box (the box having an individual tag having the label "tg87") with a value of 100 Euros, this transaction tx2 being generated by owner OWN of the 9 fish.

It should be noted that the particular case of a transfer of a tag from one OWN to another, even without merging or decomposition, will always be represented here by such a recomposition transaction, this for the purpose of simplicity of implementation. The implementation of the processing of the tag transfer transactions will be described in the section "CMMU").

Now, in reference to FIG. 6, a method for using mirror nodes (described below) will be described, for the purpose of mitigating the risk of double-spending in a succession of tag transfer WM, this method making it possible in particular to implement off-chain Bitcoin transactions (the use of the blockchain becoming optional). This Figure shows a message notated "$WM_{CY/tgx}$" sent by the Carl node to a Y node (of which only countersigner nodes "$CWN_{CY}$" in common with the Carl node are in the figure). This message $WM_{CY/tgx}$ transmits a transaction whose predecessor transactions (in the "tgx" chain of successions of tags) were transmitted beforehand by the messages $WM_{XA/tgx}$, $WM_{AB/tgx}$ and $WM_{BC/tgx}$. The purpose of this figure is to show that the Carl node is assured of having one or a certain number of mirror nodes in common, of which one is (or some are) hard WN, with all the upstream nodes, including here with the Alice node (this is indicated in the figure as follows: "$CWN_{CY}=CWN_{XA}$").

Let us recall that a Bitcoin transaction is equivalent to transferring BTC by signing (with a private key) at least one output of a previous transaction which allocates them to at least one new owner, the Bitcoin address of which is derived from its public code. Here, we consider the case in which the secret private key of a WN is a private key corresponding to a Bitcoin address (that is to say the WN generates a Bitcoin address from its secret private key). A WN is thus able to generate a Bitcoin transaction whose input (or one of whose inputs) is connected with an output (which is intended for it) of an upstream transaction (output which, for example, the user of said WN was able to access due to the fact that said transaction is published in the blockchain and which input it in said WN as input into its terminal) and (optionally) to announce (broadcast) said transaction so that it is inserted in the blockchain. This should be understood to mean that there is a real and properly formed Bitcoin transaction which is generated by said WN, although below (in the section "Off-chain Bitcoin transactions") an explication of precisely the advantages of not inserting it therein is given.

BTC spent by a WN can originate from a succession of off-chain transactions, forming a graph and transferring BTC from one or more nodes to one or more other nodes, and the intention is to mitigate the risk of double spending on any one of these nodes generating these transactions. This is achieved by the following additional condition (which is added to the conditions specified above concerning the mirror nodes of the emitting and receiving nodes of a WM): For a WM transferring a given tag (for example, 0.5 BTC) to be validated by its receiving node, the set of the mirror nodes of the receiving node must have an intersection, the number of elements of which is greater than a given threshold, with the set of the mirror nodes of each one of the nodes of the upstream graph (of tag transfer transactions) from which this tag originates and at least one or one of them (or certain number of them) must be hard WN. The implementation of the execution of the method by a WN thus includes the passing from downstream to upstream through the graph of the WM conveying tag transfer transactions and the verification of said condition of intersection of mirror nodes.

Advantageously, each tag includes the information of the graph of the upstream tag transfer transactions, each indicating the address of the WN which generated it (these WN are referred to as "upstream WN"), which enables a receiving WN of a tag transfer WM to verify directly whether at least one mirror (or a certain number) of all the upstream nodes in its surrounding is part of its own mirror nodes and is a hard WN, and for each upstream WN which is not covered by this case, whether the connection weight of one of its mirrors which is a hard WN would enable it to be part of them (after possible exchanges of new connections with nodes of its surrounding). Thus, more precisely, associated with each tag are all the upstream tags (that is to say those appearing in the upstream graph, in all the chains of successions of tag transfer transactions leading to the tag in question), with the address of the owner node which generated it and, if applicable, the address of each one of its subsequent owners (OWN) as well as the addresses of their mirror nodes, which enables each receiving node of a WM transmitting a tag transfer transaction to directly verify the intersection required between its own mirror nodes and said addresses of mirror nodes of each one of these owners, as well as the fact that at least one (or some, according to the configuration parameters) are hard WN, and a search for nodes having high connection weights is launched if necessary in order to associate new mirror nodes.

Knowledge Transaction

The ability of the WN to outsource processing operations to trusted computers (capable of returning a certification of authenticity and integrity of execution, such as computers provided with Intel microprocessor[s] having SGX enclaves) makes it possible to implement a knowledge transaction without trusted third parties directly and more simply than in the state of the art of the smart contracts:

Let us assume, for example, that the user U1 (having a Wallet Node WN1 with public key K1) is looking for another user U2 (WN2, K2) who sells it a secret (S1) which U2 knows and which U1 does not know, but for which U1 knows the hash H(S1) for one reason or another, and that U1 is ready to pay for this service rendered an amount $R1 (R for Reward) which is currently available in the balance (of tags) of WN1 of U1.

More precisely, such a purchase bid from a WN with key K comprises a set of elements {H(S);$R;$P;T[;params]} announced on this market with signature SigK({H(S);$R;$P;T[;params]}) of this WN, where $P is a penalty which a supplier who agrees to supply at time T must pay if he does not do so (see also the "Scenario of use" below). Subsequently, the term {H(S);$R;$P;T[;params]} is also referred to as "bid elements."

Substantially here is how the method works:

1. U1 makes available and broadcasts a Wallet Program (WP1) making it possible to emit three types of messages (only the essential elements have been indicated and in an abstract manner; we shall see the precise components of a WM below):

WMBid: WM(Sig, #WP1) which communicates a service offer declaration for a service "Sig" (corresponding to a signature of bid elements by a WN, as described above), message of which the recipient is the signer of Sig and which, in case of acceptance by the latter, commits its emitter (the one who offers the service in question) to paying a penalty of an amount $P in case of failure to supply within the given time limit T;

WMAccept: WM(WMBid, #WP1) which communicates, in response to a given message WMBid, the acceptance of the service offer in question and which commits its emitter to paying the amount $R (specified in the bid elements in question) upon reception of a message WMS comprising the secret whose hash corresponds to H(S) (specified in the bid elements in question); and WMS: WM(WMAccept, S, #WP1) which communicates the secret S in response to a given message WMAccept and triggers on the receiving WN the verification thereof (with respect to the H(S) specified in the bid elements in question in the previous messages) and, in the case of success of this verification, the generation on the receiving WN of a transaction of payment of the amount $R (also specified in the bid elements) sent to the emitter of this message WMS by a final WM of the receiving WN.

Moreover, upon reception of a message WMAccept, WP1 is able to outsource the processing operations (here processing in order to search by brute force for the secret S) to a trusted computer capable of returning a certification of authenticity and of integrity of execution, certification which will be verified automatically by WP1 before emission of the message WMS.

2. U1 announces its bid {H(S1);$R1;$P1;T1[;params1]} which it broadcasts with its signature Sig1({H(S1);$R1;$P1;T1[params1]}).

Here is the scenario of use:

Let us assume that the user U2 of WN2 does not already know this secret S and let us also assume that the parameters params1 include the indication of the maximum number of characters of the desired secret, number which indicates that the trusted computer will be able find the desired secret by brute force searching within a reasonable time. U2 then decides to have its Wallet Node WN2 send to the Wallet Node WN1 of U1 the message WMBid2: WM(Sig1, #WP1)

as service offer, then (since U1 accepts this service offer), WN1 replies to it with the message WMAccept1: WM(WMBid2, #WP1)

as acceptance, which (either automatically or upon command of the user U2, which can, for example, select the trusted computer to outsource to) triggers the outsourcing in question to a trusted computer. Later, when the result—the desired secret S1 corresponding to H(S1)—is returned by this trusted computer, WN2 automatically sends the message WMS2: WM (WMAccept1, S1, #WP1)

which communicates the desired secret S1 to WN1, and upon receipt of this message and verification of the correspondence of the hash of the secret received with H(S1), WN1 generates the payment transaction of $R to WN2 and sends it (by WM) to WN2.

It should be noted that the bid elements can also represent a sales offer, and the approach of the method makes possible the negotiation by bid and counter-bid iterations, the bid elements being capable of evolving in these iterations, and the messages then being essentially as follows (if one considers that the first message, here WMBid, is sent by the supplier):

WMBid: WM(Sig, {H(S);$R;$P;T[;params]}, WP1) which communicates a counter-bid {H(S);$R;$P;T[;params]} with respect to "Sig," message of which the recipient is the signer of Sig and which, in case of acceptance "identically" by the latter, commits its emitter (the WN which offers the service in question) to paying a penalty of the given amount $P in case of failure to supply within the given lapse of time T;

WMAccept: WM(WMBid or WMNewBid, {H(S);$R;$P;T[;params]}, #WP1) which communicates a counter-bid in response to a given message WMBid or WMNewBid; in the case in which {H(S);$R;$P;T[;params]} is identical to the bid elements of the latter, this message WMAccept commits its emitter to paying the given amount $R upon receipt of a message WMS comprising said secret whose hash corresponds to H(S); also, in the case in which, within a (previously agreed upon) time limit, a message WMNewBid offering identical bid elements arrives, this message WMAccept directly commits its emitter to paying the given amount $R upon reception of a message WMS comprising the secret whose hash corresponds to H(S);

WMNewBid: WM(WMAccept, {H(S);$R;$P;T[;params]}, WP1) which communicates a counter-bid {H(S);$R;$P;T[;params]} in relation to a given bid WMAccept and of which the recipient is the emitter of this message WMAccept; in the case in which {H(S); $R;$P;T[;params]} is identical to the bid elements of this given message WMAccept, this message WMNewBid directly commits its emitter (the one who offers the service in question) to paying the penalty of an amount $P in case of failure to supply within the given lapse of time T (without waiting for a new acceptance message WMAccept);

WMS: WM(WMAccept, S, #WP1) which communicates the secret S in response to a given message WMAccept and which triggers on the receiving WN its verification and, in case of success of this verification, the generation of a transaction of payment of the amount $R sent to the emitter of this message WMS by a final WM from the receiving WN.

A variant of this method consists in shifting to said trusted computer, in addition, the task of verification of the result supplied, and said trusted computer provides a corresponding certification (of the authenticity and the integrity of the processing operations performed for this verification) which serves as proof.

Thus, at the time of the supplying of the result S1, instead of a simple message "WMS2: WM(WMAccept1, S1, #WP1)," WN2 returns a message WMA2: WM(WMAccept1, S1, A2, #WP1)

in which A2 is said certification of this successful verification carried out in said trusted computer, and WN1 then does not have to perform this verification before generating the transaction of payment of $R to WN2.

In a variant and to provide additional security, the certification A2 is returned without immediately supplying the result S1, and this result is supplied after the WN1 returns (a WM comprising) a transaction of payment (which is at least partial, the payment being then completed by sending a final transaction after reception of the result S1—it should also be noted that, in the case in which the result can be partitioned, several payment-partition iterations can succeed one another until the supply has been completed).

The fact of communicating such a certification (A2) covers a broader field of application, in fact said verification can sometimes consist of long and costly processing operations (in contrast to the above example which involved only the verification that the hash of the result S1 supplied corresponds to the H(S1) specified at the start) or processing operations which simply do not have to be carried out in a Wallet Node, a Wallet Node being intended to manage only agreements (agreements) between nodes and having to remain available (in performances) for this purpose.

Finally, a problem resolution auction transaction can be created, ensuring, for example, that a supplier offering a better offer (which is more complete and/or more rapid and/or . . . ) seals a deal. Such an offer can consist not only of the contribution of a solution to a given problem but also of processing operations of verification of an offered solution (in the software testing sector, for example).

The possibility of WNs of outsourcing processing operations to trusted computers also extends the power of the WN network, the WN network making it possible to dispense with neutral third parties in the exchanges, since each WN can be produced at low cost, using accessible and relatively common technology, by a plurality of manufacturers, precisely thanks to this outsourcing possibility which allows the WN to handle only the processing concerning the exchanges (the exchange conditions, the payments, etc.).

"Blind Proxy"

The Wallet Nodes make it possible to implement processing operations without disclosure of the processed data or of the code executed in these processing operations.

Let us consider a "Client" device and a "Blind Proxy" device (or "Proxy"), Client running on Proxy an executable code "P" (as Program) based on data "I" (as Input) which it sends to Proxy.

The execution model adopted for this executable code P is a finite state machine, the execution of which is triggered by the reception of an incoming message and capable of emitting outgoing messages. Thus, its reception of an incoming message results in the generation of 0 to n outgoing messages and 0 to m state changes (persistent states).

Associated with Proxy is a pair of public/private keys, the public key ("K2") of Proxy having been certified beforehand, in the form of a decryptable signature with a certain public key "K" (in the name of the manufacturer of the SoC, "on behalf of the SoC manufacturer"), in order to guarantee the "blindness" property of the Proxy and including the execution integrity guarantee (referred to as "hash-locked execution," "hash" being rendered by "haché").

Let us consider first the following method for producing a "Blind Proxy." Below, the symbol "§" is used for an encryption; the letter "P" which can be followed by a number (P1) is used for a program; the letter "K" which can be followed by a number (K1) is used for a key, said key being the public key in the case of generation of an encryption (such as in $\S_K P$) and the private key in the case of the key used to generate a signature, such as in $\text{sign}_K(X)$. This Blind Proxy method is as follows:

Provide Proxy to Client:

1. Provide (on behalf of the Proxy manufacturer) certification public key (K) (accessible by Client)
2. Generate Proxy's public key (K2)
3. K2 is certified with $\text{sign}_K(K2)$ (i.e. decryptable using K)
4. Proxy sends K2 to Client (and {K2, $\text{sign}_K(K2)$} is accessible by Client) Client provides an executable code (P) to Proxy:
5. Client encrypts P using K2 ($\S_{K2}P$) and sends $\S_{K2}P$ to Proxy
6. Proxy decrypts $\S_{K2}P$, hashes P (#P) and stores $\S_{K2}P$ in association with #P, in a table PHT (Program Hash Table)
7. Client hashes P (#P)

For each execution request:

8. Client encrypts I+#P ($\S_{K2}\text{input}+\#P$) using K2 (or $\S_{K2}\text{input}+\#P+K1$, where K1 is Client's public key)
9. Client sends to Proxy $\S_{K2}\text{input}+\#P$ and K1 (or $\S_{K2}\text{input}+\#P+K1$), along with a nonce (nonce) (or sends $\S_{K2}\text{input}+\#P+K1+\text{nonce}$)
10. Proxy ("blindly") decrypts $\S_{K2}(\text{input}+\#P \ldots)$ as well as $\S_{K2}P$ ($\S_{K2}P$ being retrieved from PHT using #P)
11. Proxy (blindly) runs P (decrypted on the fly) with I (once decrypted), encrypts the results using K1 ($\S_{K1}\text{output}$) and returns nonce and $\S_{K1}\text{output}$ (or all encrypted together) along with $\text{sign}_{K2}(\text{nonce},\S_{K1}\text{output} \ldots)$ to Client, without the owner of Proxy being able to see I, P or these results
12. Client decrypts the results and checks them by decrypting their signature with K2.

As mentioned above, advantageously, in Step 8, instead of simply encrypting I+#P with the key K2 of Proxy, Client encrypts I+#P+K1 ($\S_{K2}\text{input}+\#P+K1$), and in Step 9, Client communicates its public key K1 by sending $\S_{K2}\text{input}+\#P+K1$. Proxy then returns the results to Client (at its address which can be #K1) without K1 being disclosed. According to another option, nonce can also be part of the body of the encrypted message ($§_{K2}$input+#P+K1+nonce), and, in the message returned by Proxy to Client, it also appears in encrypted manner ($§_{K1}$output+nonce). For simplicity and clarity, these options, which the person skilled in the art will know how to implement easily, are not repeated below. What is important here is the fact that #P is not disclosed, so that the user or owner of Proxy cannot establish its relationship with Client.

In a possible implementation (other implementations can naturally also be considered), the message from Client to Proxy comprises:

message: $§_{K2}$input+#P, K1, nonce and the return (from Proxy to Client) comprises:

message: nonce, $§_{K1}$output, [K2,] $\text{sign}_{K2}$(nonce, $§_{K1}$output), (or simply message: $\text{sign}_{K2}$(nonce,$§_{K1}$output)

in the case in which nonce and $§_{k1}$output can be obtained by decrypting $\text{sign}_{K2}$(nonce,$§_{K1}$output) by means of K2; however, below, the signatures are considered to consist of encryptions of hash)

nonce making it advantageously possible to make an outgoing message correspond to an incoming message, and K2 and $\text{sign}_{K2}$(nonce,$§_{K1}$output) making it possible for Client to verify that the processing has indeed been performed by Proxy having this key K2 (certified).

For the Client to be able to verify the certificate guaranteeing the "blindly" property (as well as the integrity of execution—it is understood here that "blindness" subsumes ("subsumes" in English) the integrity of execution (hash-locked execution integrity) of the processing by Proxy (which signed the result of this processing with $\text{sign}_{K2}$ (nonce,$§_{K1}$output)), $\text{sign}_K$(K2) is communicated to Client beforehand and Client stores it and/or advantageously $\text{sign}_K$(K2) is included in each return message as follows:

message: nonce, $§_{K1}$output, [K2,] $\text{sign}_{K2}$(nonce, $§_{K1}$output), $\text{sign}_K$(K2)

There are cases in which one wants the same Client to be an entity having the property of blindness or of integrity of execution, and, to guarantee this, one also wants (i) the message from Client to Proxy to be signed by Client ($\text{sign}_{K1}$(nonce,$§_{K2}$input+#P)) and (ii) the key K1 of Client to be certified ($\text{sign}_K$(K1)):

message: $§_{K2}$input+#P, nonce, K1, $\text{sign}_{K1}$($§_{K2}$input+#P, nonce), $\text{sign}_K$(K1)

(here #P is the hash of the executable code that can be used by Client or Proxy).

Figure 6:
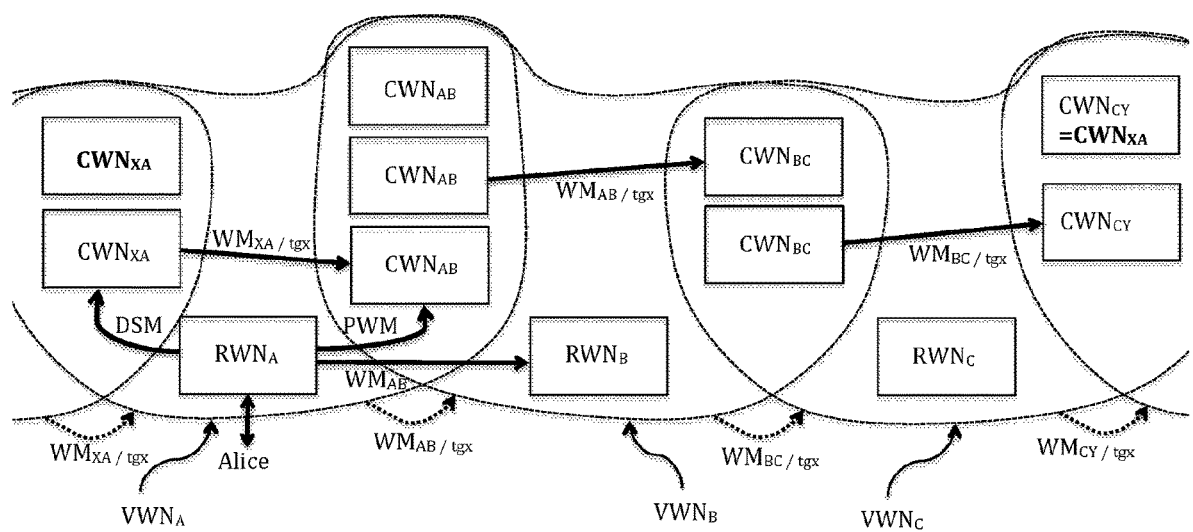
FIG. 6 diagrammatically presents the behavior of mirror nodes in the case of a chain of messages transmitting tag transfer transactions.

The usefulness of such a method is obvious, for example, in the case of the verification of an electronic passport, in reference to FIG. 6 of the application PCT No. WO2016/120826 A2: the guarantee of the integrity of execution of Client—executing a program of verification of the passport, of which the hash of the executable code is #P1—means guaranteeing the existence of this passport:

message: $§_{K2}$input+#P1, nonce, K1, $\text{sign}_{K1}$($§_{K2}$input+#P1, nonce), $\text{sign}_K$(K1).

One can then conceive of a unified format (presented here in a non-limiting manner, since other formats can also be selected) for the messages from Client to Proxy and returns from Proxy to Client, which is the following:

message: nonce1, $§_{K2}$(data+#P1+#P2), nonce2, K1, $\text{Sign}_{K1}$(nonce1, $§_{K2}$(data+#P1+#P2), nonce2), $\text{sign}_K$(K1).

In a message M having this format:

M being seen as an outgoing message (from the point of view of its emitter), nonce1 reproduces, if applicable, the nonce2 received in the upstream message which triggered the processing that gave rise to this message M;

M being seen as incoming message (from the point of view of its recipient), nonce2 designates the nonce1 of the (or of each) outgoing message that will be emitted by said recipient during the course of the processing in response to the reception of this message M;

P1 is the hash of the executable code executed by the emitter of this message M;

P2 is the hash of the executable code required to carry out the processing upon reception of this message M.

Thus, it can be understood that nonce2 identifies the message in question (M), while nonce1 is the identifier of the incoming message received that triggered the processing that gave rise to this message M.

Depending on the case, some of these arguments will be omitted in order to apply this format to different cases of use. For example, for the "blind proxy" method presented above, in which the message from Client to Proxy comprises:

message: $§_{K2}$input+#P, K1, nonce and the return (from Proxy to Client) comprises message: nonce, $§_{K1}$output, K2, $\text{sign}_{K2}$(nonce, $§_{K1}$output), $\text{sign}_K$(K2)), the message from Client to Proxy in this form comprises the following arguments:

message: _, $§_{K2}$(data+_+#P2), nonce2, K1, _, _ and the return in this form comprises the following arguments:

message: nonce1, $§_{K2}$(data+#P1+_), _, K1, $\text{Sign}_{K1}$ (nonce1, $§_{K2}$(data+#P1+_), _), $\text{sign}_K$(K1).

Advantageously, a more complete message format comprises moreover an argument #spec containing, if applicable, the hash of a specification of the constraints linking #P1 and #P2, that is to say limiting the set of the valid #P2 following a #P1:

message: nonce1, $§_{K2}$(data+#P1+#P2), #spec, nonce2, K1, $\text{Sign}_{K1}$(nonce1, $§_{K2}$(data+#P1+#P2), spec, nonce2), $\text{sign}_K$(K1)

In an implementation, this specification "spec" can be the set of valid executable codes (#P1,#P2, etc.). In another embodiment, in reference to FIG. 11, for each executable code of which the hash is given (#P1), all the hashes of the valid executable codes (#P2 . . . ) are supplied in this specification.

In the case in which, for a given message, it is required that the executable code (in its entirety) to be executed by the recipient of the message is the same as the executable code executed by the emitter of the message, that is to say that the same #P is propagated from an incoming message received to an (or to each) outgoing message generated, it is preferable that the format of the messages be the following (and, below, this particular unified format option may be used or referred to, without this being limiting):

message: nonce1, $§_{K2}$data+#P, nonce2, K1, $\text{Sign}_{K1}$ (nonce1, $§_{K2}$data+#P, nonce2), $\text{sign}_K$(K1)

For Reference

In reference to FIG. 5 of WO2016120826A2, within the SoC, there is a microcontroller (Microcontroller) comprising a general-purpose processor ("general-purpose processor" such as a processor implementing the RISC-V architecture) provided with an internal memory. Only this processor can access the "Sign" portion providing cryptographic functions, in particular the functionality of signature by the SoC, the latter in turn alone being able to access the portion containing the secret key of the chip (Secret Key). The "(Secret Key)" portion is presented in parentheses in the figure, since in some implementation options, the secret key is not stored but dynamically regenerated. The Wallet Programs portion stores encrypted executable codes (§ P) as well as their respective hashes. The Microcontroller loads in its memory, in a secure manner, as a function of the hash (#P) included in the incoming message (or of the input via I/O), one or the other of these executable codes. The latter are able to manipulate, in a nonvolatile memory, persistent state variables which can only be accessed by the Microcontroller. In WO2016120826A2, the Pers. State Variables system makes said Pers. State Variables (PSV) accessible only for the execution of the specific respective WP to which these variables belong. These state variables can thus be accessed/handled (exclusively) only by their respective WP. (However, in the present invention, the persistent state variables also include the above-described tags.) During power-up and power-reset, the executable code stored in the "Check/Load" portion is the first to be loaded and executed in the Microcontroller, and hashes can then be (re)associated with the WP available in the "Wallet Programs" portion. When a WM arrives (via I/O), this Check/Load portion verifies the integrity and the authenticity (the public key of the WN emitting this WM is used to decrypt the signature by this emitting WN and verify the integrity of the message; the key of the certification signature representative of the manufacturer is verified, and the public key which it certifies is then validated as being a key of WN, which makes it possible to confirm the authenticity of said WM), the WP corresponding to said hash, if applicable, is selected in the "Wallet programs" portion and loaded for execution. The emission of WM, if applicable, by said Wallet program, occurs by the intermediary of the Sign portion which verifies the hash inserted in the WM in the process of preparation before signing it. It should be noted that, in a possible implementation variant, in order to emit a WM to a receiving WN, the signature subsystem of the emitting WN generates (or verifies) an encryption of the WP in the process of execution (that is to say of the currently loaded WP) with, if applicable, the data to be transmitted, by means of the public key of the receiving WN, and includes it in said WM to be emitted before signature of said WM to be emitted (and upon reception, the receiving WN loads for execution this WP once it has been decrypted), thus guaranteeing that the same WP is re-executed in the receiving WN. Advantageously, the WP can be organized in versions; the hashes of the previous versions of the WP provided in the WM then accompany the latter and, for each state variable stored in the chip, the hash of the version of the WP which last handled it is associated with it. Thus, the state variables of a WP can be updated by the WP itself, even if its version evolves.

Below, a WP is considered, which is transferred from one WN to another within a WM by means of a specific transmission WP (see below executable code "PP").

As already mentioned, the public key corresponding to said secret private key is "certified" by the manufacturer of said system-on-chip WN. This certificate is a signature (it is the signature, by an entity representing the manufacturer, of the public key corresponding to said secret key of the WN), whose signature key (that is to say public key representing the manufacturer) is shared between all the (or at least a plurality of the) systems-on-chip WN of the same manufacturer. Said certificate is produced automatically, regardless of the production method: method wherein said secret key is engraved in the chip as in the TPM or chip cards, method wherein it is stored in a secure manner, method in which it is automatically generated in the chip according to the "PUF" (Physically Unclonable Function) technology introduced in [P. S. Ravikanth, "Physical one-way functions," PhD Thesis, MIT, 2001] and [Pappu et al., "Physical one-way functions," Science, 297(5589):2026-2030, 2002] (technology implemented in particular in the SoC FPGA Smartfusion2 and other chips from the manufacturer Microsemi), or according to a technology similar to the latter. The authenticity of said public key of a WN emitting a WM (in particular the authenticity of the signatures carried out by means of the secret key of this WN) is automatically verified by the WN receiving this WM at the time of its reception in relation to said certificate. Advantageously, the system automatically includes said certificate in the WM.

Conventionally, a logic is integrated in the SoC, referred to as BIST (Built-In Self Test), which is typically used for testing the secret key of the SoC. According to an inventive aspect, the same logic BIST will be used to generate the signature of the manufacturer (certificate) automatically at the time of this test, that is to say at the time of its production, the private key of the manufacturer making it possible for this signature itself to be secret. Thus, at the time of said test, if the secret key (private key) is operational and makes it possible to derive therefrom the corresponding public key, a certification request for the latter is transmitted to a signature device by means of the private key representing the manufacturer. The signature resulting, if applicable, therefrom is advantageously inscribed in the SoC.

CMMU—Crypto Memory Management Unit

Next, a system-on-chip "Blind SoC" will be described ensuring the "blindness" property, and capable of implementing the method presented at the beginning of the section "Blind Proxy" and the messages having the unified format described above.

A Blind SoC has a secret private key. A Blind SoC can communicate with another device only by messages and can execute programs only in response to the reception of messages (as presented in FIG. 23). A Blind SoC moreover can store a program to be executed that has been received, received in an encrypted manner and/or after encryption by the Blind SoC, and can generate a hash of each program, this hash making it possible to find the encrypted program again by means of a table "Program Hash Table" (PHT). A device (Client) can send to the Blind SoC a message containing input data (data) for a certain program to be executed (P2), as well as the hash (#P2) of said program. In response to such a message, the Blind SoC (i) accesses the program to be executed based on the hash of the program (#P2) received in the message, (ii) decrypts the program on the fly, and (iii) executes the decrypted instructions on the fly.

Advantageously, before emission of a message, a Blind SoC inserts in it the hash (#P1) of the program in the process of execution in the body of the message to be emitted, which it signs by means of its secret key. When a message has the same hash for the program in the process of execution (#P1) as for the program to be executed by the recipient of this message (#P1=#P2), said program (P1=P2) is an "executable commitment" (smart contract) in the case in which the recipient of said message offers the guarantee of integrity of execution of this program P2. (Also, if the hash (#P1) emitted for the program in the process of execution is different from the one (#P2) for the program to be executed by the recipient offering the guarantee of integrity of execution of this program (P2), but the correspondence is guaranteed by means of this specification common to these programs (P1, P2 . . . , as already described in reference to FIG. 7), these programs represent an "executable commitment" (smart contract)).

Blind SoC comprises a CMMU (Crypto Memory Management Unit) unit which stores—or which is capable of dynamic regenerating (by PUF technology, cited above)—said secret key of the Blind SoC (which can be accessed only by the CMMU unit which does not disclose it), and it is by this CMMU unit that the following are carried out:
    said encryption of the program before storing,
    an allocation of space (addr1 . . . addr2 range) where the program thus encrypted is to be stored, this allocated space also allowing the storing of persistent state variables connected with this program and ensuring the isolation of programs with respect to one another,
    said generation of the hash of the program, and
    said decryption for execution on the fly by at least one processor unit included in the Blind SoC,
    the other processing operations described below in the present description.

Figure 21:
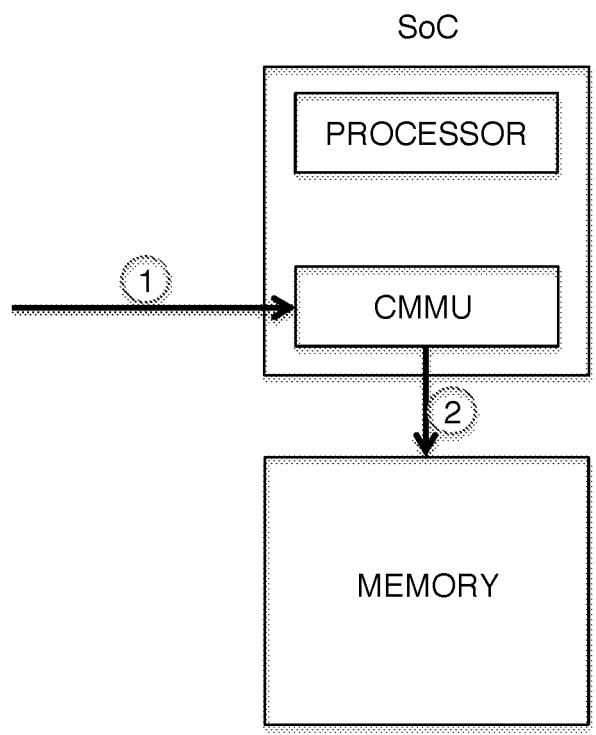
FIG. 21 diagrammatically presents a SoC comprising a CMMU unit receiving an executable program.

FIG. 21 diagrammatically presents the steps of reception by CMMU of a message containing a program to be loaded in memory (MEMORY). It should be noted that the memory (MEMORY) can be external to the SoC or not and that it comprises a space reserved for the above-described tags. The numbered steps representing the following steps:
    1) reception of a message containing a program to be loaded in memory
    2) said program to be loaded being encrypted, and the hash of said program before encryption being determined, reservation of a space in memory which can contain this encrypted program and its persistent state variables which will also be encrypted, and storing of said encrypted program, said hash subsequently making it possible to find the program again via a table (PHT).

Advantageously, the CMMU unit carries out said storing of the encrypted program instruction bloc by instruction bloc and provides (to said processor) a single decrypted instruction bloc at a time (for execution by the processor of the instructions that the block comprises). Thus, the method for loading programs (executable codes) in the Blind SoC advantageously comprises the following steps. Upon reception by Blind SoC of a message comprising P and #PP (in encrypted form $\S_{K2}P + \#PP$ . . . ), PP being the program-loading program and P being the content of the executable code to be loaded, the CMMU unit:
    1. decrypts $\S_{K2}P$ . . . and calculates the hash of the program to be loaded (#P);
    2. creates a symmetric key (PK) derived from {#P+the secret key of Blind SoC};
    3. encrypts the instruction blocs of this executable code with this symmetric key ($\S_{PK}P_i$);
    4. allocates the memory space (addr1 . . . addr2) in the memory for these blocs $\S_{PK}P_i$ as well as for the future persistent state variables handled by this program and therein records these blocks $\S_{PK}P_i$;
    5. inserts information comprising #P, addr1, addr2 in a PHT (Program Hash Table) table.

When a message containing input data for a certain program to be executed (P) and the hash (#P) of this program is received by the Blind SoC, its CMMU unit:
    1. accesses, from the hash of the program #P received in the message and via the PHT table, the blocs of the encrypted program to be executed $\S_{PK}P$ stored in memory in the space which is reserved for it (addr1 . . . addr2);
    2. decrypts on the fly the instruction blocs of P and transmits them to the processor unit;
    3. the processor unit executes on the fly the decrypted instructions on the input data, the persistent state variables linked with P being stored in isolation in addr1 . . . addr2, and the generated message including #P and being signed by CMMU.

Thus, before emission of a message by the Blind SoC, the CMMU unit inserts in the message to be emitted the hash (#P) of the program in the process of execution as well as the signature of this hash by the CMMU by means of the secret key (or inserts said hash of the program in the body of the message to be emitted which it signs with the secret key), which, in the case in which #P=#P1=#P2 (or in accordance with the above description in reference to FIG. 7, in the case in which the programs are grouped according to a specification) and if the receiving entity also guarantees their integrity of execution, makes it possible to use such programs as executable commitments (smart contract) in the sense of the present invention.

Figure 22:
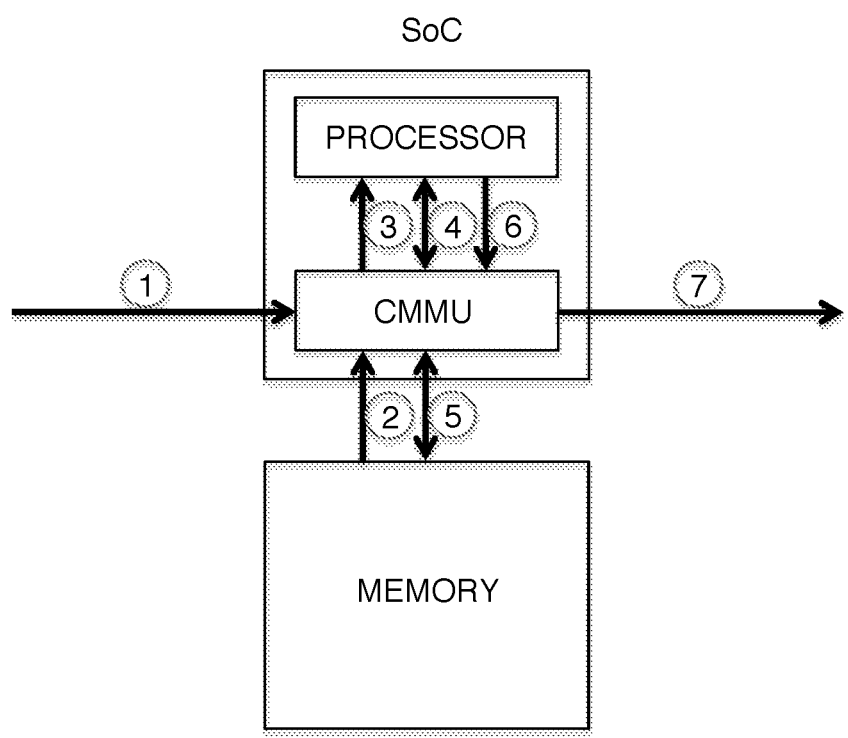
FIG. 22 diagrammatically presents a SoC comprising a CMMU unit receiving a message including input data for a program to be executed.

FIG. 22 diagrammatically presents the interactions between the different portions (PROCESSOR, CMMU, MEMORY) of the system, which are represented by these steps:
    1) Reception by CMMU of a message containing input data of a program to be executed as well as the hash of said program;
    2) Based on said hash, CMMU locates said encrypted program in the PHT table, loads it in its cache and decrypts it (bloc by bloc);
    3) CMMU transmits on the fly (one bloc at a time of the) the decrypted program to PROCESSOR for execution;
    4) If applicable, PROCESSOR requests access to already created persistent state variables (PSV and/or tags) or creates some such variables/updates them and requests to store them, or deletes some such variables, and
    5) CMMU accesses and decrypts/encrypts and stores said persistent state variables;
    6) If applicable, PROCESSOR prepares a message to be emitted, and
    7) CMMU inserts in it the hash of said program being executed and its signature by means of the secret key and emits the message.

Advantageously, the CMMU is capable of verifying the required intersections of sets of mirror nodes described above during the reception of a WM and for each tag transfer transaction received.

In reference to FIG. 22, the WM can be emitted by a Blind SoC (generated by the execution of a WP program) or received as input from the user or by another device ("quasi-WM" messages) and they comprise the hash #WP of this program in the two cases.

FIG. 23 presents a tag transfer message WM as input, which conveys a transaction (tx1), this transaction initiating in the memory (MEMORY) at the level of the Tags the insertion of the tags contributed by this new transaction, each tag comprising the data representative of the succession (graph) of the upstream transactions, as already described, with each being associated the address of the upstream WN that generated it and the addresses of its WN mirrors. With this information, in order to validate or not validate the message, the CMMU verifies the required intersection between its own mirror nodes and said addresses of mirror WN as well as the fact that at least one (or some, depending on the configuration parameters) are hard WN. This figure also presents a WM message of transfer of tags as output which conveys a transaction (tx2) generated by the CMMU upon instruction of a WP, the CMMU neutralizing (making unconsumable again) the tags consumed by this generated transaction (to avoid double spending) and generating the new tag(s) which is/are its output, respective graphs of the upstream transactions being associated with them (based on graphs upstream of them).

Moreover, the CMMU manages the simplifications of transactions described below in the section "Off-chain Bitcoin transactions": a simplification consists in replacing at least two prior inter-WN transactions which are not yet inserted in the block chain by (a) new (or the fewest possible) transaction(s) of replacement, the CMMU ensuring that the current balance remains unchanged by these replacements (this mechanism is generic, the tag transfer transactions being more general than the Bitcoin transactions).

FIG. 23 also shows an https request generated by the CMMU which takes charge of the handshakes and the cryptographic operations, leaving to the terminal to which it is coupled the role of input/output interface (at the TCP level) in order to ensure the integrity of the data end to end (the accessed site being a trusted site).

Finally, the CMMU also takes charge of the management and the signature by the Blind SoC of the Non-WM messages (at output, as presented in FIG. 23 and described above in the section "WN emitting a message to the outside world").

Constraints on the Tags

The CMMU includes a mechanism making it possible to constrain the use of the tags by the WP programs. Thus a tag can be reserved for use by a WP or by linked WP (see FIG. 7), in such a manner as to avoid the possibility of units of account being spent by a WP which is not authorized to do so.

Thus, a WP is able to indicate to the CMMU that a tag is reserved for its use, and the CMMU assigns to this tag a labeling indicating this reservation in the memory MEMORY.

This labeling can be eliminated on the initiative of the same program, thus making the tag again usable by other WP.

In the case of an attempt, by a WP, to generate a transaction, which is fed by a tag for which this WP is not authorized, the CMMU prohibits the operation, and the UA of this tag can thus not be consumed (since such a transaction cannot take place). This architecture allows the WN to reserve UA materialized by tags for certain types of operations intended to be executed by the WP which are reserved for them respectively, and thus to implement commitments based on UA which are blocked for this purpose, such as the CCC described in WO2016/120826 A2.

Improvements to the CCC

Review of the General Context

The general context is a set of nodes which are beneficiaries of CCC commitments and can themselves provide a CCC commitment of the same type to other nodes, the latter again to yet other nodes, and so on, the nodes and the CCC commitments thus forming a "networked-insurance" network.

Premium and Maximum Potential Contribution

A first node, having provided to second nodes a CCC commitment of a certain type, adds (typically staggered over time), in its CCC balance (sum of UA of tags reserved) and in accordance with this commitment, a "premium" (similar to an insurance premium) in order to cover the set of these second nodes, and specifies for each second node a threshold indicating to which amount this second node is covered by it, the threshold being referred to as "maximum potential contribution." Following a disaster on one of the second nodes covered by a first node: the first node transfers to this second node, from its CCC balance, a certain amount of UA (see "UA transfer transaction") in exchange for "premium vouchers" (see the definition below) emitted by this second node. The amount of this transfer is a function of the CCC balance of the first node and it is in the amount of the maximum potential contribution specified for this particular second node.

Premium Vouchers

A "premium voucher" emitted by a second node is an acknowledgment of debt "to the bearer" emitted as payment for a contribution received by this second node in execution of a CCC commitment, following a disaster, contribution received from the first node which is the supplier of this CCC commitment. This debt is reimbursable by the second node in accordance with this CCC commitment (typically staggered over time) within the limit of the amount of the premium provided for the second node, and prorated for this received contribution (if applicable among a plurality of received contributions). The premium vouchers are "to the bearer" in the sense that, as long as their respective debt amounts have not been paid off (that is to say as long as UA to be received remain), they represent a certain amount of long-term value, have a certain "immediate value in UA" and can be transferred (see "UA transfer transaction") from one node to another node. The "immediate value in UA" of a premium voucher is defined as the sum of the amounts which it represents for different terms provided minus the sum of the respective interest amounts for the durations of these terms. The first bearer of a premium voucher is the first node that contributed, in execution of a CCC commitment, to the second disaster victim node which emitted this premium voucher. It should be noted that the latter transferred it to it in the "to be used only in case of disaster" mode: the immediate value of the premium voucher thus received by the first node is added to the CCC balance (which is reserved for payment for disasters) and it cannot be spent (even partially) by the authorized WP, except for compensating for a disaster according to this CCC commitment.

Concurrent Premium Vouchers

Said second disaster victim node also transfers to said first node all the premium vouchers which it received itself from downstream nodes to which it contributed in the past in the context of the same CCC, still in a "to be used only in case of disaster" mode, but here in a "concurrent" mode (that is to say replicated and synchronized) and for half the amount (or for a proportion given in the CCC) of their respective values. Each premium voucher can thus be replicated over several nodes at the same time, can be used only for payment (for all or part of its immediate value) in case of a disaster, and only in the context of the CCC in question, and a payment by premium voucher consumes it at the same time (by synchronization) over all the nodes where it is located (including on the first node which contributed to the disaster which is at the origin of it and to which it was transferred first). To achieve this, each disaster payment by premium voucher, if applicable, is reported by the paying node to the other concurrent nodes where it has also been transferred and, when the value drops to zero, it is deleted over the set of these nodes.

Message Sending

Now, an embodiment will be described according to which an emitted message including (and identified by) a nonce2 is considered to have been "sent" by its emitter upon reception of an acknowledgment of receipt (ack) message returned by the recipient of this message and including said nonce2 as described above, that is to say as value of the argument nonce1.

Said message expires after a certain time, fixed for the given executable code, time after which it is typically re-emitted a certain number of times (see below the section "Guarantee of commitment in case of non-responsiveness").

The acknowledgment of receipt thus has the following form:

message: nonce1:receivedNonce2, $\S_{K2}$(data:ack(receivedNonce2)+#P), nonce2, K1, $sign_{K1}$(nonce1:receivedNonce2, $\S_{K2}$(data:ack(receivedNonce2)+#P), nonce2), signK(K1))

Figure 8:
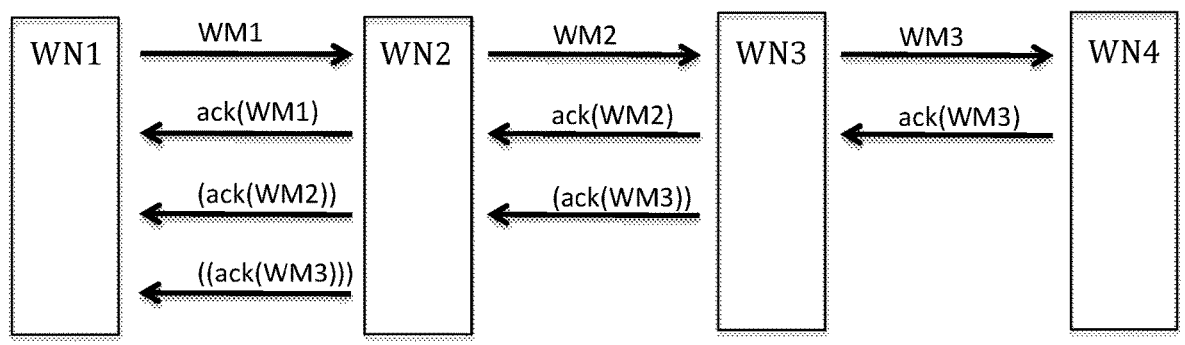
FIG. 8 illustrates the propagation of acknowledgments of receipt between Wallet Nodes.

In addition, in reference to FIG. 8, when the sending
of a first message (WM1) by a first emitter (WN1) to a receiving WN2 is, in the given lapse of time from the sending of the WM1 (which is typically fixed for the current executable code), followed by the sending
of a second message (WM2) by WN2 to another recipient (WN3), a message noted "(ack(WM2))" (in parentheses in FIG. 8), propagating the acknowledgment of receipt "ack(WM2)" received from WN3 by WN2, is sent by the latter to the first emitter (WN1).

To illustrate this method, the message WM1 in reference to FIG. 8 has the following form:

WM1 from WN1 to WN2: nonce1, $\S_{K2}$data+#P, nonce2: N1, K1, $sign_{K1}$(nonce1, $\S_{K2}$data+#P, nonce2:N1), $sign_K$(K1)

and its acknowledgment of receipt (which confirms this sending from WM1) has the following form:

ack(WM1) from WN2 to WN1: nonce1:N1, $\S_{K2}$data:ack (N1)+#P, nonce2, K1, signK1(nonce1:N1, $\S_{K2}$data:ack (N1)+#P, nonce2), $sign_K$(K1)

Figure 12:
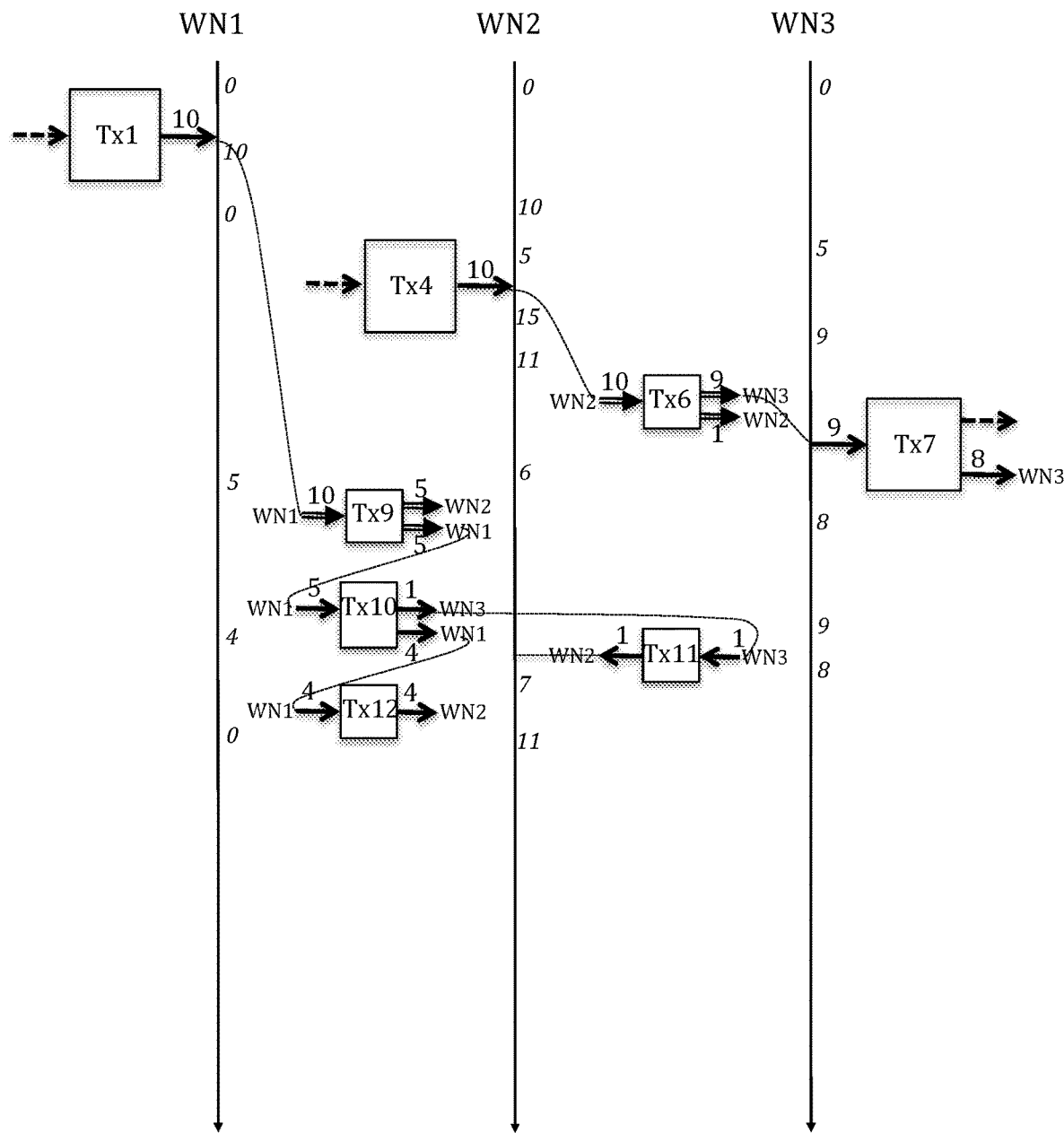

Following this first message identified by the nonce2 "N1," the message WM2 of FIG. 12, sent from WN2 to WN3, has the following form:

WM2 from WN2 to WN3: nonce1, $\S_{K2}$data+#P, nonce2: N2, K1, $sign_{K1}$(nonce1, $\S_{K2}$data+#P, nonce2:N2), $sign_K$(K1)

Upon reception of the acknowledgment of receipt confirming WM2 returned by WN3, which has the following form:

ack(WM2) from WN3 to WN2: nonce1:N2, $\S_{K2}$data:ack (N2)+#P, nonce2, K1, $sign_{K1}$(nonce1:N2, $\S_{K2}$data:ack(N2)+ #P, nonce2), $sign_K$(K1)

provided that this acknowledgment of receipt reaches WN2 within the given lapse of time from the sending from WM1, as shown in FIG. 12, WN2 propagates it to WN1 in a message "(ack(WM2))" which has the following form:

(ack(WM2)) from WN2 to WN1: nonce1:N1, $\S_{K2}$data:{ (ack(N2),payload)}+#P, nonce2, K1, $sign_{K1}$(nonce1:N2, $\S_{K2}$data:{(ack(N2),payload)}+#P, nonce2), $sign_K$(K1)

payload being a content dependent on the executable code in question, such as, for example, the content of WM2.

The same method is carried out in the case of a longer chain of messages up to a given maximum depth (typically this depth is fixed for the given executable code). For example, and in reference to FIG. 8, this chain being composed
of a first message (WM1) from a first emitter (WN1) to a second emitter (WN2),
followed (within a given lapse of time) by a message (WM2) from the second to the third (WN3),
then
followed (within the given lapse of time from the sending of WM1) by a message (WM3) from the third to the fourth (WN4), the acknowledgment of receipt received from the fourth (WN4) is also propagated gradually up to the first emitter (WN1), arriving at the message "((ack)WM3))" sent by WN2 to WN1 and comprising information ":{(ack(N2), payload1), (ack(N3),payload2)}" corresponding to the series of the exchanged messages:

((ack(WM3))) from WN2 to WN1: nonce1:N1, $\S_{K2}$data: {(ack(N2),payload1), (ack(N3),payload2)}+#P, nonce2, K1, $sign_{K1}$(nonce1:N2, $\S_{K2}$data:{(ack(N2),payload1), (ack(N3), payload2)}+#P, nonce2), $sign_K$(K1)

payload1 and payload2 being dependent on the executable code in question and being, for example, the respective contents of WM2 and WM3. Preferably, for the sake of privacy, only the portion which is usefully communicated is communicated, optionally after transformation.

The advantage of this propagation of acknowledgments of receipt will be seen in the following method.

Off-Chain Bitcoin Transactions

Now, the following is a description of a method which is based on WN for materializing (serializing) transactions of transfer of units of value, in such a manner as to be able to record them, for example, in a blockchain. In the implementation described below, Bitcoin transactions, which are valid and directly insertable in the Bitcoin Blockchain, are generated—but without necessarily having to insert them in this Blockchain, while offering the same guarantees as if they were inserted. (The same method can be transposed to other protocols based on blockchain, such as Ethereum). Thus, below, the units of value in question are BTC.

Figure 9:
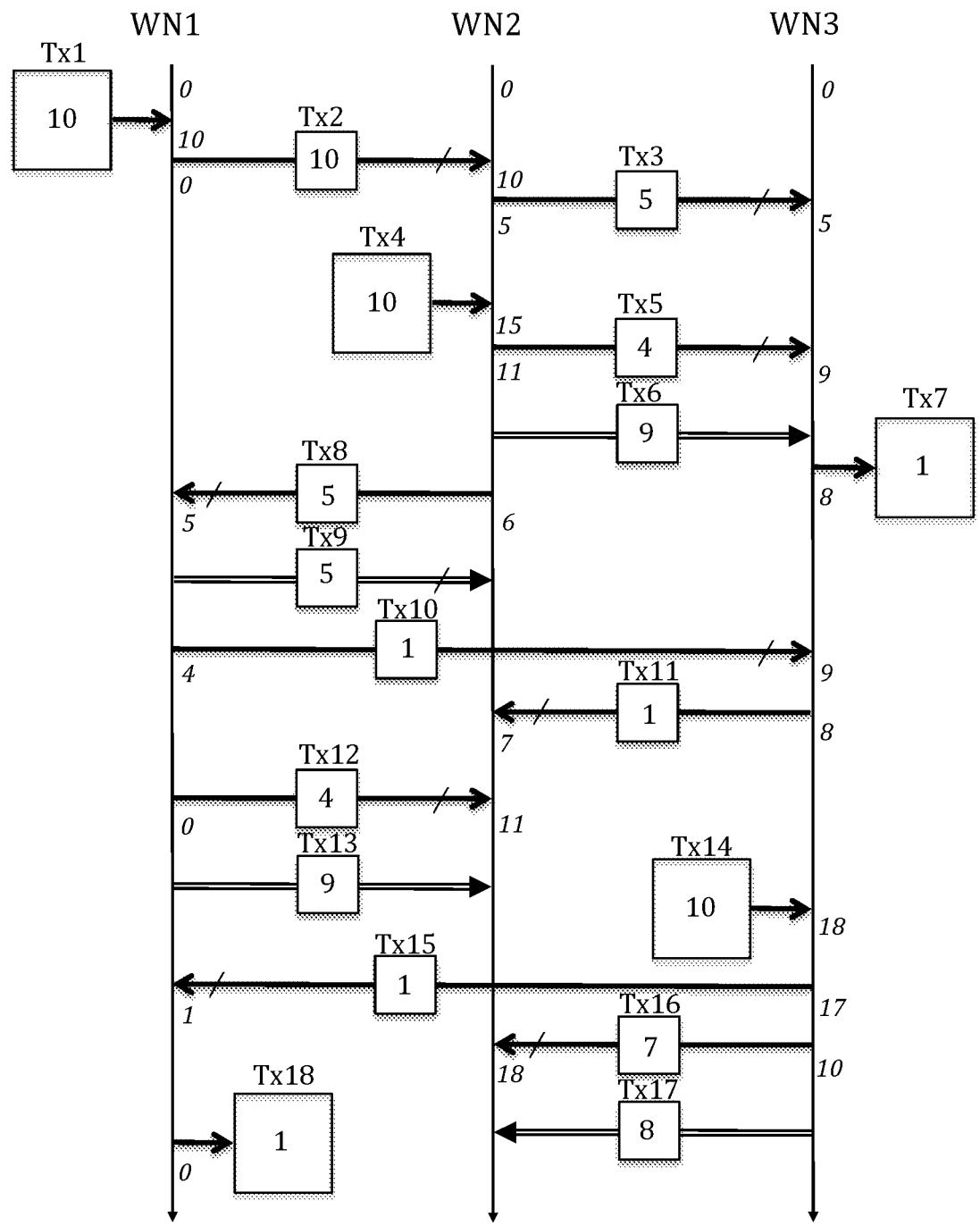
FIG. 9 diagrammatically presents an example of payments made between Wallet Nodes by abstract Bitcoin transactions.

FIG. 9 thus presents an example with three Wallet Nodes ("WN1," "WN2" and "WN3") wherein, first of all, the user of WN1 (or a third party) creates an incoming Bitcoin transaction ("Tx1") in favor of WN1 (having an output giving 10 BTC to WN1), and conventionally broadcasts ("broadcast") this transaction, which is then inserted in the blockchain, this having the effect of guaranteeing to the user of WN1 that only WN1 can spend these 10 BTC which are available to it on Tx1. (It should be noted that even in the case in which Tx1 was created independently of WN1, means are provided so that WN1 is notified of it and/or verifies/detects it after its insertion in the blockchain, waits or does not wait for a certain number of confirmation of blocks, and updates its persistent state variables in relation to this new entry.)

The three long vertical lines represent the evolution of these Wallet Nodes over time (from top to bottom). Thus, following Tx1, one sees in this figure a sequence of several transactions between WN (Tx2, Tx3, etc.), as well as other incoming transactions (from non-WN addresses, in favor of WN1, WN2 or WN3, such as Tx4 which is an incoming transaction in favor of WN2 and outgoing transactions (from WN1, WN2 or WN3 in favor of non-WN addresses, such as Tx7), with, whenever feasible, a replacement of at least two prior inter-WN transactions by a new transaction, so that, preferably, only one (or as few as possible) non-broadcast transaction remains between two given WN, those that were replaced being deleted (this means that they are at least labeled as such and considered as if they were deleted) and the current balance remaining unchanged by these replacements. In general, the method consists in simplifying a set of transactions by updating the latter, exploiting the fact that they are not broadcast (hereafter "non-broadcast").

When a transaction transferring BTC from WN1 to WN2 is generated (such as Tx2), it is signed by WN1 (conventional Bitcoin transaction signature) and communicated to WN2 via message. A creation (or updating or cancellation of the transaction, provided that it is non-broadcast) is confirmed by sending a message (in the sense of the previous section).

In FIG. 9, each transaction is represented abstractly by a box (a square) placed on an arrow. The number inside this box represents the amount transferred from the point of view of the user. Said incoming and outgoing transactions (that is to say transactions which are not transactions between WN) are represented by larger boxes than the inter-WN transactions. Said balances are represented in italics (along the long vertical lines, on their right). Said deletion of an inter-WN transaction is presented by a small oblique line at the tip of the arrow representing this transaction. Said replacement transactions (such as Tx6) are represented differently by means of a double-lined arrow, and when they themselves are deleted (as in the case of Tx8), this is also presented by a small oblique line.

Thus, FIG. 9 shows in the top left an entry (Tx1) of 10 BTC on WN1 whose balance was 0 just before. By this transaction, its balance thus goes to 10 (shown in italics). These 10 BTC are transferred (by Tx2) to WN2, the balance of WN1 going again to 0, and the balance of WN2 going from 0 to 10. Then WN2 transfers (by Tx3) 5 BTC to WN3 (thus 5 remain for it). Further below, 10 BTC are transferred to WN2 from a non-WN address (by the transaction Tx4 which is inserted in the blockchain), the balance of WN2 thus going from 5 to 15. WN2 transfers 4 BTC to WN3 (Tx5), the balances on both sides going thus to (15−4=) 11 and (5+4=) 9, respectively.

Now there are two non-broadcast transactions from WN2 to WN3 (Tx3 and Tx5) and they can be replaced by a transaction transferring their sum (Tx6, transferring 5+4=9 BTC). Tx3 and Tx5 are thus deleted, which is shown in FIG. 9 by small oblique lines on the arrows representing these transactions.

Figure 11:
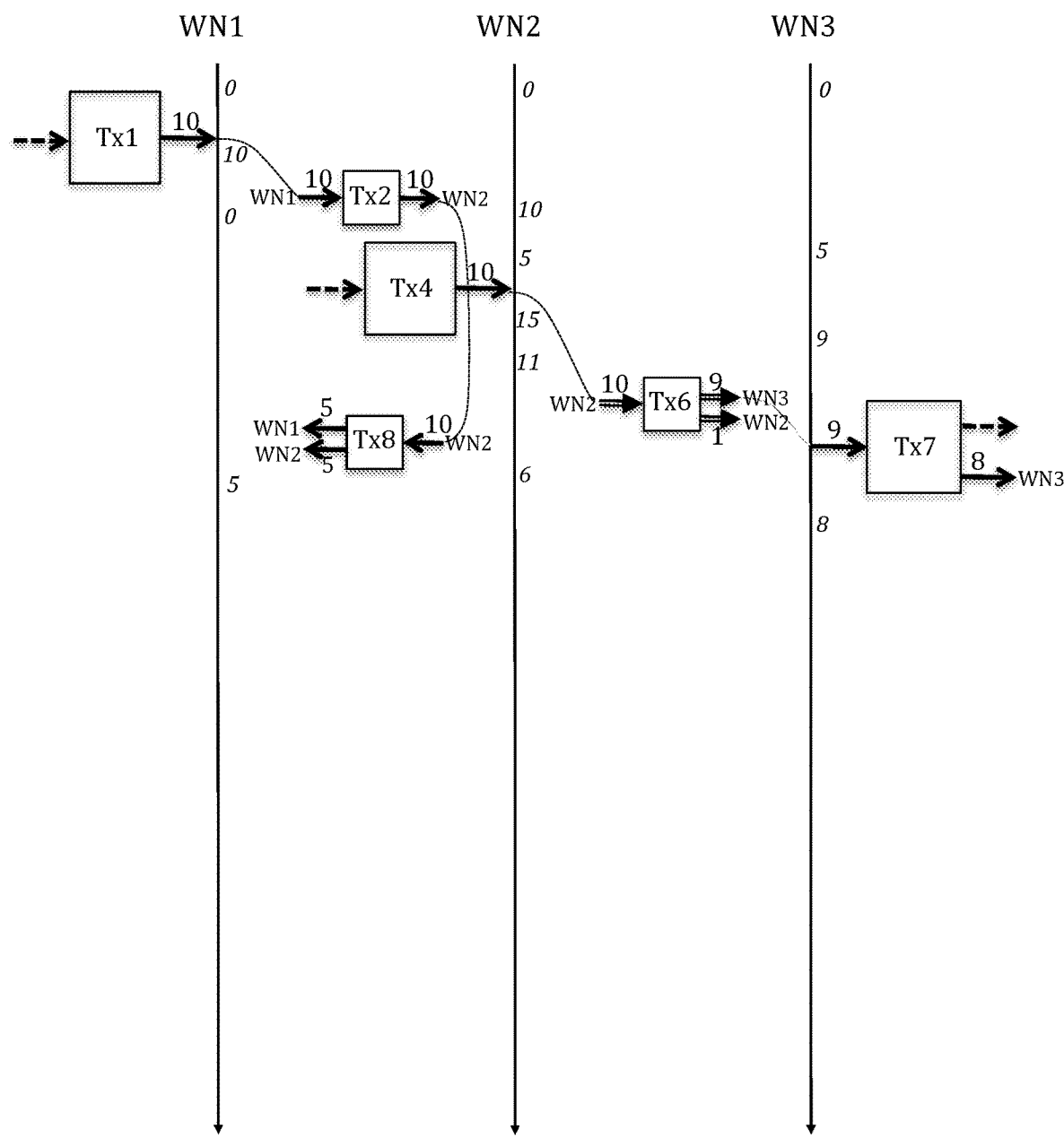

WN3 transfers 1 BTC to a non-WN third party by the transaction Tx7 which is broadcast. Consequently, the entire chain of the transactions which feed it (in this case Tx6 and Tx4 only, as shown in FIG. 11 described below) are also broadcast (inserted in the blockchain so that Tx7 can also be inserted) and they can thus not be deleted—they thus stop being replaceable.

WN2 transfers 5 BTC to WN1 (Tx8). Then, since there is also the transaction Tx2 between these WN, these two transactions (Tx2 and Tx8) are replaced with Tx9 from WN1 to WN2, which transfers their difference (10−5=5 BTC) due to the fact that they are in the opposite direction. Tx2 and Tx8 are thus deleted.

This replacement transaction Tx9 is itself deleted following the generation of Tx12 (both being non-broadcast), giving rise to the replacement transaction Tx13. (FIG. 9 shows this replacement as perceived by the user, while FIGS. 12 and 13 described below show the details of this at the Bitcoin level).

Tx10 and Tx15 are generated between WN1 and WN3, have the same value, are in the opposite direction and non-broadcast and can simply cancel out, that is to say be deleted without giving rise to a replacement transaction. (Here again, it is interesting to see the details of this at the Bitcoin level in FIGS. 13 and 14).

Figure 13:
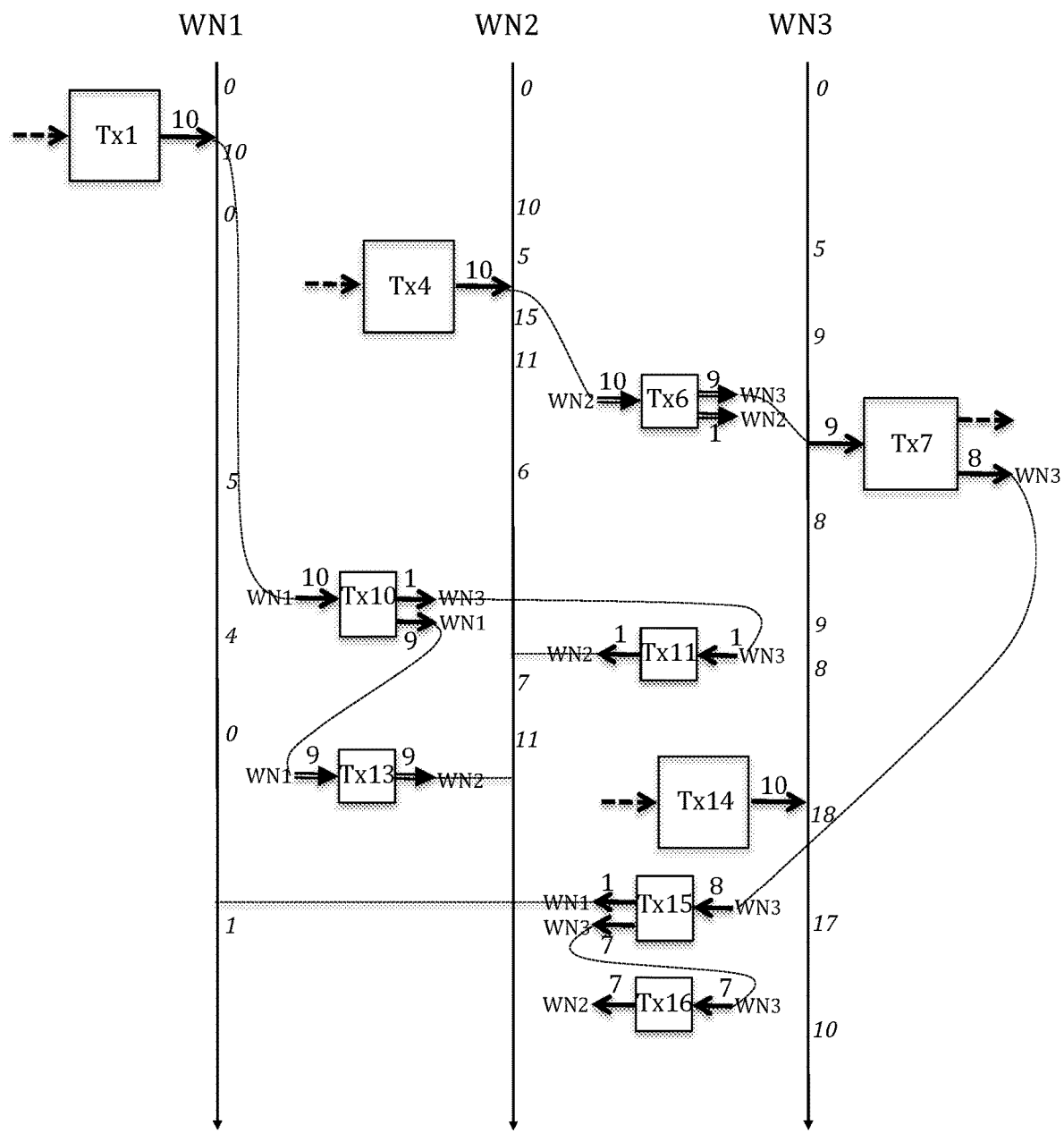
Figure 14:
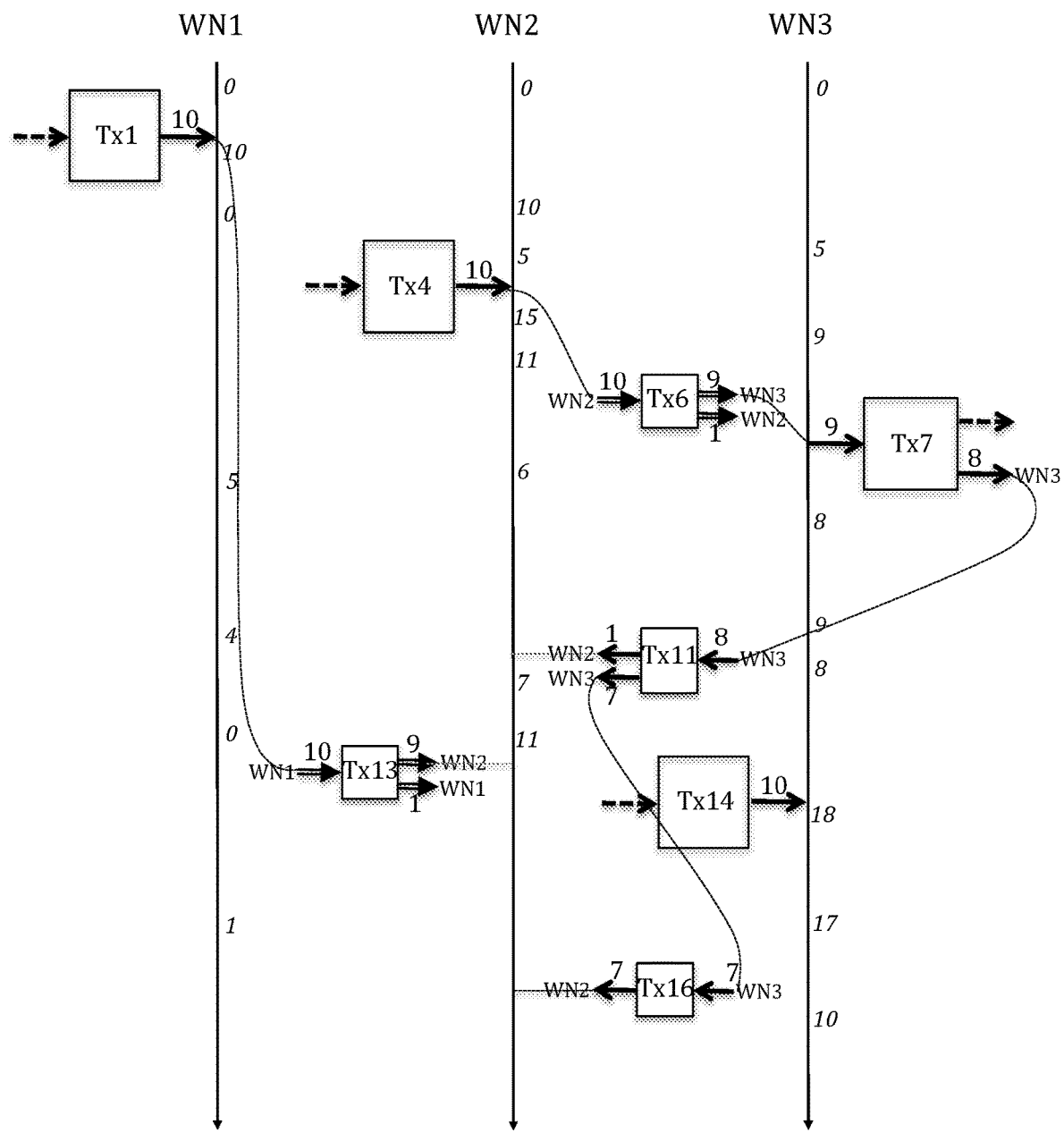

Tx11 and Tx16 which are in the same direction (from WN3 to WN2) are non-broadcast, give rise to the replacement transaction Tx17 which transfers their sum and which itself is replaceable while it remains non-broadcast (details at the Bitcoin level in FIGS. 14 and 13).

Figure 15:
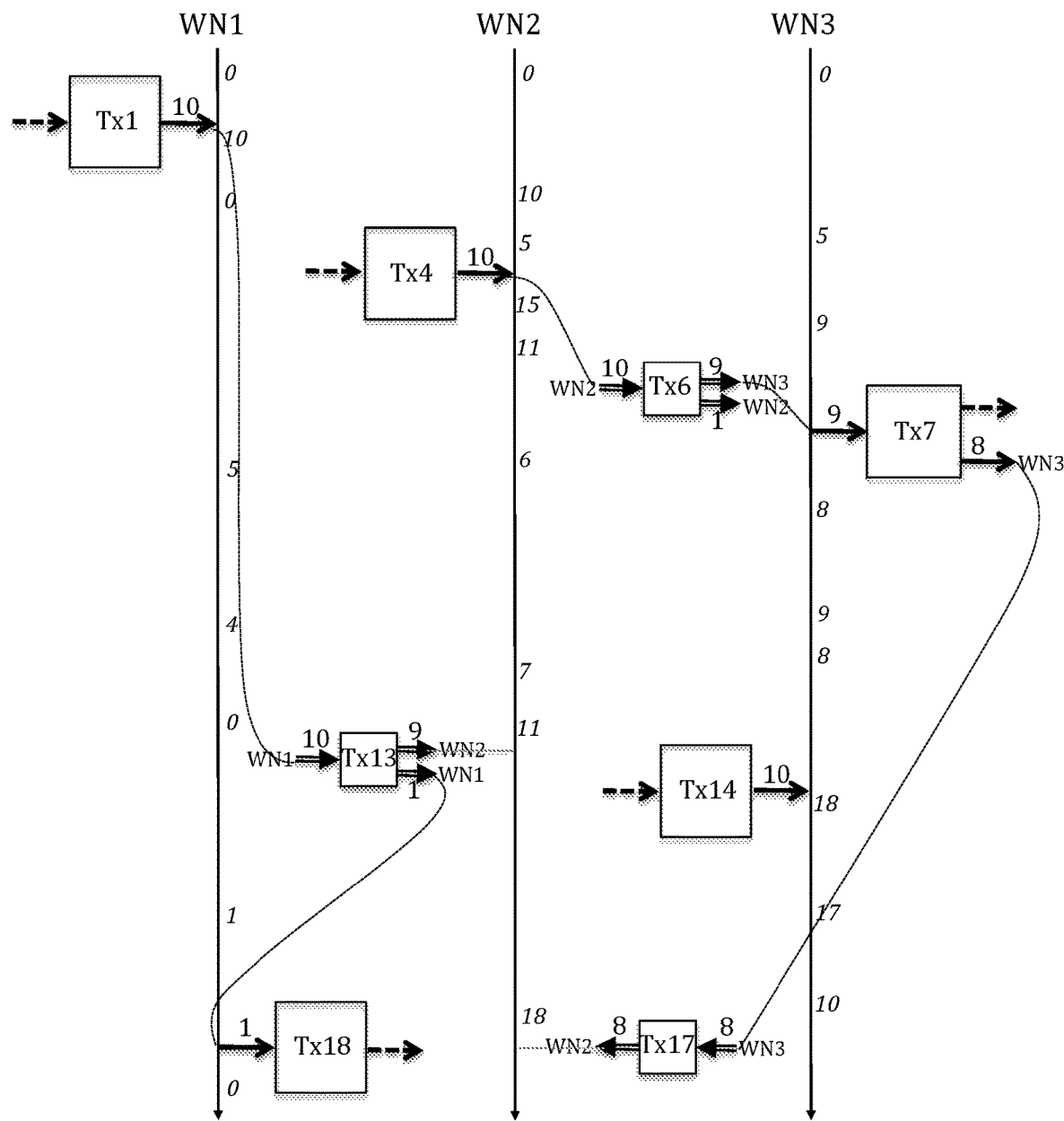
Figure 16:
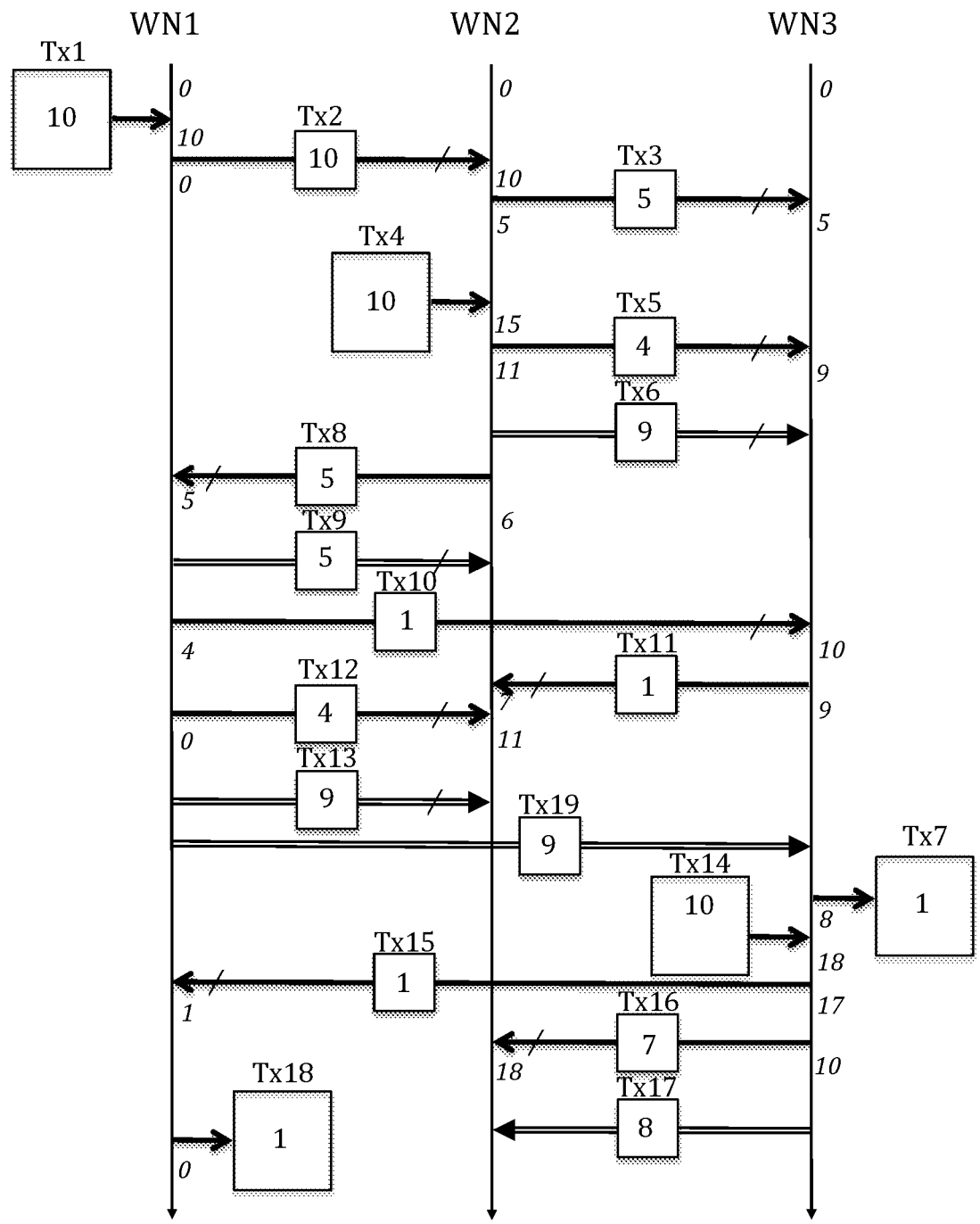
FIG. 16 diagrammatically presents another example of payments made between Wallet Nodes by abstract Bitcoin transactions.

On the other hand, the outgoing transaction Tx18 (broadcast) causes the broadcast of the chain of the transactions that feed it and that henceforth can no longer be deleted, in this case Tx13 (see FIG. 15).

The Bitcoin transactions presented in FIG. 9 are "abstract," in the sense that they present the amounts transferred from the point of view of the user but do not show the inputs and outputs of these transactions in the sense of Bitcoin. FIGS. 10 to 15 present the real transactions corresponding to the abstract transactions of FIG. 9 (by explicitly providing their inputs and outputs).

The method for their generation is based on the fact that, corresponding to a balance available in a WN (the number in italics in the figure), there is always at least (an amount available on) an output in favor of this WN (the total of these outputs being equal to this balance), that one can combine such outputs in order to connect them to the inputs of a transaction generated by said WN, and, in the case of overshooting, return the surplus (called "change") to said WN by an additional output. As far as the implementation of replacements/deletions is concerned, even in the case in which an output of a transaction to be deleted (for example, Tx10, see FIG. 13) is connected to an input of a transaction which should not be deleted (Tx11) in the same operation, the latter can be updated automatically in order to be connected to an output available from another transaction (Tx13).

In FIGS. 10 to 15, the input(s) and output(s) of the transactions are shown with small horizontal arrows and their connections are shown with thin curved dotted lines (an output labeled "WN1" of a transaction is connected to an input also labeled "WN1" of a subsequent transaction, and so on).

It is implicit in these figures that the creation of a transaction comprises the sending of message(s) in the sense of the previous section. For example, the generation of Tx3 by WN2 results in the sending by WN2 of a message indicating it to WN3, and this transaction is really created only upon the return of an acknowledgment of receipt by WN3 (see also the section "Guarantee of commitment in case of non-responsiveness").

Figure 10:
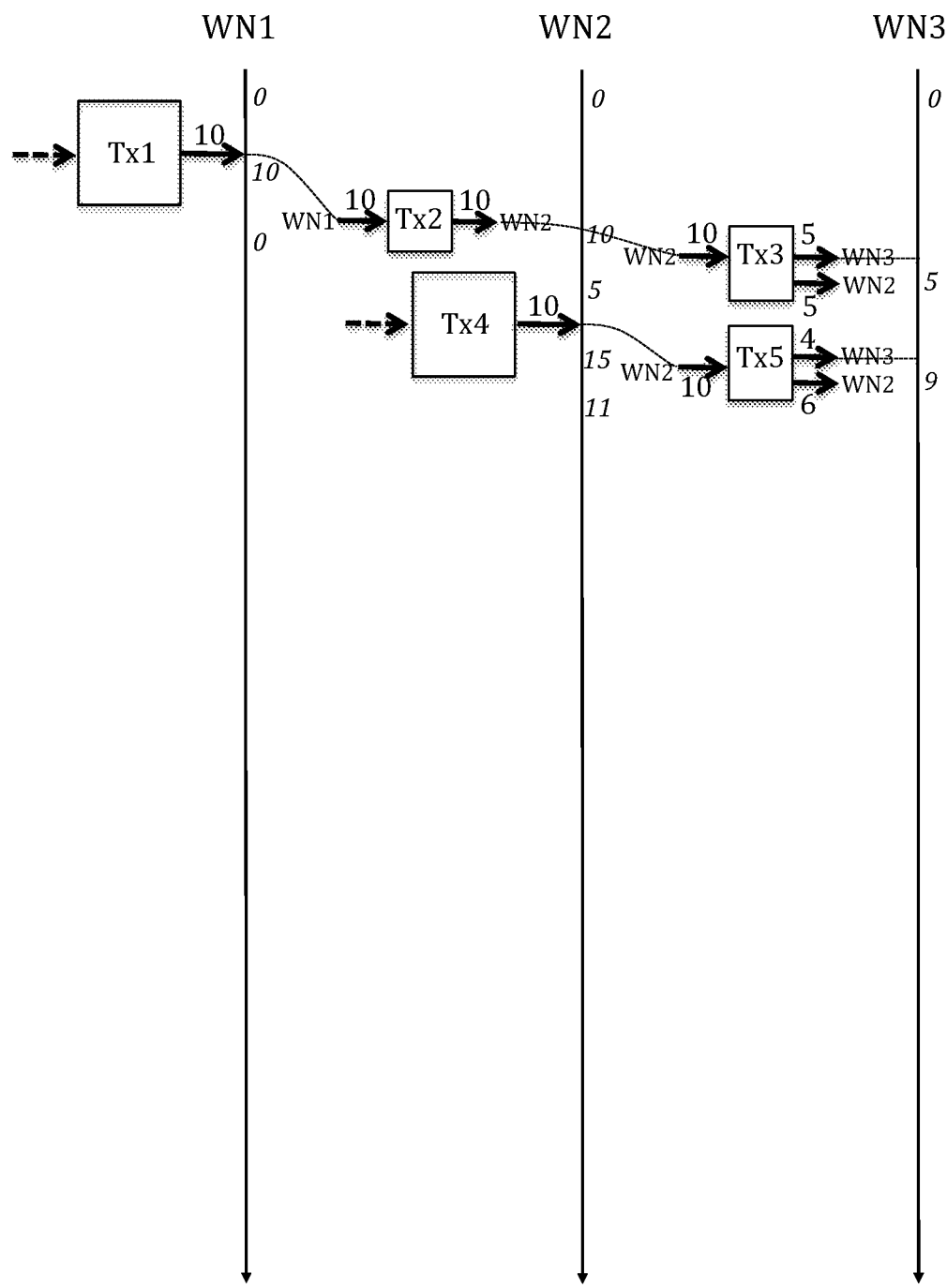
FIGS. 10 to 15 diagrammatically present the real Bitcoin transaction corresponding to the abstract transactions of FIG. 9.

FIG. 10 shows the real transactions Tx1 to Tx5 which correspond to the abstract transactions having the same labeling as in FIG. 9. One can see there that, although, according to FIG. 9, Tx3 transfers only 5 BTC to WN3, its input takes 10 BTC from Tx2 (due to the fact that Tx2 only has an output of 10 BTC in favor of WN2) and returns 5 BTC to WN2. In other words, Tx3 has an output of 5 BTC in favor of WN2, in addition to the output of 5 BTC in favor of WN3.

The transactions Tx3 and Tx5 of FIG. 10 are replaced in FIG. 11 with the transaction Tx6, generated by WN2 (and of which replacement notification is sent to WN3). To carry out this replacement, WN2 can connect Tx6 to Tx2 or to the incoming transaction Tx4. The latter is preferred due to the fact that the chain of feed transactions upstream is shorter (or by application of more complex heuristics). In fact, this same figure represents the outgoing transaction Tx7 which is broadcast from the start, and if, on the other hand, Tx6 were connected to Tx2, Tx2 would also have had to have been broadcast and could not have been replaced later, as represented in FIG. 12.

FIG. 12 presents the result of the replacement of Tx2 and Tx8 with Tx9, as well as the generation of the transactions Tx10 by WN1 (to WN3), Tx11 by WN3 (to WN2) and Tx12 again by WN1 (but to WN2).

FIG. 13 presents the replacement by Tx13 of the replacement transaction Tx9, following the generation of Tx12. In fact, as shown in FIG. 9 (and FIG. 12), the cumulative effect of these two transactions is to provide 5+4=9 BTC from WN1 to WN2. This replacement has the effect of updating the input of Tx10 as well as its second output which is now connected to the new transaction Tx13. In this figure, one also sees the generation of the transactions Tx14 to Tx16.

The generation of Tx15 has the effect of cancelling the effect of Tx10, in fact, it transfers 1 BTC in the opposite direction. FIG. 14 presents the result of this cancellation which leads to the updating of the input and the output of Tx11.

Finally, in FIG. 15, Tx11 and Tx16 are replaced by Tx17 which connects its output to the output of Tx7. This Figure also shows that WN1 generates the outgoing transaction Tx18 fed by Tx13, which makes Tx13 broadcast and thus not deletable.

Above and in the application PCT WO2016/120826 A2, the property of execution integrity guarantee and blindness of the WN has already been described, according to which, upon reception of a WM, the WN necessarily executes the specific WP indicated in this WM, to the exclusion of all the other instructions, on the input data provided, to the exclusion of all other data, and emits only the WM which, if applicable, are provided in said WP with respect to this input data and the persistent state variables, by ensuring the inaccessibility without discontinuity at the same time of the input data, their processing, the state variables and the result of the processing.

The operations described above for generation and handling of Bitcoin transactions (which can be inserted or not in the blockchain) make use of these properties for securing said deletions/replacements. Thus, for example, the generation by WN1 of the replacement transaction Tx6 (in reference to FIGS. 9 and 11) does not present the risk that WN2 (or its user or owner) does not delete the transaction Tx2 which Tx6 replaces. In fact:

as long as WN2 does not broadcast Tx2 for insertion in the blockchain (for example, following a command of the user), the user cannot see the content of Tx2 (this content comprising the signature by WN1 of this payment and which the user of WN2, were it not for the blindness property, could have copied and broadcast later by other means);

a broadcast command is not taken into account by WN2 after Tx2 is deleted (or when Tx2 is labeled as being in "deleted" mode) in WN2;

when the content of Tx2 has been disclosed to the user (following its broadcast), it can no longer be deleted/replaced in the sense of the present method of the invention.

It should be noted that all the different possible Bitcoin transaction types can be generated (and due to the fact that the WN are able to preserve their states, the present method of the invention is also applicable to Ethereum, in particular). The transactions are communicated by WM to the WN having the addresses specified on or for the outputs of these transactions. Required signatures can be communicated by WM. For example, a transaction requiring n out of m signatures (multisig) can be generated by WN and communicated by WM to m potential signers some of which will return their signature.

The fact of not having to insert a transaction in the blockchain presents the advantages, in particular, of (1) instantaneous confirmation, (2) nonpayment of fees, and (3) theoretically unlimited volume of the possible transactions. In which cases does a transaction need to be inserted in the blockchain?

The incoming transactions (from non-WN addresses) necessarily have to be inserted in the blockchain beforehand, to prevent double spending. Thus, the WN does not take into account (or confirm) an incoming transaction until it is visible in the blockchain.

The outgoing transactions are only broadcast optionally, to the extent that there is (almost) no risk of double spending by the WN (the risk of tampering ("tampering") with a system-on-chip of the state of the art being low, particularly in the presence of mirror WN—see the description of mirror WN above). In practice, an outgoing transaction is perhaps inserted in the blockchain at the time when at least one output intended for a non-WN address is to be spent. At this time, its content becomes accessible, as do the upstream transactions, and these transactions stop being deletable.

The inter-WN transaction can advantageously not be broadcast, but it is not prohibited to broadcast them (at any time). A broadcast transaction (for the purpose of having it inserted in the blockchain) will not be replaced, since it cannot be deleted, but the other transactions continue to have the above-mentioned advantages, except when they feed it (the loss of advantage is local to the broadcast transaction+the chain of the upstream transactions which feed it).

It has been seen that the inter-WN Bitcoin transactions generated are confirmed upon reception of acknowledgment of receipt (from their respective beneficiaries) and that two transactions between two given WN, in the case where none of them is broadcast, are simplified (replaced by a single transaction or simply canceled) in some cases. Now, in reference to FIGS. 16 to 19, a method for simplification (including by replacement or simple cancellation) of a plurality of transactions between more than two WN will be described. This method uses the method of propagation of acknowledgments of receipt described above, their payloads (also described above) propagating the information of the BTC transferred between the non-directly adjacent WN.

FIGS. 16 to 19 take up again the example of FIGS. 9 to 15, except that in FIGS. 16 to 19, the transaction Tx7 is generated (by WN3) after the transaction Tx13 has been confirmed (generated by WN1). (It should be noted that the same method could have been described with the example presented in FIGS. 9 to 15, but considering that Tx7 is not broadcast before the Tx13 has been confirmed.)

Thanks to the propagation by WN2 to WN1 of the acknowledgment of receipt by WN3 of Tx6 for 9 BTC, the transactions Tx9 and Tx12, also for a total of 9 BTC, being confirmed (upon reception by WN1 of acknowledgments of receipt from WN2), WN1 replaces these three transactions by a single transaction Tx19 which transfers 9 BTC directly from WN1 to WN3.

In an implementation variant (and it is this variant which is presented in FIGS. 16 to 19), first of all Tx9 (5 BTC) and Tx12 (4 BTC), both from WN1 to WN2, are replaced by Tx13 (9 BTC, from WN1 to WN2), then the latter and Tx6 (9 BTC, from WN2 to WN3) are replaced with Tx19 (9 BTC) from WN1 to WN3.

Figure 17:
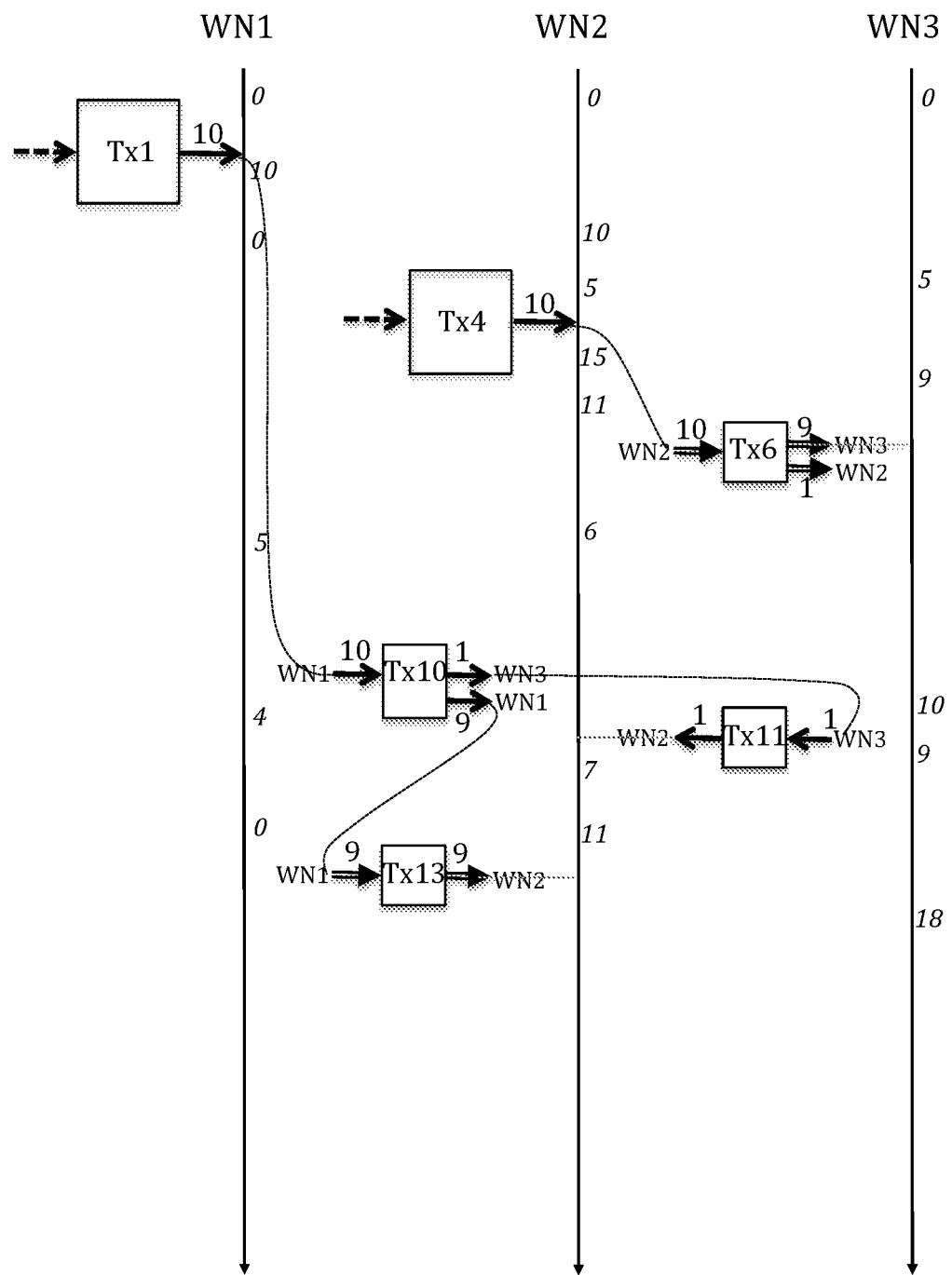
FIGS. 17 to 19 diagrammatically present the real Bitcoin transactions corresponding to the abstract transactions of FIG. 16.
Figure 18:
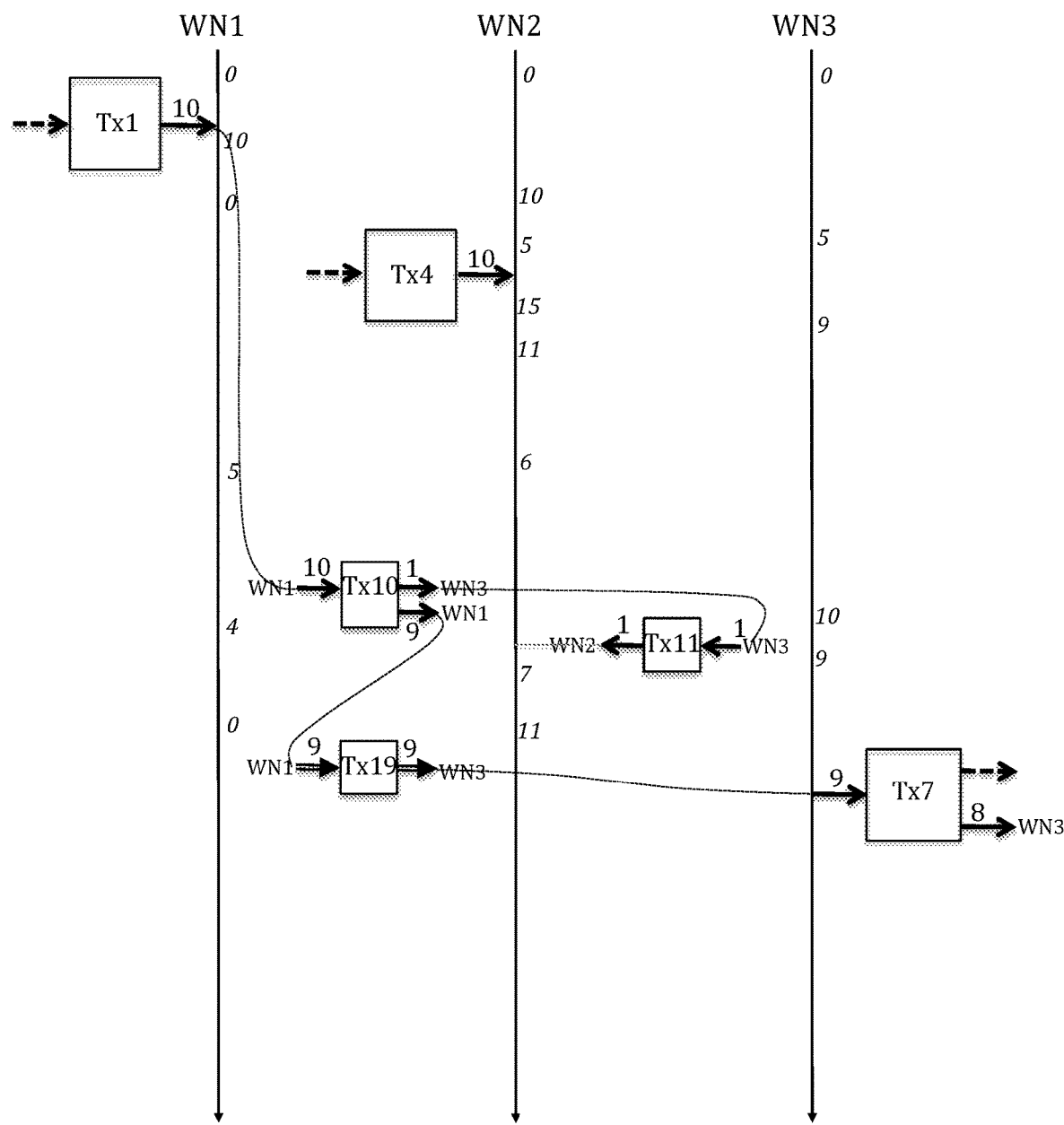
Figure 19:
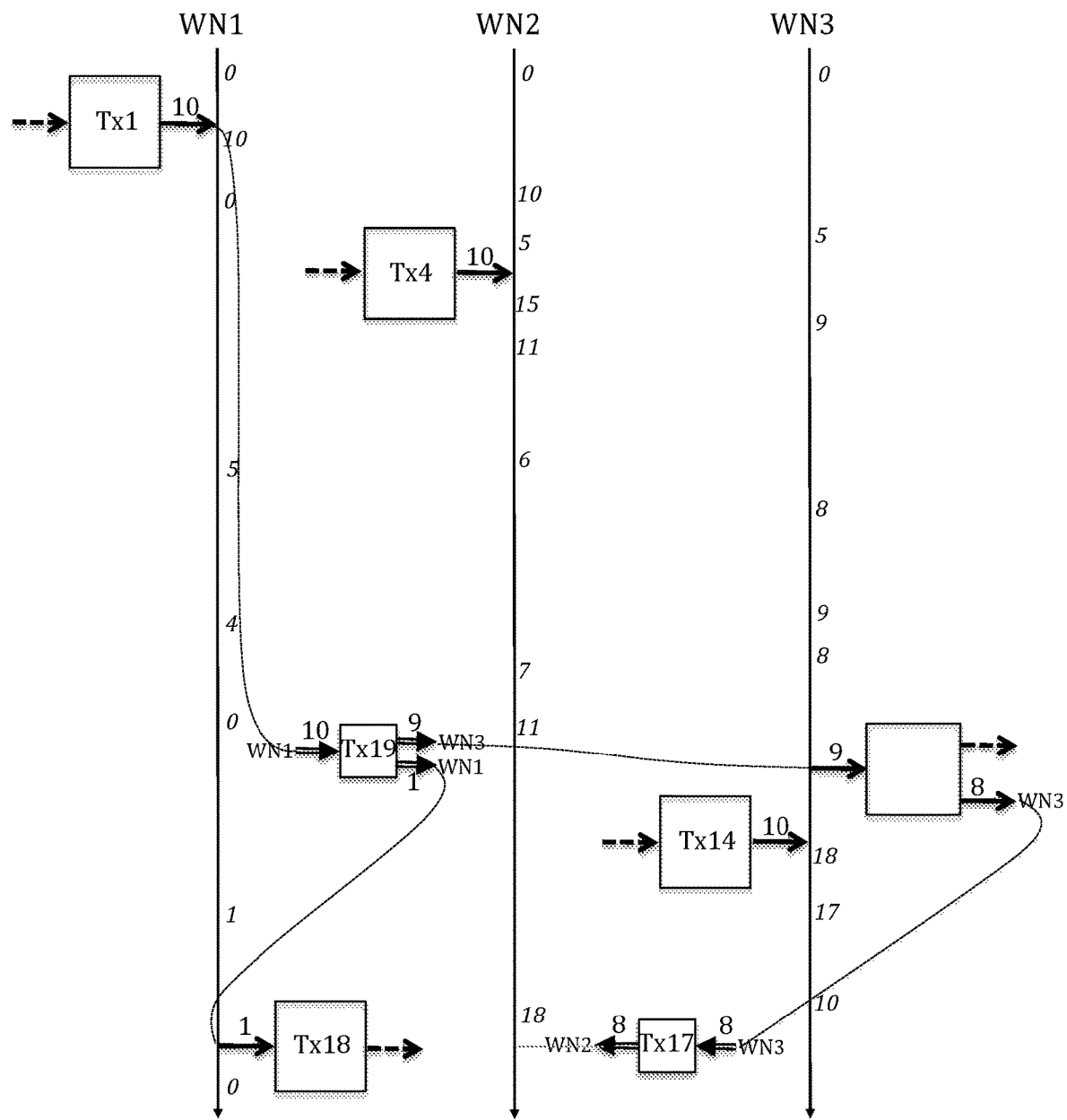

In order to present the generated real Bitcoin transactions, FIG. 17 repeats FIG. 13 except without Tx7 and the following being generated again. FIG. 18 shows the transaction Tx19 (9 BTC from WN1 to WN3) which replaces the transactions Tx13 (9 BTC from WN1 to WN2) and Tx6 (9 BTC from WN2 to WN3, taking 10 BTC from Tx4 and keeping for itself a change of 1 BTC) shown in FIG. 17. Finally, as can be seen in FIG. 19, all nine inter-WN transactions of this example have been simplified to form a set of only two transactions (Tx19 and Tx17).

It is understood that this method can be applied to simplify the inter-WN transaction routes in a network of more than three WN (without limitation of this number).

The units of account in question (BTC) are advantageously implemented in the form of tags, and said Bitcoin transactions are tag transfer transactions of which the UA are BTC (as described above).

Thus, the possibility of having UA of tags consumed by different types of WP programs, provided they are authorized to do this (see description of the tags and CCC), makes it possible to provide a system based on Bitcoin with the power of the smart contracts of a system such as Ethereum.

Guarantee of Commitment in Case of Non-Responsiveness

For reference, the application PCT No. WO2016/120826 A2 describes a system and a method in which, in reaction to the reception of a message by a device provided with a processor, non-modifiable instructions (similar to Root-of-Trust or RoT) load into this system-on-chip an executable code whose hash corresponds to a given hash included in said received message. The execution which follows this executable code, in said device, is thus predetermined with respect to this received message. Said correspondence is guaranteed to the extent that appropriate access restrictions between the different portions of said system-on-chip exist and cannot be altered. The executable code thus imposed by the emitter of the message is arbitrary and able to update state variables (only the executable code having these state variables being capable of modifying them) and generate yet other messages which themselves will propagate this same hash code to yet other such systems.

The system thus makes it possible to guarantee the executable commitments (described above) which said executable codes represent, to the extent that said device remains responsive (active, switched on). In fact, this method and system guarantee (i) that the device receiving such a message reacts according to the "smart contract" which this message imposes, and (ii) that this message itself was generated in the context exactly of the same smart contract (since produced by the same executable code). This device is implemented in a system-on-chip provided with a secret private key (accessible exclusively by a signature sub-system "Sign"; see FIG. 5 of this PCT application) and able:

in reaction to the reception of a message ("Wallet Message" or "WM") containing a hash ("#WP"), to load for execution, from a sub-system of arbitrary executable codes ("Wallet Programs"), the arbitrary executable code ("Wallet program" or "WP") of which the hash of the content corresponds to said included hash ("#WP") contained in said message (WM);

before the signature of a message (WM) to be emitted, to cause the signature sub-system (Sign) to generate or to verify the hash of the currently loaded arbitrary executable code (#WP), for inclusion in said message (after optional encryption of this hash with other data to be transmitted), thus guaranteeing that the same hash is re-propagated from a received message to an emitted message (or, advantageously and as already described, the WN exchange WM including different hashes of different WP to be executed, but whose correspondence is guaranteed by means of a common specification of the WP to be executed, included in the WM).

Now, a method will be described, which is complementary to the commitment management method in general, in order to guarantee one or more commitments of a WN for the case in which this WN were to become non-responsive.

Figure 20:
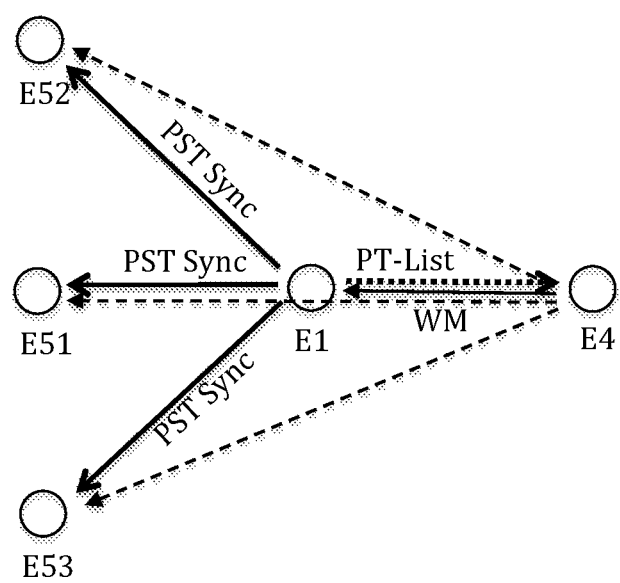
FIG. 20 diagrammatically presents the method for guaranteeing the commitments of a Wallet Node that would become non-responsive.

FIG. 20 presents a commitment supplying WN capable of being non-responsive (E1), a WN which should be able to benefit from the commitment in question (E4), as well as transferee WN which take over this commitment in case of non-responsiveness (E51 to E53). The method comprises the following steps, in reference to this figure:

1. PT List specification: An (arbitrary) commitment of a supplier of this commitment (E1) to a beneficiary of this commitment (E4) specifies a "PT-List" (Potential Transferees List) of potential transferee WN (E51, E52, E53) in case of non-responsiveness of said supplier (E1).
2. Persistent State Variables Synchronization: Said supplier (E1) synchronizes as much as possible the Persistent State Variables of the commitment in question to all the potential transferee WN (E51, E52, E53).
3. Non-Responsiveness Confirmation: Following the sending of a WM by said beneficiary (E4) to said supplier (E1), report by said beneficiary (E4) of the non-responsiveness of said supplier (E1).
4. Transferee Selection: Said beneficiary (E4) and/or said transferees select at least one transferee (E51) from the potential transferees of the PT-List.
5. Delegated Execution: Processing of said WM by said selected transferee (E51) and the latter then synchronizes the persistent state variables as much as possible to all the other potential transferee WN (E52, E53) as well as to said supplier which was non-responsive (E1).
6. Continuation: If said selected transferee is non-responsive or, for a subsequent WM emitted by a beneficiary of a commitment of said supplier which was non-responsive (E1), if the latter is still non-responsive, the same method is applied starting from step 3 (Non-Responsiveness Confirmation).

These steps are implemented as follows:

PT-List Specification

First, the commitments of the "Commitment Transfer Commitment" (CTC) type will be introduced: analogously to the TOC ("Takeover Commitment") whose purpose is to satisfy a client who changes supplier (described in the application PCT WO2016/120826), a CTC is used to indicate to the beneficiary of an arbitrary commitment that, if the supplier (Wallet Node) of said arbitrary commitment becomes non-responsive, the supplier (Wallet Node) of the CTC automatically honors said arbitrary commitment in its stead. A supplier of CTC is referred to as "Potential Transferee" ("PT").

According to this method, associated with any commitment (arbitrary commitment, smart contract) is a "Potential Transferees List" ("PT-List") which contains the addresses of the Wallet Nodes (PT) which supplied a CTC to the supplier (or to the signers) of this commitment (this in order to indicate to its beneficiary which entities [Wallet Nodes] are charged with honoring the commitment in its stead if it becomes non-responsive), the latter entities being charged with executing the commitment by default to the extent that this execution is automatic, without any input on the part of the user.

Persistent State Variables Synchronization

For said transferee Wallet Nodes (E51, E52, E53) of the PT-List of a non-responsive supplier (E1) to be able to honor its commitment in its stead, they have to have the current state of the PSV and tags of the corresponding WP. For example, in the case of takeover of a CCC, they have to have the current values of the persistent variables (in particular the balances, amount+ and amount− for different emitters) of the Wallet Program CCC, in order to be able to generate a UA transfer transaction if applicable. For this purpose, with each updating of its data, the Wallet Node (E1) providing a commitment notifies the new state of its data to all the WN (E51, E52, E53) of the PT-List given in this commitment. Thanks to the blindness property of the Wallet Nodes, the users or owners of these WN cannot access this data.

Non-Responsiveness Confirmation

In case of absence of an acknowledgment of receipt of a WM re-emitted regularly to said supplier (E1) for a previously agreed upon duration, said beneficiary (E4) re-emits the same WM to the WN of the PT-List (E51, E52, E53) and said supplier (E1) should also send to the latter (E51, E52, E53) a copy of said acknowledgment of receipt of the WM sent by the beneficiary (E4). Said supplier (E1) is considered to be non-responsive by the beneficiary (E4) when, for a previously agreed upon duration, no PT of the PT-List notifies the beneficiary (E4) of its reception of said acknowledgment of receipt.

Transferee Selection

Upon request by said beneficiary (E4), each PT of the PT-List sends the beneficiary the n last data update WM (persistent state variables) received from said supplier (E1), which makes it possible to automatically select at least one of the PT of this list (E51) among those whose data was updated most recently. Thanks to the blindness property of the Wallet Nodes, the user or owner of said beneficiary WN (E4) cannot access these messages.

This step can provide for selecting several transferees among the potential transferees of the PT-List, said potential transferees having to sign the unit of account transfer transactions, in the form of a multi-signature of n out of m WN (n being less than m in order to provide for the case in which all the PT selected are not responsive at the same time).

The selection of the m transferees can be carried out according to a protocol (as in the above-described arbitrary selection protocol) wherein each one (or at least a certain number) of the potential transferees of the PT-List returns a sub-list of PT randomly drawn from this list, first of all in the form of hash, then disclosed in a second round, and the potential transferees of the PT-List then select by cross confirmations the m transferees selected according to a selection rule (such as, for example, taking the m which were selected randomly by the largest number of potential transferees) which is pre-established in the commitment in question or by default.

Delegated Execution

Said supplier (E4) notifies the one (or more) PT selected (E51) which then execute(s) the commitment of said supplier, in its stead, in reaction to said WM, then notify(ies) all the other PT (E52, E53) as well as said supplier which was non-responsive (E1) of the new current state of the persistent state variables.

Continuation

To the extent that the persistent state variables are synchronized in the PT of the PT-List, any new WM emitted intended for said supplier for the same commitment can re-engage the same method starting from step 3, in the case in which the supplier is again non-responsive.

It is understood that the credibility of any commitment, such as a CCC described in the application PCT No. WO2016/120826 A2, is linked not only with aspects such as the available amounts, but also with the quantity of the PT of its PT-List weighted by the likely responsiveness of each PT. The future beneficiary of a commitment automatically evaluates this credibility and weights its value before acquiring this commitment, as a function of known parameters of responsiveness associated with these PT (communicated from one WN to another).

It should be noted for a given commitment of a supplier, the beneficiary WN of this commitment can itself be a PT (that is to say be part of the PT-List of the same supplier and for the same commitment). In this case, the state variables are synchronized in the beneficiary of the commitment which itself becomes capable of executing this commitment of which it is the beneficiary.

Replacement WN in Case of Non-Responsiveness

A case of use of the above-described method of commitment takeover in case of non-responsiveness consists in using a given WN (E4) as WN for replacement of another WN (E1) typically of the same owner. The commitment in question is simply: transfer upon simple request a balance from said other WN (E1) which is the supplier of said commitment to said given WN (E4) which is the beneficiary of said commitment and which emits this request. Thus, in case of loss or non-operation of said other WN (E1), it can be replaced by said given WN (E4), the balance being automatically transferred to said given WN (E4), even if said other WN (E1) has become non-responsive. Advantageously, since said given WN (E4) itself is a PT (of E1), no other PT is necessary for ensuring the replacement of WN.

The owner in question can provide several such replacement WN (E4) for a given other WN (E1) and use any one for the replacement.

A set of WN can play the role of replacement WN for replacement of one another and can become interchangeable.

The commitment in question can provide that said transfer can take place for a portion of the balance and that a certain number (given in the commitment) of replacement WN must sign together for a transfer of an amount greater than a certain threshold (multi-signature of n out of m WN, n and m being a function of the amount to be transferred).

The above-described commitment takeover method in case of non-responsiveness (method for guaranteeing a commitment of a WN for the case in which it were to become non-responsive) can be extended in order to guarantee the commitment also in case of tampering, in the following approach: in the "Persistent State Variables Synchronization" step, the supplier of the commitment (E1) also communicates the hash of the WP of the commitment (as well as its content when it is missing); a step of cross-verification of the synchronizations is added to the method; in the step "Non-Responsiveness Confirmation" (here renamed "Non-responsiveness or non-conformity notification"), the beneficiary of the commitment (E4) reports the non-conformity, if applicable, of the supplier WN (E1) with respect to said commitment; in the step "Delegated Execution," the processing of said WM by said selected transferee (E51) comprises a specific processing operation, provided in the WP, for correcting the altered behavior of the non-conforming WN; finally, a step is added which consists in blacklisting a non-conforming WN.

Naturally, the present invention is in no way limited to the embodiments described and represented, and the person skilled in the art will be able to contribute numerous variants and modifications to it. The person skilled in the art will also be able to combine and separate the different features described here depending on the needs and the applications.

The invention claimed is:

1. A system for a secure execution of programs in a network, the system comprising:
   a plurality of devices connected to the network; and
   in at least one of the plurality of devices, a secure system-on-chip (SoC) providing a SoC secret private key that is either stored in a manner to be accessible exclusively by the SoC or dynamically regenerated by a physical unclonable function,
   the SoC being configured to:
      communicate with at least one other of the plurality of devices only by messages;
      encrypt one or more instruction blocks of at least one program to be executed;
      store, in a SoC memory, the encrypted one or more instruction blocks of said at least one program to be executed;
      generate a hash of the at least one program to be executed for retrieving said at least one program; and
      upon receiving, from the at least one other of the plurality of devices, a first message containing at least the hash of said at least one program to be executed, execute, in a secure manner, the at least one program by:
         accessing, from the SoC memory, the encrypted and stored one or more instruction blocks based on said hash received in the first message,
         (i) decrypting, on the fly, instructions of the accessed encrypted one or more instruction blocks of the at least one program corresponding to the hash, and
         (ii) executing, on the fly, the decrypted instructions of the encrypted one or more instruction blocks,
      wherein the SoC executes the at least one program only upon receiving the first message or one or more other messages containing at least the hash of said at least one program.

2. The system according to claim 1, wherein the SoC is configured to insert the hash of said at least one program being executed and a signature of said hash, which is generated based on said SoC secret private key, into a second message for transmission by the SoC.

3. The system according to claim 1, wherein the SoC is configured to insert the hash of said at least one program being executed into a body portion of a second message for transmission by the SoC after a signature is incorporated to the second message by the SoC based on the SoC secret private key.

4. The system according to claim 1, wherein the SoC comprises a cryptographic memory management unit (CMMU) processor adapted for encryption/decryption, memory address allocation, and hash generation, wherein the SoC secret private key of the SoC is stored or dynamically regenerated by the CMMU processor, said CMMU processor being configured to:
   encrypt the one or more instruction blocks of the at least one program to be executed before storing the encrypted one or more instruction blocks in the SoC memory,
   generate a memory address allocation for storing said encrypted one or more instruction blocks in the SoC memory,
   generate the hash of the at least one program to be executed, and
   decrypt the instructions of the accessed at least one program for execution, on the fly.

5. The system according to claim 4, wherein said at least one program to be executed is made of a plurality of the instruction blocks and the CMMU processor is configured to encrypt and store said at least one program to be executed instruction block by instruction block and to supply said at least one processor with one decrypted instruction block at a time for execution on the fly.

6. The system according to claim 1, wherein, before transmission of a second message by the SoC, the CMMU processor is configured to:
   insert the hash of the at least one program being executed into the second message,
   generate a signature of said hash based on said SoC secret private key, and
   insert the generated hash signature into said second message.

7. The system according to claim 4, wherein, before transmission of a second message by the SoC, the CMMU processor is configured to:
   insert the hash of the at least one program being executed into a body portion of the second message, and
   sign said second message based on said SoC secret private key.

8. The system according to claim 1, wherein the SoC is configured to transmit a second message having the hash for the at least one program being executed, said hash being the same as another hash for another program to be executed by a recipient device, the another program being an executable commitment (smart contract), wherein the recipient device comprises another SoC.

9. A system-on-chip (SoC) device forming a Wallet Node (WN) of a network of a plurality of devices, said SoC device comprising:
   at least one SoC processor;
   a memory; and
   a cryptographic memory management unit (CMMU) processor adapted for encryption/decryption, memory address allocation, and hash generation, said CMMU processor providing a secret key that is either stored in a manner to be accessible exclusively by the CMMU processor or dynamically regenerated by a physical unclonable function, wherein:
   the CMMU processor is configured to encrypt one or more instruction blocks of at least one program, store said encrypted one or more instruction blocks of the at least one program in said memory, and generate a hash of said at least one program for retrieving said at least one program using said hash, and
   said at least one SoC processor is configured to execute programs only in response to commands from said CMMU processor,
   the SoC device interacts with other nodes of the network exclusively by messages, and the messages are received and transmitted exclusively by the CMMU processor of the SoC device,
   the CMMU processor is configured, in response to receiving a first message containing at least the hash of said at least one program, to execute, in a secure manner, the at least one program by:
      (i) accessing, from said memory, the at least one encrypted and stored program one or more instruction blocks of the at least one program based on the hash in the received first message,
      (ii) decrypting instructions of the accessed program, and
      (iii) transmitting the decrypted instructions to said at least one SoC processor for a blind execution by said at least one SoC processor.

10. The SoC device according to claim 9, wherein said at least one SoC processor is configured to access and manipulate via said CMMU processor persistent state variables (PSVs) associated with a given program, wherein said CMMU processor is further configured to encrypt said PSVs, to store said PSVs in said memory, and to decrypt said PSVs on the fly.

11. The SoC device according to claim 9, wherein said encrypted one or more instruction blocks of said at least one program and its associated persistent state variables (PSV) are stored in a specific addressing space of said memory ensuring isolation with respect to other programs.

12. The SoC device according to claim 9, wherein said memory is located in the SoC device.

13. The SoC device according to claim 9, wherein said memory is separate from the SoC device.

14. The SoC device according to claim 9, wherein the CMMU processor is further configured to trigger the execution of said at least one program based on a time-out associated to the hash having elapsed.

15. The SoC device according to claim 9, wherein said at least one program to be executed is made of a plurality of the instruction blocks, and wherein said CMMU processor is configured to encrypt and store, in said memory, said at least one program instruction block by instruction block, and to transmit the decrypted instructions to said at least one SoC processor one decrypted instruction block at a time for execution on the fly.

16. The SoC device according to claim 9, wherein said CMMU processor is configured to sign the hash of said at least one program being executed with said secret private key and to insert said signed hash into a second message for transmitting the second message.

17. The SoC device according to claim 9, wherein said CMMU processor is configured to insert the hash of said at least one program being executed into a body portion of a second message and to sign said body portion with said secret private key for transmitting the second message.

18. The SoC device according to claim 9, wherein the hash for said at least one program being executed is a common hash for another program to be executed by a recipient SoC device, and
said CMMU is configured to transmit a second message containing the common hash to the recipient SoC device to form a smart contract.

* * * * *